US009829813B2

(12) United States Patent
Nukada et al.

(10) Patent No.: US 9,829,813 B2
(45) Date of Patent: Nov. 28, 2017

(54) FLUORINE-CONTAINING RESIN PARTICLE DISPERSION, METHOD FOR PREPARING FLUORINE-CONTAINING RESIN PARTICLE DISPERSION, COATING LIQUID WHICH CONTAINS FLUORINE-CONTAINING RESIN PARTICLES, METHOD FOR PREPARING COATING FILM WHICH CONTAINS FLUORINE-CONTAINING RESIN PARTICLES, COATING FILM WHICH CONTAINS FLUORINE-CONTAINING RESIN PARTICLES, MOLDED BODY, ELECTROPHOTOGRAPHIC PHOTORECEPTOR, METHOD FOR PREPARING ELECTROPHOTOGRAPHIC PHOTORECEPTOR, IMAGE FORMING APPARATUS, AND PROCESS CARTRIDGE

(71) Applicant: FUJI XEROX CO., LTD., Tokyo (JP)

(72) Inventors: Katsumi Nukada, Kanagawa (JP); Wataru Yamada, Minamiashigara (JP); Takatsugu Doi, Kanagawa (JP); Yuko Iwadate, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/175,343

(22) Filed: Jun. 7, 2016

(65) Prior Publication Data
US 2016/0291490 A1    Oct. 6, 2016

Related U.S. Application Data

(62) Division of application No. 13/208,934, filed on Aug. 12, 2011, now Pat. No. 9,389,525.

(30) Foreign Application Priority Data

Mar. 9, 2011   (JP) ................................. 2011-052103
Mar. 9, 2011   (JP) ................................. 2011-052104

(51) Int. Cl.
*C08K 5/06*          (2006.01)
*G03G 21/18*         (2006.01)
(Continued)

(52) U.S. Cl.
CPC ............ *G03G 5/14726* (2013.01); *C08J 3/02* (2013.01); *G03G 5/0525* (2013.01);
(Continued)

(58) Field of Classification Search
USPC .................................................. 524/544, 520
See application file for complete search history.

(56) References Cited

U.S. PATENT DOCUMENTS 5,411,827 A    5/1995  Tamura et al.
5,427,880 A    6/1995  Tamura et al.
(Continued)

FOREIGN PATENT DOCUMENTS

JP    S62-251757 A    11/1987
JP    H02158651 A     6/1990
(Continued)

OTHER PUBLICATIONS

Nov. 18, 2014 Office Action issued in Japanese Application No. 2011-052104.
(Continued)

*Primary Examiner* — Mark Kaucher
*Assistant Examiner* — Henry Hu
(74) *Attorney, Agent, or Firm* — Oliff PLC

(57) ABSTRACT

Provided is a fluorine-containing resin particle dispersion including: fluorine-containing resin particles, a resin which is not dissolved in at least one solvent in a group of hydroxyl group-containing solvents including an alcohol-based solvent having 1 to 10 carbon atoms, containing no aromatic ring in the molecule structure, and a water-based medium, and which is adhered on the surface of the fluorine-contain-
(Continued)

ing resin particles, and at least one solvent, in which the resin is not dissolved, in the group of hydroxyl group-containing solvents, in which the fluorine-containing resin particles having the resin adhered on the surface thereof are dispersed.

4 Claims, 3 Drawing Sheets

(51) Int. Cl.
G03G 5/147 (2006.01)
G03G 5/05 (2006.01)
C08J 3/02 (2006.01)

(52) U.S. Cl.
CPC ......... *G03G 5/0539* (2013.01); *G03G 21/18* (2013.01); *C08J 2300/102* (2013.01); *G03G 2215/00957* (2013.01)

(56) References Cited

U.S. PATENT DOCUMENTS

| | | | |
|---|---|---|---|
| 5,456,989 A | 10/1995 | Nogami et al. | |
| 5,496,671 A | 3/1996 | Tamura et al. | |
| 5,637,142 A | 6/1997 | Kubo et al. | |
| 5,695,898 A | 12/1997 | Go et al. | |
| 5,985,983 A | 11/1999 | Yamada et al. | |
| 6,100,325 A | 8/2000 | Chittofrati et al. | |
| 6,232,372 B1 | 5/2001 | Brothers et al. | |
| 6,329,042 B1 | 12/2001 | Yamada et al. | |
| 6,416,915 B1 | 7/2002 | Kikuchi et al. | |
| 6,555,279 B2 | 4/2003 | Nakata et al. | |
| 7,041,728 B2 | 5/2006 | Zipplies et al. | |
| 7,175,957 B2 | 2/2007 | Suzuki et al. | |
| 7,179,573 B2 | 2/2007 | Suzuki et al. | |
| 7,294,668 B2 | 11/2007 | Zipplies et al. | |
| 7,361,438 B2 | 4/2008 | Suzuki et al. | |
| 7,399,563 B2 | 7/2008 | Suzuki et al. | |
| 7,563,553 B2 | 7/2009 | Kikuchi et al. | |
| 9,389,525 B2* | 7/2016 | Nukada | G03G 5/0525 |
| 2002/0119382 A1 | 8/2002 | Nakata et al. | |
| 2004/0043312 A1 | 3/2004 | Kikuchi et al. | |
| 2004/0248024 A1 | 12/2004 | Suzuki et al. | |
| 2004/0253527 A1 | 12/2004 | Suzuki et al. | |
| 2005/0107518 A1 | 5/2005 | Zipplies et al. | |
| 2006/0128872 A1 | 6/2006 | Zipplies et al. | |
| 2007/0122724 A1 | 5/2007 | Suzuki et al. | |
| 2007/0178400 A1 | 8/2007 | Kikuchi et al. | |
| 2008/0020305 A1 | 1/2008 | Suzuki et al. | |
| 2009/0226280 A1 | 9/2009 | Thau et al. | |
| 2010/0067172 A1* | 3/2010 | Zhang | C08L 25/06 361/323 |
| 2010/0248100 A1 | 9/2010 | Ezumi | |
| 2011/0118393 A1* | 5/2011 | Yen | B82Y 30/00 524/104 |

FOREIGN PATENT DOCUMENTS

| | | |
|---|---|---|
| JP | H04-189873 A | 7/1992 |
| JP | H05-40360 A | 2/1993 |
| JP | H0539630 A | 2/1993 |
| JP | H0543823 A | 2/1993 |
| JP | H05-98181 A | 4/1993 |
| JP | H05-140472 A | 6/1993 |
| JP | H05-140473 A | 6/1993 |
| JP | H05-216249 A | 8/1993 |
| JP | H05-263007 A | 10/1993 |
| JP | H05-279591 A | 10/1993 |
| JP | H07-72640 A | 3/1995 |
| JP | H07-146564 A | 6/1995 |
| JP | H07233345 A | 9/1995 |
| JP | H08-176293 A | 7/1996 |
| JP | H08-208820 A | 8/1996 |
| JP | H11130927 A | 5/1999 |
| JP | 2000-019749 A | 1/2000 |
| JP | 2000-206715 A | 7/2000 |
| JP | 2001-175016 A | 6/2001 |
| JP | 2001166510 A | 6/2001 |
| JP | 2002-082469 A | 3/2002 |
| JP | 3287678 B2 | 6/2002 |
| JP | 2003-029453 A | 1/2003 |
| JP | 2003524663 A | 8/2003 |
| JP | 2004-012986 A | 1/2004 |
| JP | 2004-302450 * | 10/2004 |
| JP | 2004-302450 A | 10/2004 |
| JP | 2005-181396 * | 7/2005 |
| JP | 2005181396 A | 7/2005 |
| JP | 2006-010936 A | 1/2006 |
| JP | 2006-084711 A | 3/2006 |
| JP | 2006-184745 A | 7/2006 |
| JP | 2007511657 A | 5/2007 |
| JP | 2008013669 A | 1/2008 |
| JP | 4251662 B2 | 4/2009 |
| JP | 4251663 B2 | 4/2009 |
| JP | 2009-237568 A | 10/2009 |
| JP | 2010-224376 A | 10/2010 |
| JP | 2010-224503 A | 10/2010 |

OTHER PUBLICATIONS

Dec. 10, 2014 Office Action issued in Chinese Application No. 201110351216.9.
Jul. 11, 2014 Notification of Reasons for Refusal issued in Japanese Patent Application No. 2011-052103.

\* cited by examiner

US 9,829,813 B2

FLUORINE-CONTAINING RESIN PARTICLE DISPERSION, METHOD FOR PREPARING FLUORINE-CONTAINING RESIN PARTICLE DISPERSION, COATING LIQUID WHICH CONTAINS FLUORINE-CONTAINING RESIN PARTICLES, METHOD FOR PREPARING COATING FILM WHICH CONTAINS FLUORINE-CONTAINING RESIN PARTICLES, COATING FILM WHICH CONTAINS FLUORINE-CONTAINING RESIN PARTICLES, MOLDED BODY, ELECTROPHOTOGRAPHIC PHOTORECEPTOR, METHOD FOR PREPARING ELECTROPHOTOGRAPHIC PHOTORECEPTOR, IMAGE FORMING APPARATUS, AND PROCESS CARTRIDGE

CROSS-REFERENCE TO RELATED APPLICATIONS

This application is a divisional application of U.S. patent application Ser. No. 13/208,934, filed Aug. 12, 2011, now U.S. Pat. No. 9,389,525, which is based on and claims priority under 35 USC 119 from Japanese Patent Applications No. 2011-052103 and No. 2011-052104 both filed Mar. 9, 2011.

BACKGROUND

1. Technical Field

Some aspects of the present invention relate to a fluorine-containing resin particle dispersion, a method for preparing the fluorine-containing resin particle dispersion, a coating liquid which contains fluorine-containing resin particles, a method for preparing the coating film which contains fluorine-containing resin particles, a coating film which contain the fluorine-containing resin particles, a molded body, an electrophotographic photoreceptor, a method for preparing the electrophotographic photoreceptor, an image forming apparatus, and a process cartridge.

2. Related Art

A coating liquid formed by mixing fluorine-containing resin particles in a coating liquid and dispersing fluorine-containing resin particles in a coating has been used. Generally, since the fluorine-containing resin particles have a low surface energy, they are not easily miscible with water or any other solvent such as alcohols, organic solvents, and the like, and cannot maintain a stable dispersion state, a large amount of surfactants are used for dispersion. Further, recently, in order to reduce the environmental load of organic solvents, there have been an increasing number of cases where water or alcohol-based solvents have been used.

Generally, an electrophotographic image forming apparatus has the following structure and processes. That is, the surface of an electrophotographic photoreceptor is charged by a charging unit to a predetermined polarity and potential, and charge is selectively removed from the surface of the electrophotographic photoreceptor after charging by subjecting it to imagewise exposure to form an electrostatic latent image. The latent image is then developed into a toner image by attaching toner to the electrostatic latent image by a developing unit, and the toner image is transferred to a transfer medium by a transfer unit to be discharged as a material on which an image is formed.

Furthermore, it has been proposed to provide a protective layer on the surface of an electrophotographic photoreceptor to increase the strength.

Moreover, in recent years, protective layers made out of acryl-based materials have attracted public attention.

These acryl-based materials are strongly affected by curing conditions, a curing atmosphere.

SUMMARY

According to an aspect of the invention, there is provided a fluorine-containing resin particle dispersion including:
fluorine-containing resin particles,
a resin which is not dissolved in at least one solvent in a group of hydroxyl group-containing solvents including an alcohol-based solvent having 1 to 10 carbon atoms, containing no aromatic ring in the molecule structure, and a water-based medium, and which is adhered on the surface of the fluorine-containing resin particles, and
at least one solvent, in which the resin is not dissolved, in the group of hydroxyl group-containing solvents, in which the fluorine-containing resin particles having the resin adhered on the surface thereof are dispersed.

BRIEF DESCRIPTION OF THE DRAWINGS

Exemplary embodiments of the present invention will be described in detail based on the following figures, wherein.

DETAILED DESCRIPTION

Figure 1:
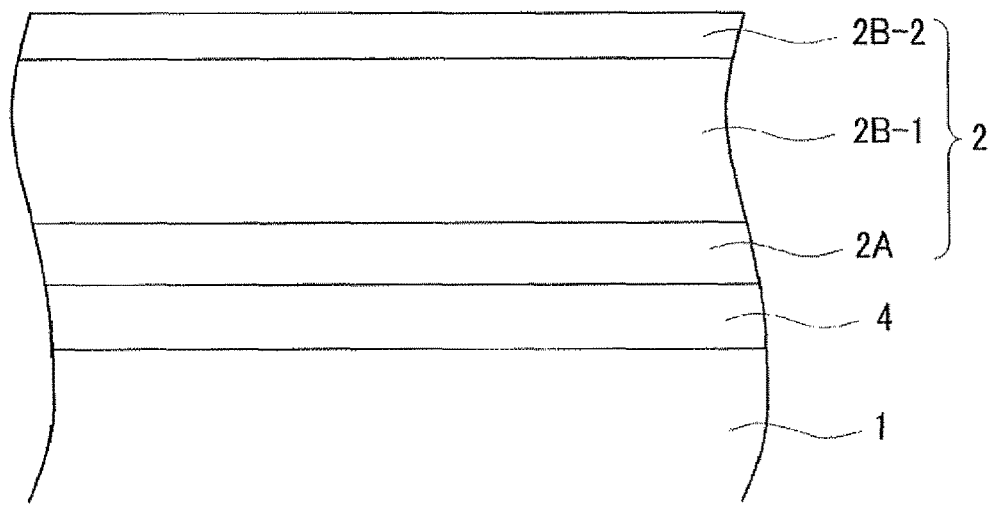
FIG. 1 is a schematic partial cross-sectional view showing an example of the construction of a layer of an electrophotographic photoreceptor according to the present exemplary embodiment.

Hereinbelow, the exemplary embodiments of the present invention will be described in detail.

<Fluorine-Containing Resin Particle Dispersion>

The fluorine-containing resin particle dispersion according to the present exemplary embodiment includes fluorine-containing resin particles, a resin which is not dissolved in at least one solvent in a group of hydroxyl group-containing solvents including an alcohol-based solvent having 1 to 10 carbon atoms, containing no aromatic ring in the molecule structure, and a water-based medium, is adhered on the surface of the fluorine-containing resin particles, and at least one solvent, in which the resin is not dissolved, in the group of hydroxyl group-containing solvents, in which the fluorine-containing resin particles having the resin adhered on the surface thereof are dispersed.

When dispersion and stabilization of the fluorine-containing resin particles in a solvent in the group of the hydroxyl group-containing solvents is promoted, basically, a solvent in which a dispersant is added for dispersion is used, and thus, it is necessary to use a large amount of those having a polar group that may be dissolved in the alcohol-based solvent or the water-based medium. On the other hand, when a resin that is not dissolved in a solvent in the group of the hydroxyl group-containing solvents (hereinafter referred to as a "specific resin") as a dispersant is used, the specific resin is not dispersed since it is originally insoluble in the solvent, even though it is intended to disperse each resin in the solvent in the state where it is not adhered on the surface of the fluorine-containing resin particles.

However, in the present exemplary embodiment, it is presumed that since the specific resin is in the state where it is adhered to the surface of the fluorine-containing resin particles, the affinity for the solvent may be increased, and as a result, excellent dispersibility is obtained, Here, confirmation of whether the specific resin is dissolved in a solvent in the group of the hydroxyl group-containing solvents (solubility) is carried out by the following test method.

—Method for Confirmation Test on Solubility—

For the solubility, the surface tension of the solvent in a group of hydroxyl group-containing solvents is measured in advance, and the surface tension of the solvent in a group of hydroxyl group-containing solvents after adding a specific resin to the solvent in a group of hydroxyl group-containing solvents in an amount of 5% by weight, followed by treatment with stirring for 5 hours is measured, and thus, a difference in the surface tension between before and after the addition of the specific resin of less than 10% is defined as "being not dissolved".

Furthermore, in a case of preparation as described later (Preparation Method 2), when fluorine-containing resin particles having a resin formed on the surface from other solvents is separated, and the dried fluorine-containing resin particles are added to the solvent in a group of hydroxyl group-containing solvents in an amount of 5% by weight, followed by treatment with stirring for 5 hours and the surface tension is measured, a difference in the surface tension between before and after the addition of the fluorine-containing resin particles having a resin formed on the surface of less than 10% is defined as "being not dissolved".

In addition, as a surface tensiometer, for example, a Surface Tensiometer DY-700 manufactured by Kyowa Interface Science Co., Ltd. is used.

Furthermore, the "adhesion" indicates a state where a specific resin is chemically or physically bonded to the surface of the fluorine-containing resin particles, specifically, it is a concept including a case where a specific resin is adsorbed on or chemically bonded to the surface of the fluorine-containing resin particles.

In addition, the adsorption indicates physical adsorption by Van der Waals forces, and represents a state where a specific resin is brought into contact with the surface of the fluorine-containing resin particles and thus, the concentration of the specific resin on the surface increases.

<Electrophotographic Photoreceptor and Method for Preparing the Same>

The electrophotographic photoreceptor according to the present exemplary embodiment (hereinafter also simply referred to as a "photoreceptor") includes a substrate, and fluorine-containing resin particles having a resin which is not dissolved in at least one solvent in a group of hydroxyl group-containing solvents including an alcohol-based solvent having 1 to 10 carbon atoms, containing no aromatic ring in the molecule structure, and a water-based medium (hereinafter referred to as a "specific resin") adsorbed on the surface thereof, on the substrate, and also including a surface photosensitive layer constituting an outermost surface.

Furthermore, a first method for preparing the electrophotographic photoreceptor according to the present exemplary embodiment includes at least dissolving a resin which is not dissolved in at least one solvent in a group of hydroxyl group-containing solvents including an alcohol-based solvent having 1 to 10 carbon atoms, containing no aromatic ring in the molecule structure, and a water-based medium (specific resin) in another solvent in which the resin may be dissolved [dissolution step], bringing the fluorine-containing resin particles into contact with the specific resin to adsorb the resin on the surface of the fluorine-containing resin particles [adsorption step], separating the fluorine-containing resin particles having the specific resin adsorbed on the surface thereof from the other solvent [separation step], dispersing the separated fluorine-containing resin particles in at least one solvent selected from the solvents in which the specific resin is not dissolved, in the group of hydroxyl group-containing solvents, to prepare a fluorine-containing resin particle dispersion [dispersion step], and applying the fluorine-containing resin particle dispersion on a substrate to form a surface photosensitive layer [surface photosensitive layer forming step], wherein an electrophotographic photoreceptor including a surface photosensitive layer on a substrate is prepared.

Furthermore, a second method for preparing the electrophotographic photoreceptor according to the present exemplary embodiment includes at least dissolving a reactive monomer which is a raw material for a resin which is not dissolved in at least one solvent in a group of hydroxyl group-containing solvents including an alcohol-based solvent having 1 to 10 carbon atoms, containing no aromatic ring in the molecule structure, and a water-based medium (specific resin) in another solvent in which the resin may be dissolved [dissolution step], bringing the fluorine-containing resin particles into contact with the monomer to adsorb the monomer on the surface of the fluorine-containing resin particles [adsorption step], polymerizing the monomer to form a resin on the surface of the fluorine-containing resin particles [polymerization step], separating the fluorine-containing resin particles having the specific resin adsorbed on the surface thereof from the other solvent [separation step], dispersing the separated fluorine-containing resin particles in at least one solvent selected from the solvents in which the specific resin is not dissolved, in the group of hydroxyl group-containing solvents, to prepare a fluorine-containing resin particle dispersion [dispersion step], and applying the fluorine-containing resin particle dispersion on a substrate to form a surface photosensitive layer [surface photosensitive layer forming step], wherein an electrophotographic photoreceptor including a surface photosensitive layer on a substrate is prepared.

In the first preparation method or the second preparation method, the specific resin which is not adhered on the fluorine-containing resin particles (released resin) is not present or the amount of the released resin is reduced in the fluorine-containing resin particle dispersion obtained in the dispersion step.

The reason therefor is thought to be that in the [dissolution step] and the [adsorption step] in the first preparation method or the [dissolution step], the [adsorption step], and the [polymerization step] in the second preparation method, fluorine-containing resin particles have the specific resin adsorbed on the surface thereof in the solvent, and then, fluorine-containing resin particles have the specific resin adsorbed from the other solvent in the [separation step]. It is thought that since the specific resin is adsorbed and the specific resin which is not adsorbed (released resin) remains in the other solvent in the fluorine-containing resin particles throughout all the steps until the separation step, the specific resin which is not adsorbed on the fluorine-containing resin particles (released resin) is not present or the amount thereof is reduced in the fluorine-containing resin particle dispersion obtained by the later dispersion step.

Moreover, it is thought that the released resin contained in the fluorine-containing resin particle dispersion has a property of trapping charges. Accordingly, in the surface photosensitive layer formed by trapping using a fluorine-containing resin particle dispersion including the released resin, the released resin traps charges and the charges are accumulated to generate a residual potential. As the amount of the released resin is higher, more charges are accumulated due to repeated charging to the electrophotographic photoreceptor, and a difference in the surface potential (residual potential) of the photoreceptor between before and after the repeated charging occurs. Further, there is a tendency that variance of the electrical characteristics easily occurs particularly under high humidity.

In this regard, since for the electrophotographic photoreceptor according to the present exemplary embodiment obtained by the first preparation method, the second preparation method, or the like, the released resin is not present or the amount of the released resin is reduced in the surface photosensitive layer, and accumulation of the charges due to the released resin is inhibited, and variance of the residual potentials due to repeated charging is inhibited. Further, even under high humidity, variance of the residual potentials due to repeated charging is stably inhibited, and thus, the environmental dependency is improved.

Furthermore, it is presumed that since the specific resin is in a state where it is adsorbed on the surface of the fluorine-containing resin particles, the affinity of the group of hydroxyl group-containing solvents for the solvent may increase, and excellent dispersibility in the fluorine-containing resin particle dispersion is obtained.

For this reason, for the surface photosensitive layer in the electrophotographic photoreceptor according to the present exemplary embodiment, the fluorine-containing resin particles are present without deviation in the thickness direction, and thus, excellent scratch resistance or abrasion resistance may be obtained. Moreover, since the fluorine-containing resin particles are present without deviation in the thickness direction, a required smoothness may be obtained at an initial time, and thus, for example, even in a case where the photoreceptor is cleaned with a cleaning blade as a cleaning member tightly pressed on the surface of the photoreceptor, generation of the cleaning blade curling at an initial time, or the like is effectively inhibited.

Here, confirmation of whether the specific resin is dissolved in a solvent in the group of the hydroxyl group-containing solvents (solubility) is carried out by the following test method.

—Method of Confirmation Test on Solubility—

For the solubility, the surface tension of the solvent in a group of hydroxyl group-containing solvents is measured in advance, and the surface tension of the solvent in a group of hydroxyl group-containing solvents after adding a specific resin to the solvent in a group of hydroxyl group-containing solvents in an amount of 5% by weight, followed by treatment with stirring for 5 hours is measured, and thus, a difference in the surface tension between before and after the addition of the specific resin of less than 10% is defined as "being not dissolved".

Furthermore, in a case of preparation as described later (Preparation Method 2), when fluorine-containing resin particles having a resin formed on the surface from other solvents is separated, and the dried fluorine-containing resin particles are added to the solvent in a group of hydroxyl group-containing solvents in an amount of 5% by weight, followed by treatment with stirring for 5 hours and the surface tension is measured, a difference in the surface tension between before and after the addition of the fluorine-containing resin particles having a resin formed on the surface of less than 10% is defined as "being not dissolved".

In addition, as a surface tensiometer, for example, a Surface Tensiometer DY-700 manufactured by Kyowa Interface Science Co., Ltd. is used.

Furthermore, the "adhesion" denotes a state where a specific resin is chemically or physically bonded to the surface of the fluorine-containing resin particles, specifically, it is a concept including a case where a specific resin is adsorbed on or chemically bonded to the surface of the fluorine-containing resin particles.

In addition, the adsorption denotes physical adsorption by Van der Waals forces, and represents a state where a specific resin is brought into contact with the surface of the fluorine-containing resin particles and thus, the concentration of the specific resin on the surface increases.

Hereinbelow, the constitution of and the preparation method for the electrophotographic photoreceptor according to the present exemplary embodiment, and the respective compositions of and the preparation method for the fluorine-containing resin particle dispersion will be described in detail.

[Constitution of Electrophotographic Photoreceptor]

The photoreceptor according to the present exemplary embodiment includes a functionally integrated photosensitive layer including both a charge transporting ability and a charge generating ability as a photosensitive layer, includes a functionally separated photosensitive layer separately having a charge transporting layer and a charge generating layer, or may have a constitution in which a charge transporting layer includes two or more layers. In addition, additional layers such as an undercoating layer and the like may be provided thereon.

Hereinbelow, the constitution of the photoreceptor according to the present exemplary embodiment is described with reference to FIGS. 1 to 3, but the present exemplary embodiment is not limited to FIGS. 1 to 3.

FIG. 1 is a schematic cross-sectional view showing an example of the construction of a layer of an electrophotographic photoreceptor according to the present exemplary embodiment, and in FIG. 1, 1 indicates a substrate, 2 indicates a photosensitive layer, 2A indicates a charge generating layer, 2B-1 and 2B-2 indicate charge transporting layers, and 4 indicates an undercoating layer.

The photoreceptor shown in FIG. 1 has a layered constitution where an undercoating layer 4, a charge generating layer 2A, a charge transporting layer 2B-1, and a charge transporting layer 2B-2 are laminated in this order on a and the photosensitive layer 2 is constituted with three layers of a charge generating layer 2A, and charge transporting layers 2B-1 and 2B-2 (first exemplary embodiment).

Furthermore, in the photoreceptor shown in FIG. 1, the charge transporting layer 2B-2 is a surface photosensitive layer constituting the outermost surface, and includes at least fluorine-containing resin particles having a specific resin adhered on the surface thereof in the charge transporting layer 2B-2.

Figure 2:
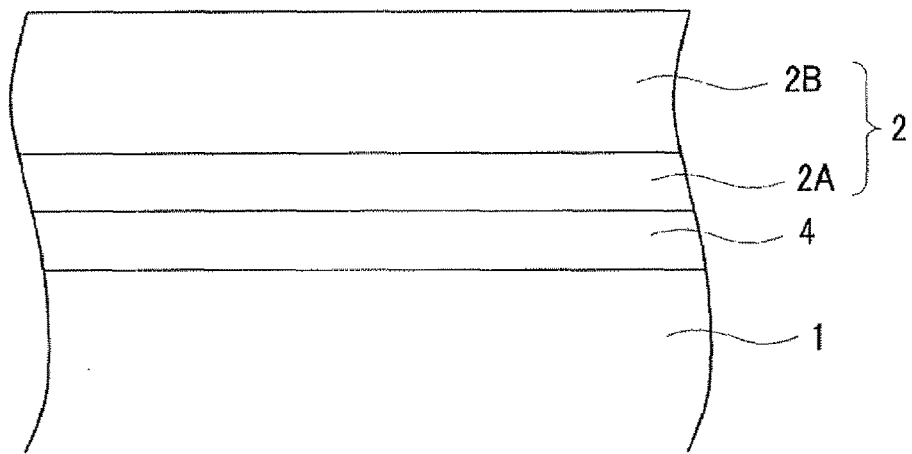
FIG. 2 is a schematic partial cross-sectional view showing another example of the construction of a layer of an electrophotographic photoreceptor according to the present exemplary embodiment.

FIG. 2 is a schematic cross-sectional view showing another example of the construction of a layer of an electrophotographic photoreceptor according to the present exemplary embodiment, and the symbols shown in FIG. 2 have the same meanings as in FIG. 1.

The photoreceptor shown in FIG. 2 has a layered constitution where an undercoating layer 4, a charge generating layer 2A, and a charge transporting layer 2B are laminated in this order on a substrate 1, and the photosensitive layer 2 is constituted with two layers of a charge generating layer 2A and a charge transporting layers 2B (second exemplary embodiment).

Furthermore, in the photoreceptor shown in FIG. 2, the charge transporting layer 2B is a surface photosensitive layer constituting the outermost surface, and includes at least fluorine-containing resin particles having a specific resin adhered on the surface thereof in the charge transporting layer 2B.

Figure 3:
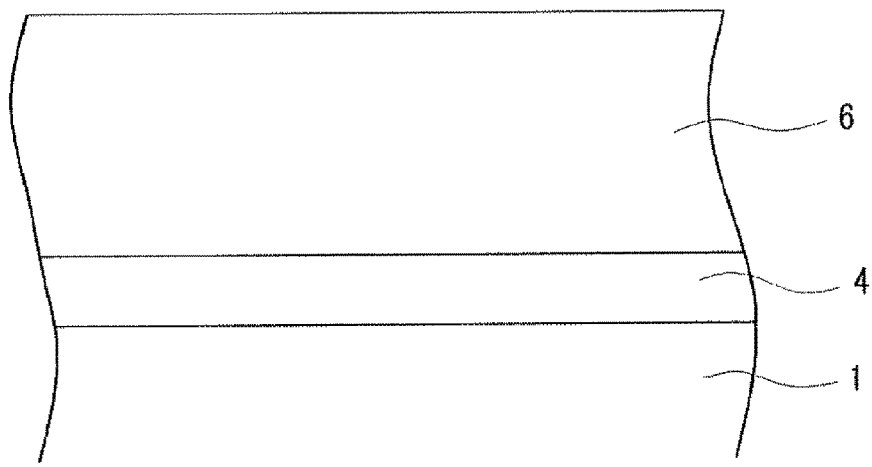
FIG. 3 is a schematic partial cross-sectional view showing a further example of the construction of a layer of an electrophotographic photoreceptor according to the present exemplary embodiment.

FIG. 3 is a schematic cross-sectional view showing a further example of the construction of a layer of an electrophotographic photoreceptor according to the present exemplary embodiment, and in FIG. 3, 6 denotes a functionally integrated photosensitive layer, and the other symbols have the same meanings as in FIG. 1.

The photoreceptor shown in FIG. 3 has a layered constitution where an undercoating layer 4 and a photosensitive layer 6 are laminated in this order on a substrate 1, and the photosensitive layer 6 is a photosensitive layer having functional integration of the charge generating layer 2A and the charge transporting layer 2B shown in FIG. 2 (third exemplary embodiment).

Furthermore, in the photoreceptor shown in FIG. 3, the functionally integrated photosensitive layer 6 is a surface photosensitive layer constituting the outermost surface, and includes at least fluorine-containing resin particles having a specific resin adhered on the surface thereof in the functionally integrated photosensitive layer 6.

Hereinbelow, as examples of the photoreceptor according to the present exemplary embodiment, the first embodiments to the third embodiments are each described.

First Embodiment: Surface Photosensitive Layer=Charge Transporting Layer 2B-2

The photoreceptor according to the first exemplary embodiment has a layered constitution where an undercoating layer 4, a charge generating layer 2A, a charge transporting layer 2B-1, and a charge transporting layer 2B-2 are laminated in this order on a substrate 1, as shown in FIG. 1, and the charge transporting layer 2B-2 is a surface photosensitive layer constituting an outermost surface.

Charge Transporting Layer 2B-2

In the first place, the charge transporting layer 2B-2 which is a surface photosensitive layer constituting an outermost surface will be described.

The surface photosensitive layer in the present exemplary embodiment (the charge transporting layer 2B-2 in the first exemplary embodiment) includes at least fluorine-containing resin particles having the specific resin according to the present exemplary embodiment adhered on the surface thereof, as described above.

—Fluorine-Containing Resin Particles—

The above-mentioned specific fluorine-containing polymer is a homopolymer of a fluorolefin or copolymer of two kinds of a fluorolefins, or a copolymer of one or two or more kinds of a fluorolefin with a non-fluorinated monomer.

Examples of the fluorolefin include perhalolefins such as tetrafluoroethylene (TFE), perfluorovinyl ether, hexafluoropropylene (HFP), chlorotrifluoroethylene (CTFE), and the like, and non-perfluorolefins such as vinylidene fluoride (VdF), trifluoroethylene, vinyl fluoride, and the like, and VdF, TFE, CTFE, HFP, and the like are preferable.

Furthermore, examples of the non-fluorinated monomer include hydrocarbon-based olefins such as ethylene, propylene, butene, and the like, alkyl vinyl ethers such as cyclohexyl vinyl ether (CHVE), ethyl vinyl ether (EVE), butyl vinyl ether, methyl vinyl ether, and the like, alkenyl vinyl ethers such as polyoxyethylene allyl ether (POEAE), ethyl allyl ether, and the like, reactive α,β-unsaturated group-containing organosilicon compounds such as vinyltrimethoxysilane(VSi), vinyltriethoxysilane, vinyltris(methoxyethoxy)silane, and the like, acrylic esters such as methyl acrylate, ethyl acrylate, and the like, methacrylic esters such as methyl methacrylate, ethyl methacrylate, and the like, vinyl esters such as vinyl acetate, vinyl benzoate, "BEOBA" (trade name, manufactured by Shell Chemical Co., Ltd.), and the like, and alkyl vinyl ether, allyl vinyl ether, vinyl ester, and reactive α,β-unsaturated group-containing organosilicon compounds are preferable.

Among these, those having a high degree of fluorination are preferable, and polytetrafluoroethylene (PTFE), a tetrafluoroethylene-hexafluoropropylene copolymer (FEP), a tetrafluoroethylene-perfluoro(alkyl vinyl ether) copolymer (PFA), an ethylene-tetrafluoroethylene copolymer (ETFE), an ethylene-chlorotrifluoroethylene copolymer (ECTFE), and the like are more preferable. Among these, PTFE, FEP, and PFA are particularly preferable.

As the fluorine-containing resin particles, for example, particles prepared by a method such as emulsion polymerization of fluorinated monomers, and the like (fluorine resin aqueous dispersion) may be used as they are or may be used after washing the particles sufficiently with water.

The average particle diameter of the fluorine-containing resin particles is preferably 0.01 µm or more and 100 µm or less, and particularly preferably 0.03 µm or more and 5 µm or less.

Furthermore, the average particle diameter of the fluorine-containing resin particles refers to a value measured using a laser diffraction-type particle size distribution measurement device LA-700 (manufactured by Horiba, Ltd.).

As the fluorine-containing resin particles, ones that are commercially available may be used, and examples of the PTFE particles include FLUON L173JE (manufactured by Asahi Glass Co., Ltd.), DANIION THV-221 AZ and DANI-ION 9205 (manufactured by Sumitomo 3M Limited), LUBRON L2 and LUBRON L5 (manufactured by Daikin Industries, Ltd.), and the like.

The fluorine-containing resin particles may be those irradiated with laser light having an oscillation wavelength of ultraviolet rays. The laser light irradiated to the fluorine-containing resin particles is not particularly limited, and examples thereof include excimer laser, and the like. As the excimer laser light, ultraviolet laser light having a wavelength of 400 nm or less, and particularly 193 nm or more and 308 nm or less is suitable. In particular, KrF excimer laser light (wavelength: 248 nm), ArF excimer laser light (wavelength: 193 nm), and the like are preferable. Irradiation of excimer laser light is usually carried out at room temperature (25° C.) in air, but may be carried out under an oxygen atmosphere.

Furthermore, the irradiation condition for excimer laser light depends on the type of a fluorine resin and the required degree of surface modification, but general irradiation conditions are as follows.

Fluence: 50 mJ/cm$^2$/pulse or more
Incident energy: 0.1 J/cm$^2$ or more
Number of shots: 100 or less Particularly suitable irradiation conditions that are compatible with for KrF excimer laser light and ArF excimer laser light are as follows.

KrF

Fluence: 100 mJ/cm$^2$/pulse or more and 500 mJ/cm$^2$/pulse or less

Incident energy: 0.2 J/cm$^2$ or more and 2.0 J/cm$^2$ or less

Number of shots: 1 or more and 20 or less

ArF

Fluence: 50 mJ/cm$^2$/pulse or more and 150 mJ/cm$^2$/pulse or less

Incident energy: 0.1 J/cm$^2$ or more and 1.0 J/cm$^2$ or less

Number of shots: 1 or more and 20 or less

In the surface photosensitive layer (the charge transporting layer 2B-2 in the first exemplary embodiment), the content of the fluorine-containing resin particles in the total amount of the solid contents is preferably 1% by weight or more and 20% by weight or less, and more preferably 1% by weight or more and 12% by weight or less.

—Resin which is not Dissolved in at Least One Solvent in Group of Hydroxyl Group-Containing Solvents—

In the fluorine-containing resin particle dispersion and the surface photosensitive layer (the charge transporting layer 2B-2 in the first exemplary embodiment) of the present exemplary embodiment, a resin which is not dissolved in at least one solvent in a group of hydroxyl group-containing solvents (specific resin) is adhered on the surface of the fluorine-containing resin particles. Further, whether the specific resin is dissolved in a solvent in a group of hydroxyl group-containing solvents (solubility) is confirmed according to the above-described test method.

Furthermore, the specific resin preferably has a surfactant action, that is, a substance having a hydrophilic group and a hydrophobic group in the molecule is preferable.

Examples of the resin which is not dissolved in at least one solvent in a group of hydroxyl group-containing solvents (specific resin) include resins formed by polymerization of the following reactive monomers.

Specific examples thereof include a random or block copolymer of an acrylate having a perfluoroalkyl group with a monomer having no fluorine, a methacrylate homopolymer, and a random or block copolymer of an acrylate having a perfluoroalkyl group with a monomer having no fluorine, and a random or block copolymer of a methacrylate with a monomer having no fluorine.

Furthermore, examples of the acrylate having a perfluoroalkyl group include 2,2,2-trifluoroethyl methacrylate, 2,2,3,3,3-pentafluoropropyl methacrylate, 2-(perfluorobutyl) ethyl methacrylate, 3-(perfluorobutyl)-2-hydroxypropyl methacrylate, 2-(perfluorohexyl)ethyl methacrylate, 3-perfluorohexyl-2-hydroxypropyl methacrylate, 1H,1H,3H-tetrafluoropropyl methacrylate, 1H,1H,5H-octafluoropentylmethacrylate, 1H,1H,7H-dodecafluoroheptylmethacrylate, 1H-1-(trifluoromethyl)trifluoroethyl methacrylate, 1H,1H,3H-hexafluorobutyl methacrylate, 2,2,2-trifluoroethyl acrylate, 2,2,3,3,3-pentafluoropropyl acrylate, 2-(perfluorobutyl) ethyl acrylate, 3-(perfluorobutyl)-2-hydroxypropyl acrylate, 2-(perfluorohexyl)ethyl acrylate, 3-perfluorohexyl-2-hydroxypropyl acrylate, 1H,1H,3H-tetrafluoropropyl acrylate, 1H,1H,5H-octafluoropentylacrylate, 1H,1H,7H-dodecafluoroheptylacrylate, 1H-1-(trifluoromethyl) trifluoroethyl acrylate, and 1H,1H,3H-hexafluorobutyl acrylate.

Furthermore, examples of the monomer having no fluorine include isobutyl acrylate, t-butyl acrylate, isooctyl acrylate, lauryl acrylate, stearyl acrylate, isobornylacrylate, cyclohexyl acrylate, 2-methoxyethyl acrylate, methoxytriethylene glycol acrylate, 2-ethoxyethyl acrylate, tetrahydrofurfuryl acrylate, benzyl acrylate, ethylcarbitol acrylate, phenoxyethyl acrylate, 2-hydroxyacrylate, 2-hydroxypropyl acrylate, 4-hydroxybutyl acrylate, methoxy polyethylene glycol acrylate, methoxy polyethylene glycol methacrylate, phenoxy polyethylene glycol acrylate, phenoxy polyethylene glycol methacrylate, hydroxyethyl o-phenyl phenol acrylate, o-phenylphenol glycidyl ether acrylate, ethylene glycol monoacrylate, diethylene glycol monoacrylate, triethylene glycol monoacrylate, hexaethylene glycol monoacrylate, ethylene glycol monomethacrylate, diethylene glycol monomethacrylate, triethylene glycol monomethacrylate, and hexaethylene glycol monomethacrylate.

Furthermore, other examples thereof include the block or branch polymers disclosed in the specifications of U.S. Pat. No. 5,637,142, Japanese Patent Nos. 4251662 and 4251663, and the like.

In addition, the weight average molecular weight of the specific resin is preferably 100 or more and 50000 or less.

Concerning a method for adhering the specific resin on the surface of the fluorine-containing resin particles, the specific resin may be directly adhered on the surface of the fluorine-containing resin particles (physical bond), or the monomers may be first adsorbed on the surface of the fluorine-containing resin particles and then subjected to polymerization to form a specific resin on the surface of the fluorine-containing resin particles (chemical bond).

—Group of Hydroxyl Group-Containing Solvents—

In the fluorine-containing resin particle dispersion and the surface photosensitive layer according to the present exemplary embodiment (the charge transporting layer 2B-2 in the first exemplary embodiment), at least one solvent in a group of hydroxyl group-containing solvents including an alcohol-based solvent having 1 to 10 carbon atoms, containing no aromatic ring in the molecule structure, and water-based medium is used as a solvent for dispersing the fluorine-containing resin particles having the specific resin adhered on the surface thereof.

Examples of the solvent belonging to the group of hydroxyl group-containing solvents include water-based media such as water and the like, non-branched, branched, and cyclic aliphatic alcohols such as methanol, ethanol, propanol, t-butanol, cyclohexanol, furfuryl alcohol, and the like, glycols such as ethylene glycol, propylene glycol, and the like, cellosolves such as methyl cellosolve, and the like, and aromatics such as phenol, benzyl alcohol, and the like. Further, examples of the solvent include fluorine-containing alcohols such as 2,2,2-trifluoroethanol, 2-fluoroethanol, 2,2,3,3,3-pentafluoropropanol, 1,1,3-trihydrotetrafluoropentanol, 2-hydrohexafluoro-2-propanol, 1,1,3-trihydrohexafluorobutanol, 1,1,5-trihydrotetrafluoropentanol, 2,2-bis(trifluoromethyl)propanol, 2-(perfluorobutyl)ethanol, 2-perfluoropropoxy-2,3,3,3-tetrafluoropropanol, 3-perfluorobutyl-2-iodopropanol, 2-(perfluoro-3-methylbutyl)ethanol, 1,1,7-trihydrododecafluoroheptanol, 6-(perfluoroethyl) hexanol, 1,1-dihydroheptafluorobutanol, 2-(perfluorohexyl) ethanol, 3-(perfluorohexyl)propanol, 3-perfluorohexyl-2-iodopropanol, 6-(perfluoro-1-methylethyl)hexanol, 2-(perfluoro-5-methylhexyl)ethanol, 1,1,9-trihydrohexadecafluorononanol, 6-(perfluorobutyl)hexanol, 2-(perfluorooctyl)ethanol, 3-(perfluoro-5-methylhexyl)-2-iodopropanol, 3-(perfluorooctyl)propanol, 3-perfluorooctyl-2-iodopropanol, 6-(perfluoro-3-methylbutyl)hexanol, 2-(perfluoro-7-methyloctyl)ethanol, 6-(perfluorohexyl)hexanol, 2-(perfluorodecyl)ethanol, 3-(perfluoro-7-methyloctyl)-2-iodopropanol, 6-(perfluoro-5-methylhexyl)hexanol, 2-(perfluoro-9-methyldecyl)ethanol, 6-(perfluorooctyl) hexanol, 6-(perfluoro-7-methyldecyl)ethanol, and the like.

Furthermore, the boiling point in view of a drying time is preferably 150° C. or lower.

—Surfactant—

In the fluorine-containing resin particle dispersion and the surface photosensitive layer according to the present exemplary embodiment (the charge transporting layer 2B-2 in the first exemplary embodiment), a surfactant may be added. However, the amount thereof is desirably extremely little, and preferably 0 part by weight or more and 0.1 part by weight or less, more preferably 0 part by weight or more and 0.05 part by weight or less, and particularly preferably 0 part by weight or more and 0.03 part by weight or less, based on 1 part by weight of the fluorine-containing resin particles.

As the surfactant, nonionic surfactants are preferable, and examples thereof include polyoxyethylene alkyl ethers, polyoxyethylene alkyl phenyl ethers, polyoxyethylene alkyl esters, sorbitan alkyl esters, polyoxyethylene sorbitan alkyl esters, glycerin esters, fluorinated surfactants (fluorine-containing surfactants) and derivatives thereof, and the like.

Specific examples of the polyoxyethylenes include EMULGEN 707 (manufactured by Kao Corporation), NAROACTY CL-70 and NAROACTY CL-85 (manufactured by Sanyo Chemical Industries, Ltd.), LEOCOL TD-120 (manufactured by Lion Corporation), and the like, and specific examples of the fluorinated surfactant include SURFLON S-611 and SURFLON S-385 (manufactured by AGC Seimi Chemical Co., Ltd.), FTERGENT 730FL and FTERGENT 750FL (manufactured by NEOS Co., Ltd.), PF-636 and PF-6520 (manufactured by Kitamura Chemicals Co., Ltd.), MEGAFACE EXP, TF-1507, MEGAFACE EXP, and TF-1535 (manufactured by DIC), FC-4430 and FC-4432 (manufactured by 3M Corp.), and the like.

—Preparation of Fluorine-Containing Resin Particle Dispersion—

When the fluorine-containing resin particle dispersion and the surface photosensitive layer according to the present exemplary embodiment (the charge transporting layer 2B-2 in the first exemplary embodiment) is formed, a fluorine-containing resin particle dispersion in which the fluorine-containing resin particles having the specific resin adhered on the surface thereof is dispersed in at least one solvent selected from the solvents, in which the specific resin is not dissolved, in a group of hydroxyl group-containing solvents, is prepared in the present exemplary embodiment.

Here, the method for preparing the fluorine-containing resin particle dispersion is described. The preparation method is not particularly limited, but examples thereof include the following three methods.

(Preparation Method 1)

Preparation method including each of the following steps.

Dissolution Step

A resin which is not dissolved in at least one solvent in a group of hydroxyl group-containing solvents including an alcohol-based solvent having 1 to 10 carbon atoms, containing no aromatic ring in the molecule structure, and a water-based medium (specific resin) is dissolved in another solvent in which the resin may be dissolved.

Adsorption Step

The fluorine-containing resin particles are brought into contact with the resin to adsorb the resin on the surface of the fluorine-containing resin particles.

Separation Step

The fluorine-containing resin particles having the resin adsorbed on the surface thereof are separated from the other solvent.

Dispersion Step

By the preparation method 1, in which the separated fluorine-containing resin particles are dispersed in at least one solvent selected from the solvents in which the resin is not dissolved, in the group of hydroxyl group-containing solvents, a dispersion in which the fluorine-containing resin particles having the resin physically adsorbed on the surface thereof are dispersed may be obtained.

(Preparation Method 2)

Preparation Method Including Each of the Following Steps.

Dissolution Step

A reactive monomer which is a raw material for a resin which is not dissolved in at least one solvent in a group of hydroxyl group-containing solvents including an alcohol-based solvent having 1 to 10 carbon atoms, containing no aromatic ring in the molecule structure, and a water-based medium (specific resin) is dissolved in another solvent in which the resin may be dissolved.

Adsorption Step

The fluorine-containing resin particles are brought into contact with the monomer to adsorb the monomer onto the surface of the fluorine-containing resin particles.

Polymerization Step

The monomer is polymerized to form a resin on the surface of the fluorine-containing resin particles.

Separation Step

The fluorine-containing resin particles having the resin adsorbed on the surface thereof are separated from the other solvent.

Dispersion Step

By the preparation method 2, in which the separated fluorine-containing resin particles are dispersed in at least one solvent selected from the solvents in which the resin is not dissolved, in the group of hydroxyl group-containing solvents, a dispersion in which the fluorine-containing resin particles having the reactive monomer chemically polymerized and thus having the resin chemically bonded on the surface thereof are dispersed may be obtained.

(Preparation Method 3)

Preparation Method Including Each of the Following Steps.

Dissolution Step

A reactive monomer which is a raw material for a resin which is not dissolved in at least one solvent in a group of hydroxyl group-containing solvents including an alcohol-based solvent having 1 to 10 carbon atoms, containing no aromatic ring in the molecule structure, and a water-based medium is dissolved in at least one solvent selected from the solvents in which the resin is not dissolved and the monomer may be dissolved, in the group of hydroxyl group-containing solvents.

Adsorption Step

The fluorine-containing resin particles are brought into contact with the monomer to adsorb the monomer onto the surface of the fluorine-containing resin particles.

Polymerization Step

The monomer is polymerized to form a resin on the surface of the fluorine-containing resin particles.

Furthermore, since in the fluorine-containing resin particle dispersion obtained by the (Preparation Method 1) and (Preparation Method 2), the specific resin is adsorbed on the surface of the fluorine-containing resin particles and separated from the other solvent, and then dispersed again in the solvent in a group of hydroxyl group-containing solvents, a dispersion in which the specific resin not adhered on the fluorine-containing resin particles (hereinafter referred to as a "released resin") is not present or the presence of the released resin is extremely inhibited is obtained.

If the released resin is present in the fluorine-containing resin particle dispersion, this released resin is particularly susceptible to the effect of humidity, and variance of the characteristics in the dispersion easily occurs. However, it is presumed that by the method, since presence of the released resin which is particularly susceptible to the effect of the humidity is easily inhibited, a fluorine-containing resin particle dispersion having excellent long-term weather resistance and excellent dispersibility is obtained.

[Method for Confirmation of Presence or Absence of Free Resin]

Here, for the method for confirming the presence of the released resin in the fluorine-containing resin particle dispersion (presence or absence of dissociation of the resin), the presence may be easily examined by measuring the surface tension of the solvent. That is, the surface tension (STs(mN/m)) in the solvent alone and the surface tension (STp(mN/m)) of the solvent after dispersion of the fluorine-containing resin particles having the specific resin adhered are measured with a commercially available surface tensiometer (in the present specification, surface tensiometer: DY-700 manufactured by Kyowa Interface Science Co., Ltd. is used), and $|STs-STp|/STs \leq 0.05$ indicates that the released resin is absent.

[Preparation According to Preparation Method 1]

Dissolution Step and Adsorption Step

As the other solvent in which the specific resin may be dissolved, any solvent may be used as long as it has a solubility with the specific resin of 10% by weight or more. Further, the solubility is calculated by adding the specific resin to another solvent, measuring the total weight of the specific resin and the other solvent, followed by stirring treatment for a sufficient time and then filtration, measuring the weight of the liquid, and calculating the weight of the non-dissolved resin from the total weight before stirring and the weight of the filtrate after filtration.

A suitable other solvent varies depending on the resin, and examples thereof include aromatics such as toluene, xylene, and the like, ketones such as acetone, methyl ethyl ketone, methyl isobutyl ketone, cyclohexanone, and the like, esters such as ethyl acetate, butyl acetate, and the like, ethers such as tetrahydrofuran, dioxane, and the like, hydrocarbons such as hexane, octane, cyclohexane, and the like, amides such as N,N-dimethylformamide, and the like, and sulfoxides such as dimethyl sulfoxide, and the like. Further, the solvent is preferably mixed at an arbitrary ratio with a solvent in a group of hydroxyl group-containing solvents, and preferably has a boiling point of 180° C. or lower, and more preferably 150° C. or lower.

The proportion of the other solvent is preferably 1 part by weight or more and 1000 parts by weight or less, more preferably 2 parts by weight or more and 800 parts by weight or less, and particularly preferably 5 parts by weight or more and 700 parts by weight or less, based on 1 part by weight of the specific resin.

The amount of the specific resin depends on the adsorptivity to the surface of the fluorine-containing resin particles, but it is preferably 0.001 part by weight or more and 10 parts by weight or less, more preferably 0.005 part by weight or more and 8 parts by weight or less, and particularly preferably 0.01 part by weight or more and 5 parts by weight or less, based on 1 part by weight of the fluorine-containing resin particles.

For the treatment method, it is desirable that fluorine-containing resin particles are added to another solvent in which the specific resin is dissolved, and the mixture is brought into contact while performing stirring, ultrasonic wave irradiation, shaking using a paint shaker or the like, and dispersion using a homogenizer or the like, at preferably 0° C. or higher and the boiling point of the other solvent or lower, more preferably 10° C. or higher and 100° C. or lower, and particularly preferably 10° C. or higher and 50° C. or lower.

Furthermore, the contact time is preferably 5 minutes or longer and 48 hours or less, and more preferably 10 minutes or longer and 24 hours or less. It is preferable to complete the adsorption at a time when there is no change in the surface tension, while the change in the surface tension of the solvent is measured using a surface tensiometer or the like.

Separation Step and Dispersion Step

Examples of the method for separating the fluorine-containing resin particles having the specific resin adsorbed thereon from the other solvent after the adsorption step include decantation, filtration, centrifugation, and the like, and excess specific resin that is not adsorbed on the fluorine-containing resin particles are separated by this operation. These fluorine-containing resin particles may be dried, but are more preferably added to at least one solvent selected from the solvents, in which the resin is not dissolved, in a group of hydroxyl group-containing solvents without drying. Thus, fluorine-containing resin particle dispersions in which the presence of the released resins is inhibited may be obtained.

[Preparation According to Preparation Method 2]

Dissolution Step and Adsorption Step

As the other solvent in which the specific resin may be dissolved, the solvent used in the preparation method 1 is used. Further, as the reactive monomer, any monomer material having a reactive group such as an acryl group, a methacryl group, a styryl group, and the like is suitably used, and for example, the reactive monomers listed in the above-described section, "—Resin Which Is Not Dissolved in at Least One Solvent in Group of Hydroxyl Group-Containing Solvents—", are used.

Furthermore, examples of the specific combination of the specific resin (I) synthesized by the reactive monomers used in the preparation method 2, the solvent (II), in which the specific resin is not dissolved, in a group of hydroxyl group-containing solvents, and another solvent (III) in which the specific resin may be dissolved include the following combinations (described in the order of (I), (II), and (III)).

Copolymer of hydroxyethyl methacrylate and 2-(perfluorohexyl)ethyl methacrylate, cyclopentanol, toluene Copolymer of 2-(perfluorohexyl)ethyl acrylate and hexaethylene glycol monoacrylate, n-butanol, tetrahydrofuran Copolymer of 2-(perfluorobutyl)ethyl methacrylate, styrene, and hexaethylene glycol monoacrylate, n-propanol, tetrahydrofuran The amount of the other solvent is preferably 1 part by weight or more and 1000 parts by weight or less, more preferably 2 parts by weight or more and 800 parts by weight or less, and particularly preferably 5 parts by weight or more and 700 parts by weight or less, based on 1 part by weight of the reactive monomer which is a raw material for the specific resin.

The amount of the reactive monomer depends on the adsorptivity on the surface of the fluorine-containing resin particles, but the amount of the reactive monomer which is a raw material for the specific resin is preferably 0.001 part by weight or more and 10 parts by weight or less, more preferably 0.005 part by weight or more and 8 parts by weight or less, and particularly preferably 0.01 part by weight or more and 5 parts by weight or less, based on 1 part by weight of the fluorine-containing resin particles.

Polymerization Step

As the reaction method, thermal radical polymerization is preferable, and it is preferable to add fluorine-containing resin particles and a polymerization initiator to the other solvent in which the reactive monomers are dissolved, and the mixture is preferably reacted under stirring at 50° C. or higher and 150° C. or lower. The reaction is preferably carried out under the atmosphere of inert gases such as nitrogen and the like.

The reaction time is preferably 30 minutes or more and 24 hours or less, and more preferably 1 hour or more and 10 hours or less.

As the polymerization initiator, for example, commercially available catalysts shown below are used.

Examples thereof include azo-based initiators such as V-30, V-40, V-59, V601, V65, V-70, VF-096, Vam-110, and Vam-111 (manufactured by Wako Pure Chemical Industries, Ltd.), OTAzo-15, OTazo-30, AIBM, AMBN, ADVN, and ACVA (manufactured by Otsuka Chemical Co., Ltd.), and the like, and PERTETRA A, PERHEXA HC, PERHEXA C, PERHEXA V, PERHEXA 22, PERHEXA MC, PERBUTYL H, PERCUMYL H, PERCUMYL P, PERMENTA H, PEROCTA H, PERBUTYL C, PERBUTYL D, PERHEXYL D, PEROYL IB, PEROYL 355, PEROYL L, PEROYL SA, NYPER BW, NYPER BMT-K40/M, PEROYL IPP, PEROYL NPP, PEROYL TCP, PEROYL OPP, PEROYL SBP, PERCUMYL ND, PEROCTA ND, PERHEXYL ND, PERBUTYL ND, PERBUTYL NHP, PERHEXYL PV, PERBUTYL PV, PERHEXA 250, PEROCTA O, PERHEXYL O, PERBUTYL O, PERBUTYL L, PERBUTYL 355, PERHEXYL I, PERBUTYL I, PERBUTYL E, PERHEXA 25Z, PERBUTYL A, PERHEXYL Z, PERBUTYL ZT, and PERBUTYL Z (manufactured by NOF Corporation), and the like.

Separation Step and Dispersion Step

Examples of the method for separating the fluorine-containing resin particles having the specific resin adsorbed thereon from the solvent after the polymerization step include decantation, filtration, centrifugation, and the like, and excess specific resins that are not adsorbed on the fluorine-containing resin particles are separated by this operation. These fluorine-containing resin particles may be dried, but are more preferably added to at least one solvent selected from the solvents, in which the resin is not dissolved, in a group of hydroxyl group-containing solvents without drying. Thus, fluorine-containing resin particle dispersions in which the presence of the released resins is inhibited may be obtained.

[Preparation According to Preparation Method 3]

Dissolution Step and Adsorption Step

As the reactive monomer, the reactive monomers listed in the above-described section, "—Resin Which Is Not Dissolved in at Least One Solvent in Group of Hydroxyl Group-Containing Solvents—", are used.

The amount of the solvent in a group of hydroxyl group-containing solvents is preferably 1 part by weight or more and 1000 parts by weight or less, more preferably 2 parts by weight or more and 800 parts by weight or less, and particularly preferably 5 parts by weight or more and 700 parts by weight or less, based on 1 part by weight of the reactive monomer which is a raw material for the specific resin.

The amount of the reactive monomer depends on the adsorptivity on the surface of the fluorine-containing resin particles, but the amount of the reactive monomer which is a raw material for the specific resin is preferably 0.001 part by weight or more and 10 parts by weight or less, more preferably 0.005 part by weight or more and 8 parts by weight or less, and particularly preferably 0.01 part by weight or more and 5 parts by weight or less, based on 1 part by weight of the fluorine-containing resin particles.

Polymerization Step

As the reaction method, thermal radical polymerization is preferable, and it is preferable to add fluorine-containing resin particles and a polymerization initiator to the other solvent in which the reactive monomers are dissolved, and the mixture is preferably reacted under stirring at 50° C. or higher and 150° C. or lower. The reaction is preferably carried out under the atmosphere of inert gases such as nitrogen and the like.

As the reaction time or polymerization initiator used, the reaction time or polymerization initiator in the preparation method 2 above is employed.

<Coating Liquid That Contains Fluorine-Containing Resin Particles, Coating Film That Contains Fluorine-Containing Resin Particles, and Molded Body>

When the coating liquid which contains fluorine-containing resin particles (hereinafter also simply referred to as a "coating") is prepared, in the fluorine-containing resin particle dispersion, a polymer which may be dissolved in the solvent dissolved in the dispersion (that is, at least one solvent in which the specific resin is not dissolved, in a group of the hydroxyl group-containing solvents) or a monomer which may be dissolved in a solvent (that is at least one solvent in which the specific resin is not dissolved, in a group of the hydroxyl group-containing solvents) as a reactive monomer which is a raw material for the polymer, is dissolved. In addition, for example, additives that are generally used in coatings, such as a pigment, a thickener, a dispersant, a defoamer, an antifreeze agent, a film-forming aid, an ultraviolet ray absorber, an antioxidant, and the like may be blended.

This coating is used as a surface protective coating agent for an inorganic substrate such as concrete, slate, an ALC plate, and the like and a metal substrate. It is also used as a coating agent for coated paper, or the like. Further, it is also used for an aesthetic coating agent by blending synthetic resin beads, natural stone, or the like for removing gloss. In addition, it is also used for an aqueous coating for exterior and/or interior decoration in intermediate- or low-rise buildings.

Furthermore, in the coating liquid which contains fluorine-containing resin particles, the blending ratio of the solid components in the fluorine-containing resin particle dispersion according to the present exemplary embodiment varies depending on the type of the coating liquid, the coating method, or the like, but it may be 5% by weight or more and 95% by weight or less, and preferably 20% by weight or more and 90% by weight or less, based on the coating liquid.

As a coating method for the coating, conventionally known coating methods are employed. For the coating, conventionally known coaters such as a brush, a roller, a roll coater, an air spray, an airless spray, an electrostatic coater, a dip coater, an electrostatic coater, and the like are used.

The coating is not limited to metals such as iron, aluminum, copper, or alloys thereof, and the like, but may be applied to inorganic materials such as glass, cement, concrete, and the like, resins such as FRP, acrylic resins, vinyl chloride, polycarbonate resins, polyurethane resins, and the like, or other various materials such as wood, fibers, and the like. Further, the substrate may be subjected to a pretreatment such as application of primers such as known aqueous resin emulsion coatings, solvent-type coatings, and the like, or a surface treatment, or may be subjected to undercoating or precoating, and then to painting of the coating.

For painting of the coating, a clear coating is applied on a substrate having aesthetics such as various known irregularities or color patterns, and the like, or an enamel coating may be applied. The coating film is usually dried at 5° C. or higher and 300° C. or lower for 30 seconds or more and 1 week or less, and cured. The film thickness of the coating film is not particularly limited, but it is usually preferably 1 μm or more and 200 μm or less, more preferably 5 μm or more and 100 μm or less, and particularly preferably 10 μm or more and 50 μm or less.

The coating material thus obtained may be used in a wide range of applications. For example, it has applications in, for example, interior and exterior materials for electrical appliances (microwaves, toasters, refrigerators, washing machines, hair-dryers, televisions, VCRs, amplifiers, radios, electric kettles, rice cooker machines, radio cassettes, cassettes, compact disc players, video cameras, and the like), interior and exterior materials for air conditioners such as indoor units, outdoor units, ventilators, and ducts, air purifiers, heaters, and the like, lighting fixtures such as fluorescent lamps, chandeliers, reflecting plates, and the like, furniture, machinery parts, ornaments, combs, eye glasses frames, natural fibers, synthetic fibers (filamentous ones and fabrics derived therefrom), interior and exterior materials for office equipment (telephones, fax machines, copiers (including roles), cameras, overhead projectors, projector life, clocks, slide projectors, desks, bookcases, lockers, filing cabinets, chairs, bookends, electronic whiteboards, and the like), and for painting cars (wheels, mirrors, molding, door knobs, license plate, handles, instrument panels, and the like), or kitchen utensils (range hoods, sinks, stoves, knives, cutting boards, faucets, gas ranges, hoods, and the like), indoor painting such as partitions, bath units, shutters, blinds, curtain rails, accordion curtain walls, ceilings, floors, and the like, and for exteriors, general home exterior materials and exterior building materials such as external walls, railings, gates, shutters, and the like, exterior construction materials such as ceramic-based sizing, foamed concrete panels, concrete panels, aluminum curtain wall, steel, galvanized steel, stainless steel, PVC sheets, and the like, window glass, or other wide ranges of applications.

—Other Compositions—

The charge transporting layer 2B-2 in the first exemplary embodiment is a material for exhibiting the original function as a charge transporting layer in addition to the components, and preferably includes a charge transporting material and the like. Furthermore, in order to control the characteristics, other additives may be included.

As the charge transporting material, any one of a charge transporting material having no reactive group and a charge transporting material having a reactive group may be used.

(Charge Transporting Material Having No Reactive Group)

In the charge transporting layer 2B-2 in the first exemplary embodiment, one having no reactive group is used as a charge transporting material.

Examples of the charge transporting material having no reactive group include known hole transporting compounds, for example, electron transporting compounds including quinone-based compounds such as p-benzoquinone, chloranil, bromanil, anthraquinone, and the like, tetracyanoquinodimethane-based compounds, fluorenone-based compounds such as 2,4,7-trinitrofluorenone and the like, xanthone-based compounds, benzophenone-based compounds, cyanovinyl-based compounds, ethylene-based compounds, and the like, triarylamine-based compounds, benzidine-based compounds, arylalkane-based compounds, aryl-substituted ethylene-based compounds, stilbene-based compounds, anthracene-based compounds, hydrazone-based compounds, and the like.

More preferably, a triarylamine derivative or a benzidine derivative represented by the following structural formula (a-1) or (a-2) is preferable.

(a-1)

(in the formula, $R^9$ represents a hydrogen atom or a methyl group; 1 represents 1 or 2; and $Ar^6$ and $Ar^7$ represent a substituted or unsubstituted aryl group).

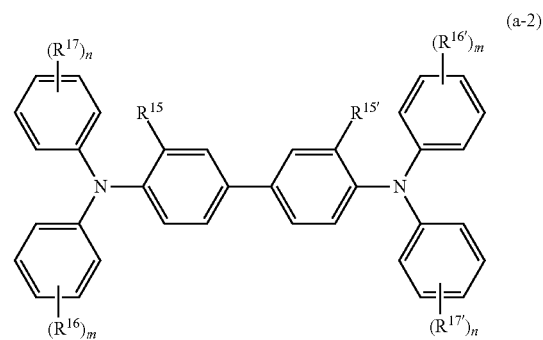

(a-2)

(in the formula, $R^{15}$ and $R^{15'}$ may be the same as or different from each other, and each independently represent a hydrogen atom, a halogen atom, an alkyl group having 1 to 5 carbon atoms, or an alkoxy group having 1 to 5 carbon atoms; $R^{16}$, $R^{16'}$, $R^{17}$, and $R^{17'}$ may be the same as or different from each other, and each independently represent a hydrogen atom, a halogen atom, an alkyl group having 1 to 5 carbon atoms, an alkoxy group having 1 to 5 carbon atoms, an amino group substituted with an alkyl group having 1 or 2 carbon atoms, or a substituted or unsubstituted aryl group; and m and n represent an integer of 0 to 2).

Furthermore, a polymer charge transporting material which does not have a reactive group such as poly-N-vinylcarbazole, polysilane, and the like may be used. Specifically, among known non-crosslinkable polymer charge transporting materials, those polyester-based polymer charge transporting materials as disclosed in JP-A-8-176293, JP-A-8-208820, and the like are particularly preferable. The polymer charge transporting material itself may be formed into a film or may be mixed with the binding resin mentioned below and formed into a film. These charge transporting materials may be used singly or as a mixture of two or more thereof, and are not limited to these materials.

When the electrophotographic photoreceptor according to the first exemplary embodiment is prepared, in the coating liquid for forming the charge transporting layer 2B-2 which is a surface photosensitive layer, the amount of the charge transporting material is preferably 15% by weight or more and 75% by weight or less, and more preferably 25% by weight or more and 60% by weight or less, based on the total amount of the solid contents in the coating liquid, in the case of using the charge transporting material having no reactive group.

(Charge Transporting Material Having Reactive Group)

As the charge transporting material having a reactive group, any material may be used as long as it is a charge transporting material having a polymerizable group, and examples of the polymerizable group preferably include at least one selected from an acryl group, a methacryl group, and a styryl group, and derivatives thereof. Further, examples of more preferred structures include a compound represented by the following general formula (1). Hereinbelow, the charge transporting material having a reactive group will be described typically with reference to the compound represented by the following general formula (1).

General Formula (1)

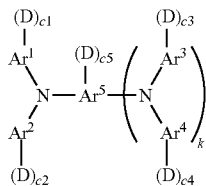

(in the general formula (1), $Ar^1$ to $Ar^4$ may be the same as or different from one other and each independently represent a substituted or unsubstituted aryl group; $Ar^5$ represents a substituted or unsubstituted aryl group, or a substituted or unsubstituted arylene group; D represents a side chain containing a reactive group; c1 to c5 each independently represent an integer of 0 or more and 2 or less; k represents 0 or 1; and the total number of D's is 1 or more and 6 or less).

In the general formula (1), as D representing a side chain including a reactive group, a group having a structure as follows is more preferable:

—$(CH_2)_d$—$(O$—$(CH_2)_f)_e$—O—CO—C(R')=$CH_2$;

further, in the group, R' represents a hydrogen atom or —$CH_3$; d represents an integer of 0 or more and 5 or less; f represents an integer of 1 or more and 5 or less; and e represents an integer of 0 or 1.

In the general formula (1), $Ar^1$ to $Ar^4$ each independently represent a substituted or unsubstituted aryl group. $Ar^1$ to $Ar^4$ may be the same as or different from one another.

Here, examples of the substituent in the substituted aryl group include an alkyl or alkoxy group having 1 to 4 carbon atoms, a substituted or unsubstituted aryl group having 6 to 10 carbon atoms, and the like, in addition to the side groups containing a D: reactive group.

It is preferable that $Ar^1$ to $Ar^4$ each represent any of the following formulae (1) to (7). Further, the following formulae (1) to (7) are shown together with "-(D)$_c$" which generically represents "-(D)$_{c1}$" to "-(D)$_{c4}$" which may be respectively linked to $Ar^1$ to $Ar^4$.

(1)

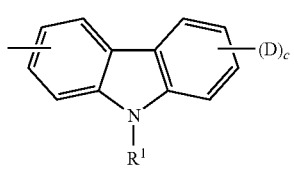

(2)

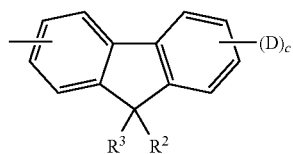

(3)

(4)

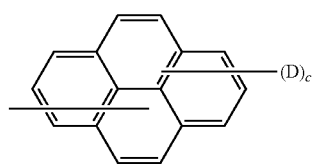

(5)

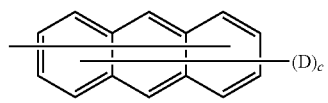

(6)

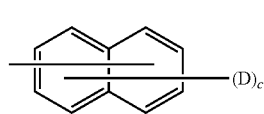

(7)

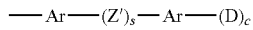

(in the formulae (1) to (7), $R^4$ represents one selected from the group consisting of a hydrogen atom, an alkyl group having 1 to 4 carbon atoms, a phenyl group substituted with an alkyl group having 1 to 4 carbon atoms or an alkoxy group having 1 to 4 carbon atoms, an unsubstituted phenyl group, and an aralkyl group having 7 to 10 carbon atoms; $R^2$ to $R^4$ each independently represent one selected from the group consisting of a hydrogen atom, an alkyl group having 1 to 4 carbon atoms, an alkoxy group having 1 to 4 carbon atoms, a phenyl group substituted with an alkoxy group having 1 to 4 carbon atoms, an unsubstituted phenyl group, an aralkyl group having 7 to carbon atoms, and a halogen atom; Ar represents a substituted or unsubstituted arylene group; Z' represents a bivalent organic linking group; D represents a side chain containing a reactive group; c represents an integer of 0 or more and 2 or less; s represents 0 or 1; and t represents an integer of 0 to 3).

Here, the "Ar" shown in the formula (7) is preferably one represented by the following structural formula (8) or (9).

(8)

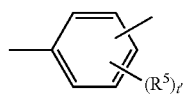

(9)

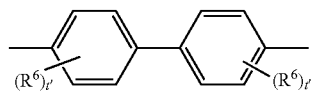

(in the formulae (8) and (9), $R^5$ and $R^6$ each independently represent one selected from the group consisting of a hydrogen atom, an alkyl group having 1 to 4 carbon atoms, an alkoxy group having 1 to 4 carbon atoms, a phenyl group substituted with an alkyl group having 1 to 4 carbon atoms, an alkoxy group having 1 to 4 carbon atoms or an unsubstituted phenyl group, an aralkyl group having to 10 carbon atoms, and a halogen atom; and each t' represents an integer of 1 or more and 3 or less).

Furthermore, in the formula (7), Z' represents a bivalent organic linking group, and preferably any of those represented by the following formulae (10) to (17).

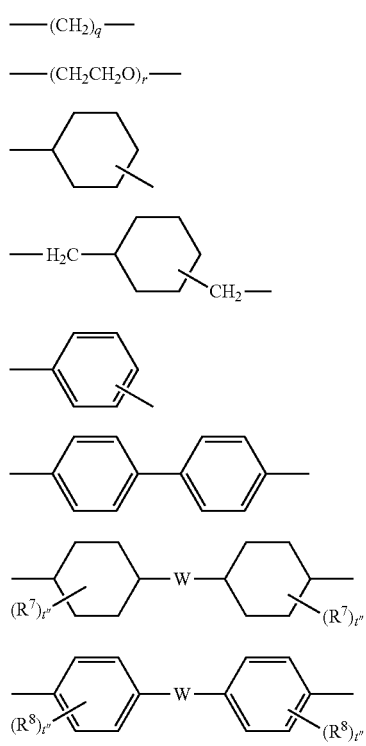

(in the formulae (10) to (17), $R^7$ and $R^8$ each independently represent one selected from the group consisting of a hydrogen atom, an alkyl group having 1 to 4 carbon atoms, an alkoxy group having 1 to 4 carbon atoms, a phenyl group substituted with an alkyl group having 1 to 4 carbon atoms or an alkoxy group having 1 to 4 carbon atoms, an unsubstituted phenyl group, an aralkyl group having 7 to 10 carbon atoms, and a halogen atom; W represents a bivalent group; q and r each independently represent an integer of 1 or more and 10 or less; and each t" represents an integer of 0 or more and 3 or less).

W in the formulae (16) and (17) is preferably any of the bivalent groups represented by the following (18) to (26). In the formula (25), u represents an integer of 0 or more and 3 or less.

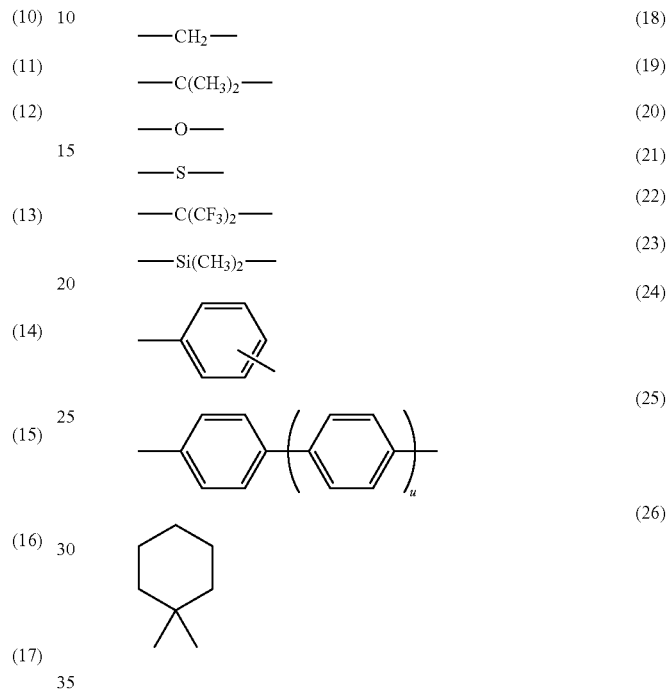

Furthermore, in the general formula (1), $Ar^5$ represents a substituted or unsubstituted aryl group when k is 0, and examples of the aryl group include the aryl groups as exemplified in the description of $Ar^1$ to $Ar^4$. $Ar^5$ represents a substituted or unsubstituted arylene group when k is 1, and examples of the arylene group include arylene groups obtained by removing one hydrogen atom from the aryl groups as exemplified in the description of $Ar^1$ to $Ar^4$.

Specific examples of the compound represented by the general formula (1) are shown below. Further, the compound represented by the general formula (1) is by no means limited to these.

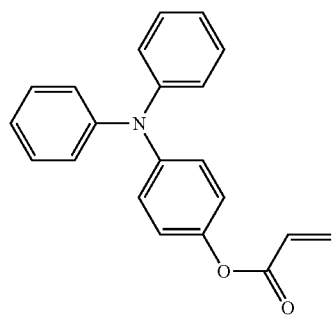

I-1

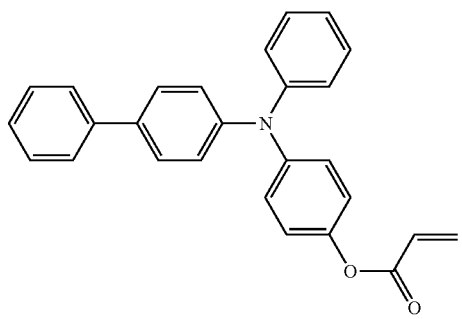

I-2

-continued
I-3
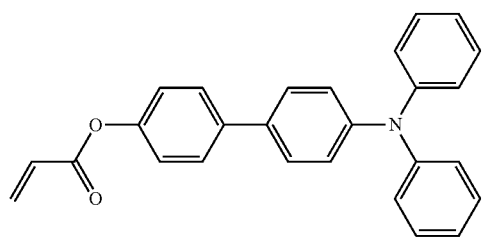
I-4
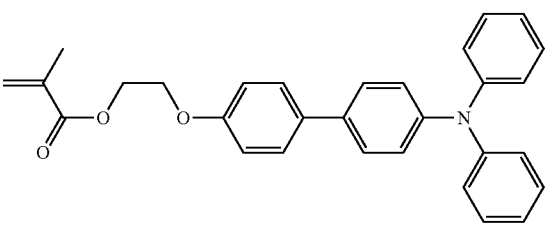
I-5
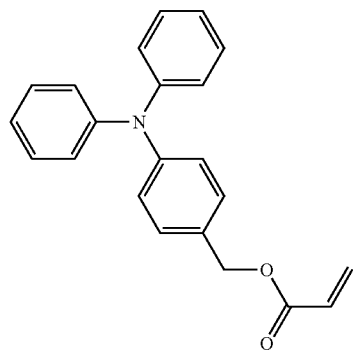
I-6
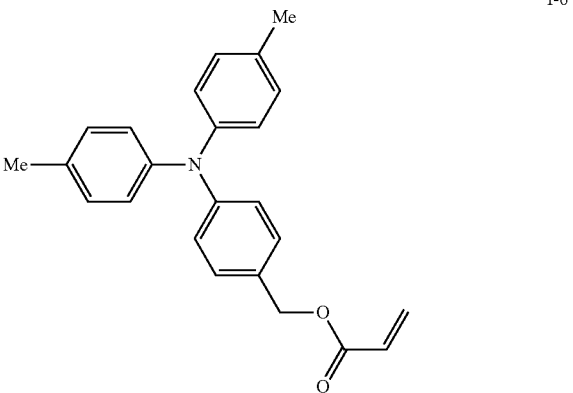
I-7
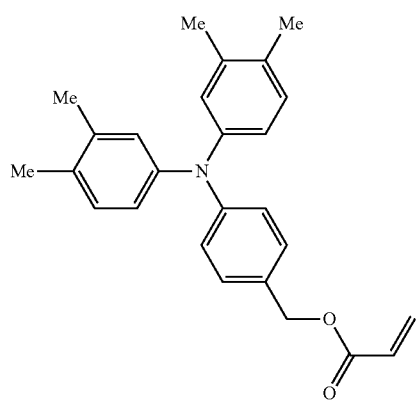
I-8
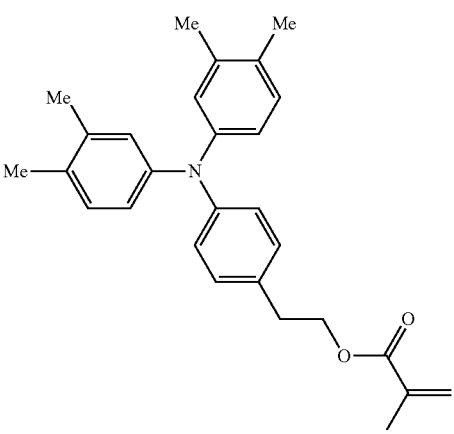
I-9
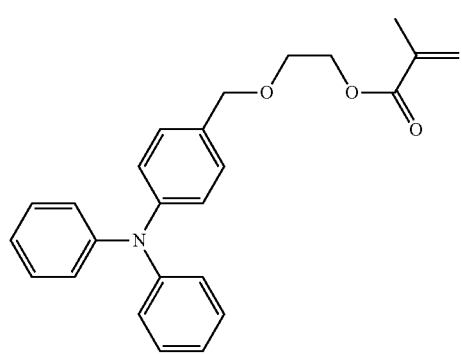
I-10
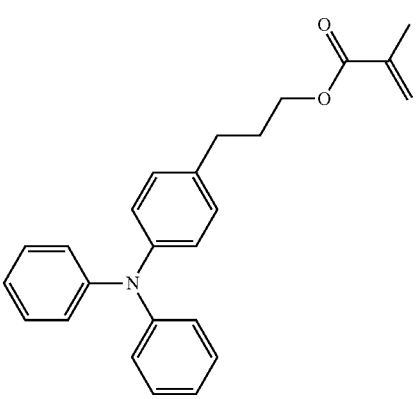

-continued
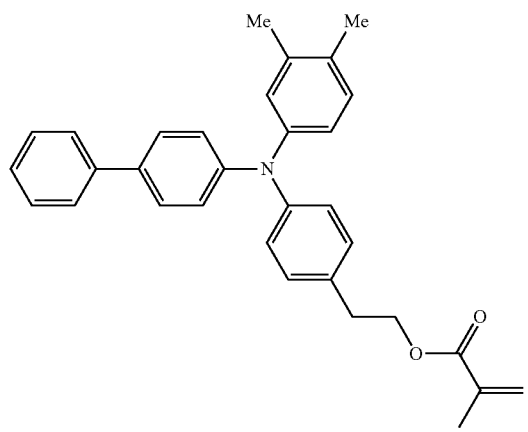
I-11
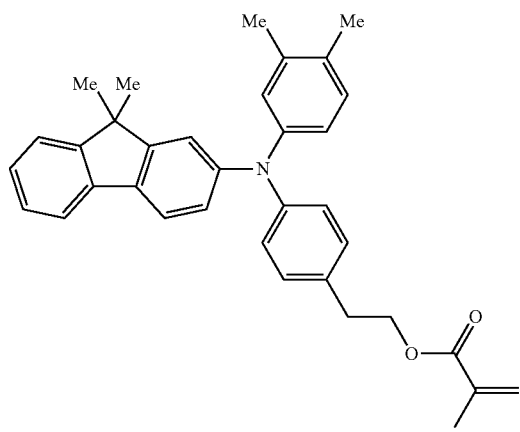
I-12
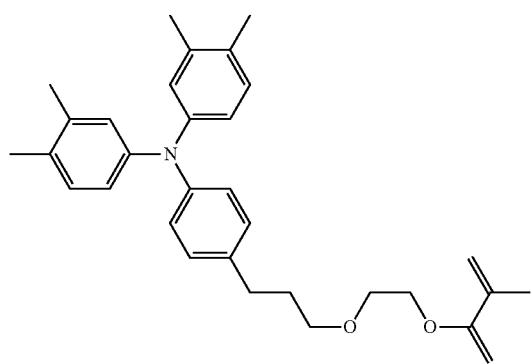
I-13
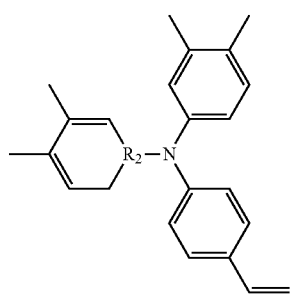
I-14
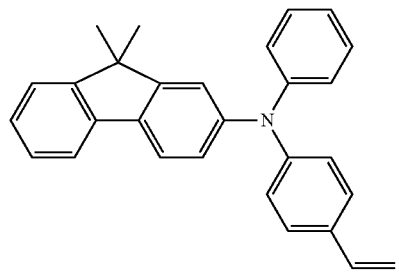
I-15
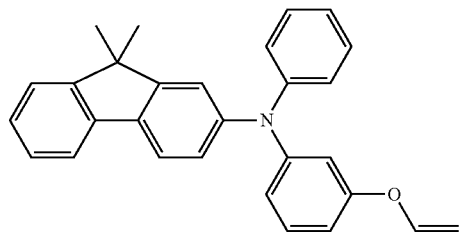
I-16
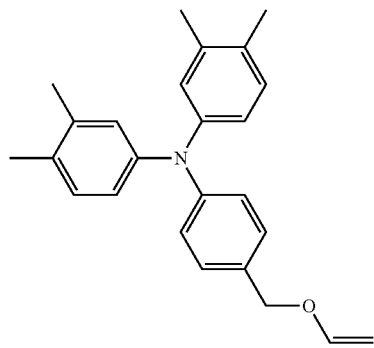
I-17
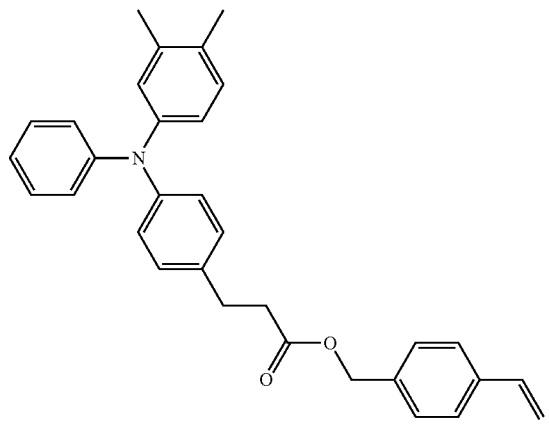
I-18

-continued
I-19
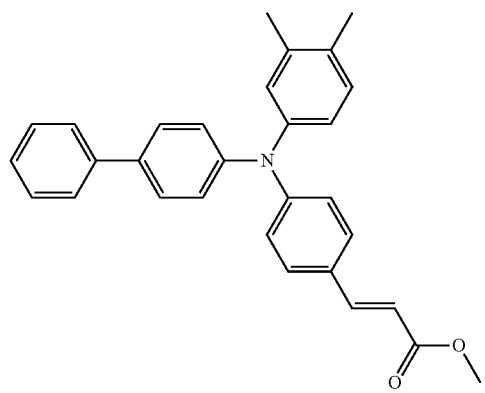
I-20
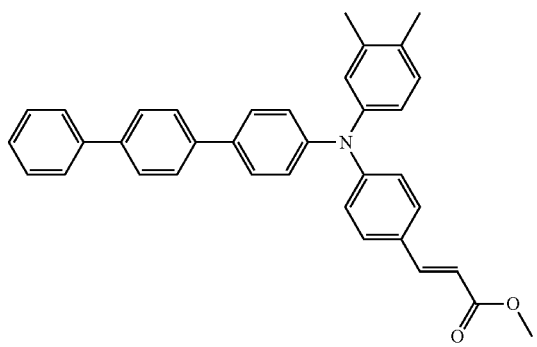
I-21
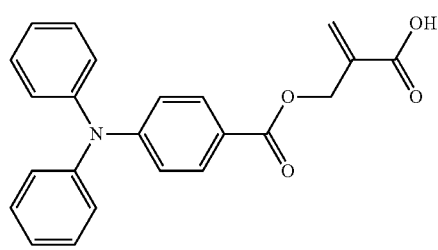
I-22
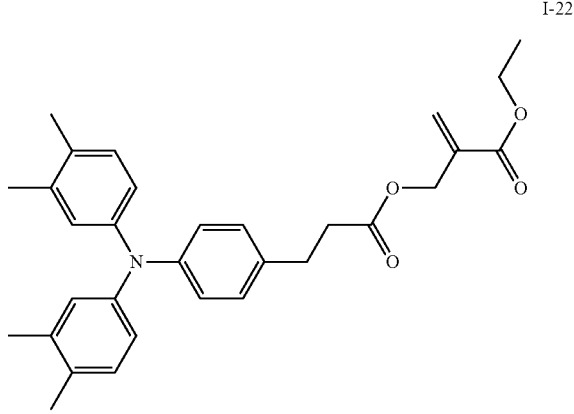
I-23
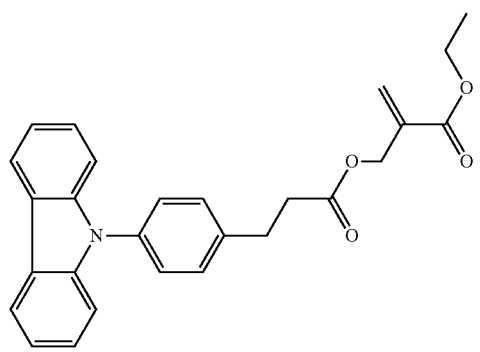
I-24
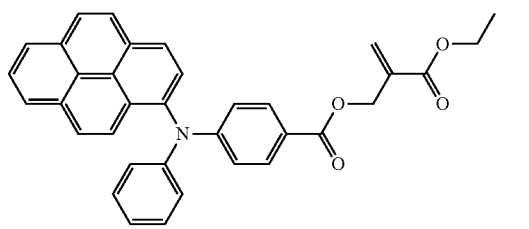
II-1
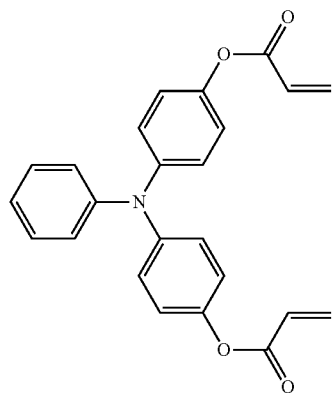
II-2
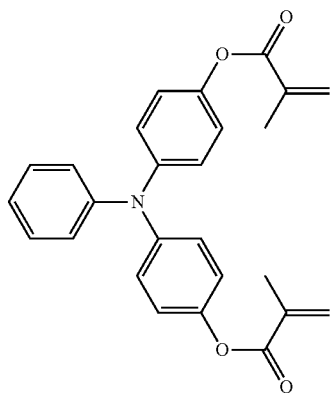

-continued
II-3
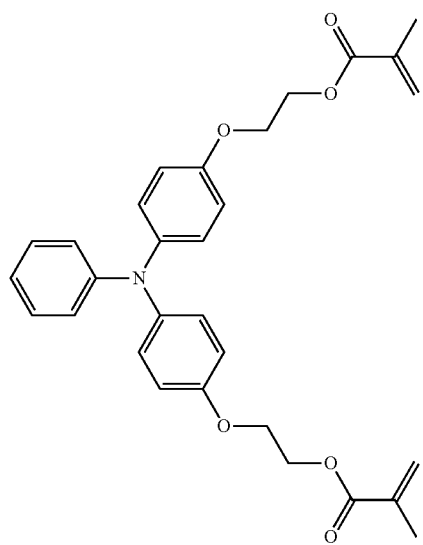
II-4
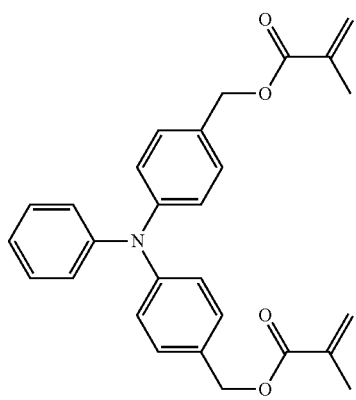
II-5
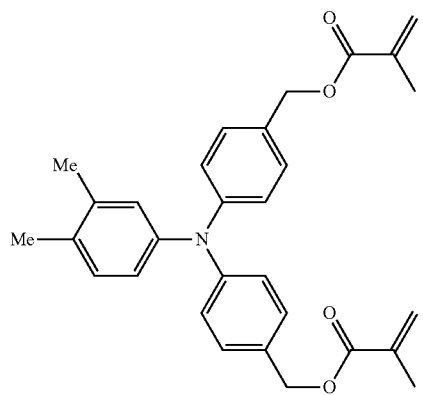
II-6
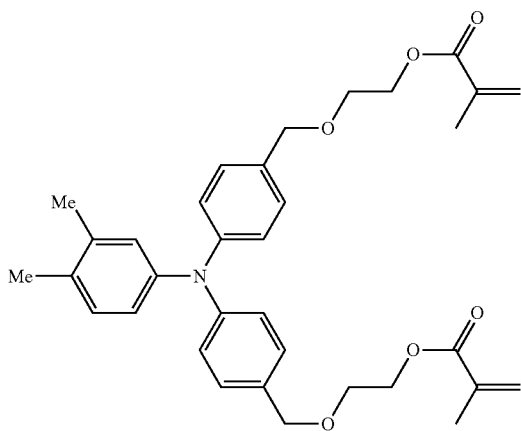
II-7
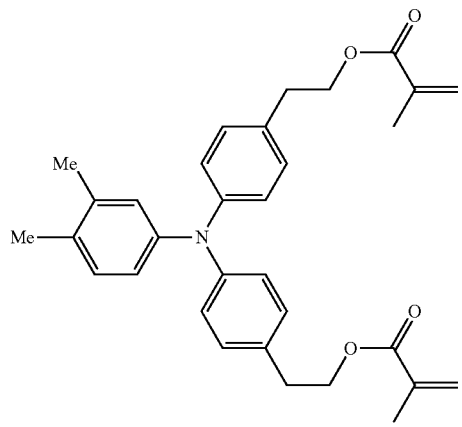
II-8
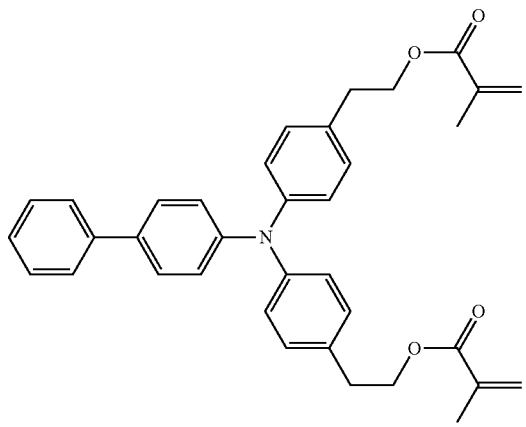

-continued
II-9
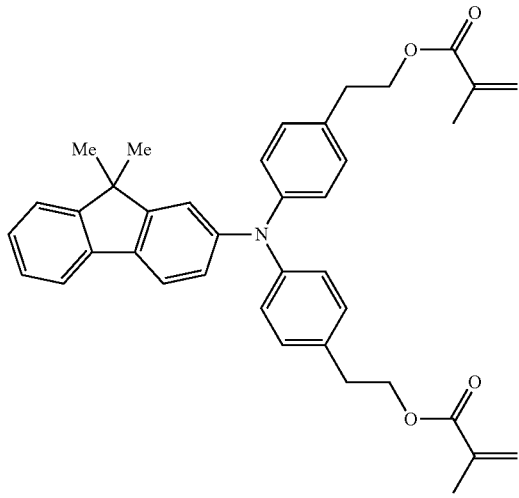
II-10
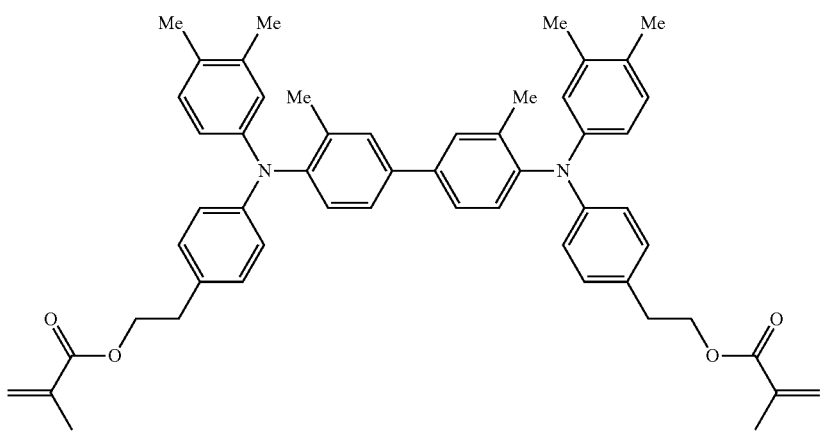
II-11
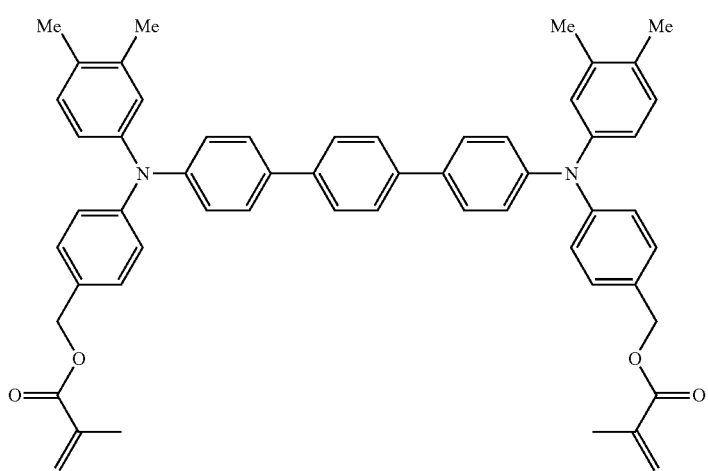

II-12
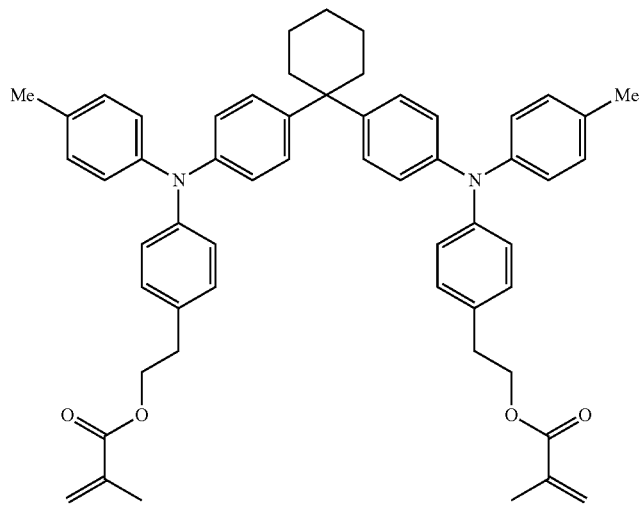
II-13
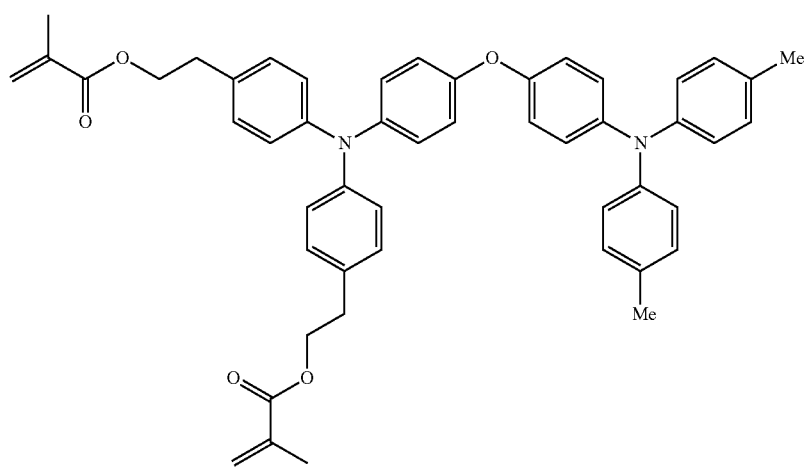
II-14
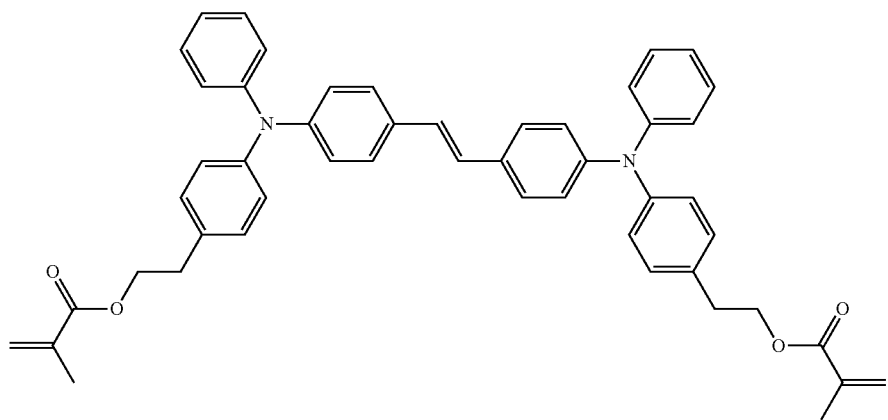

II-15
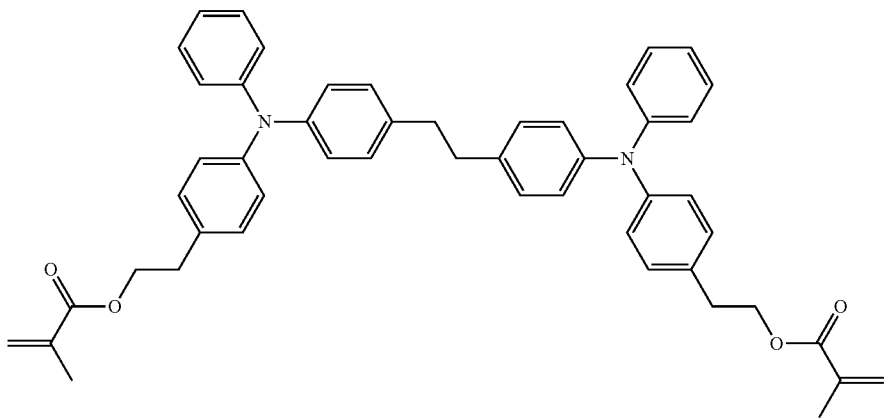
II-16
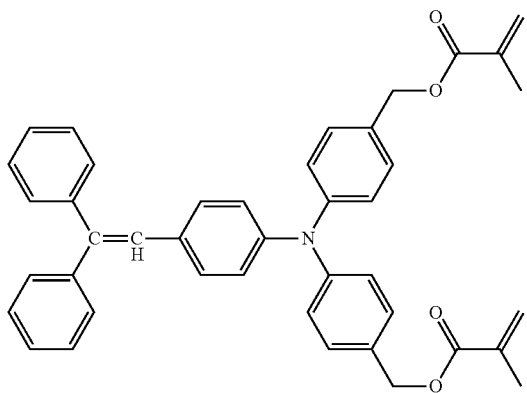
II-17
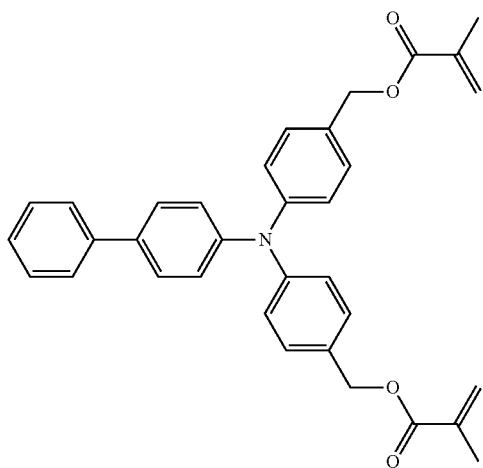

II-18
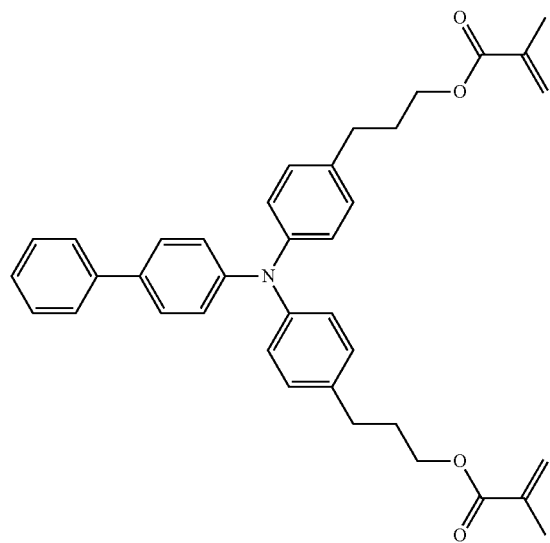
II-19
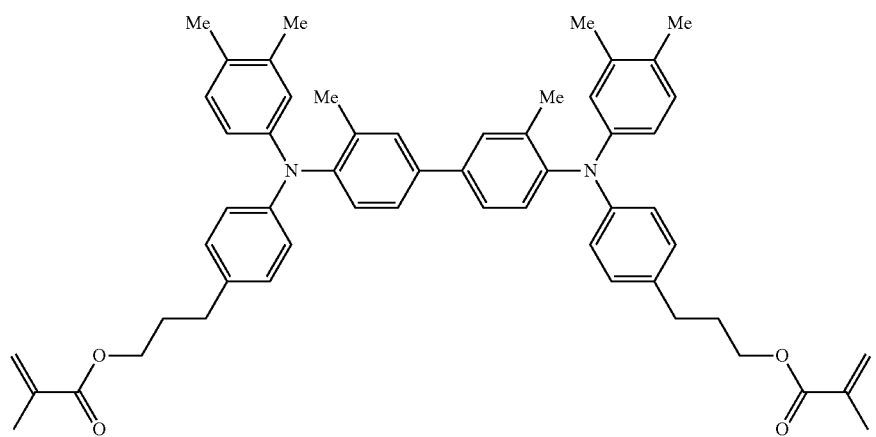
II-20
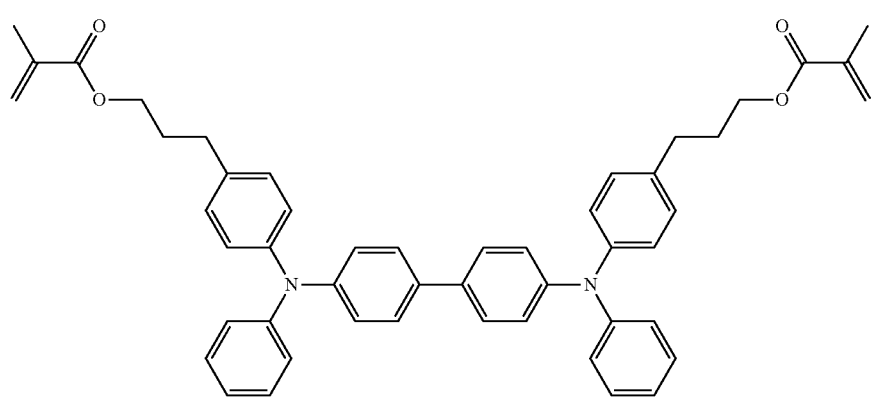

-continued
II-21
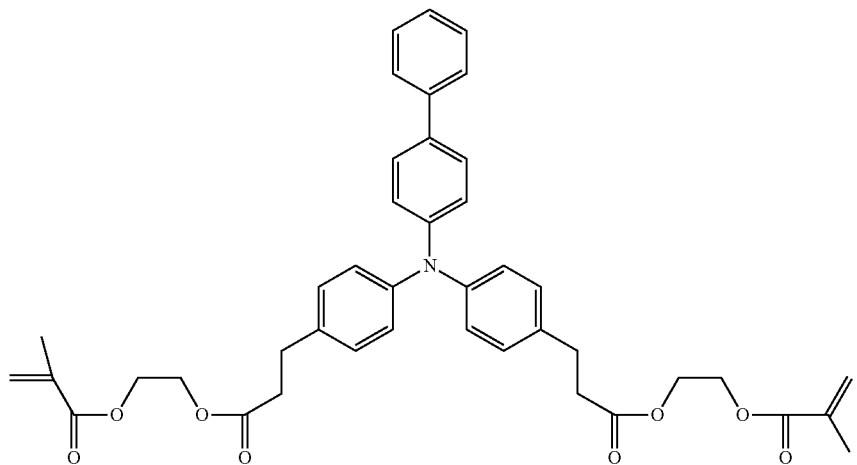
II-22
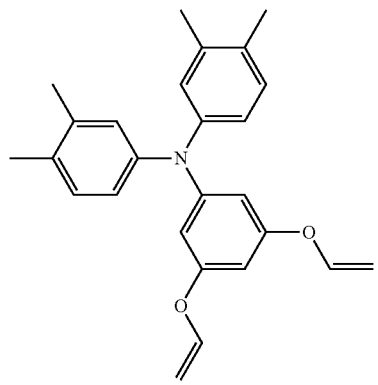
II-23
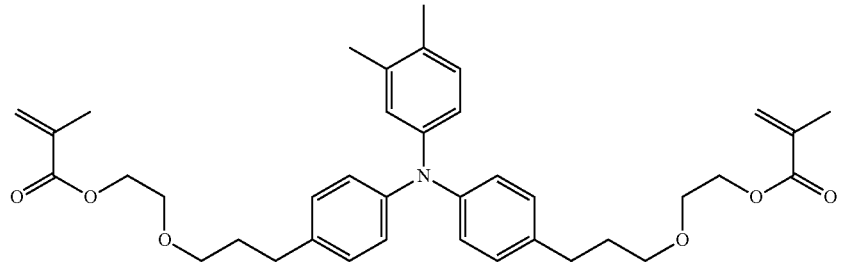
II-24
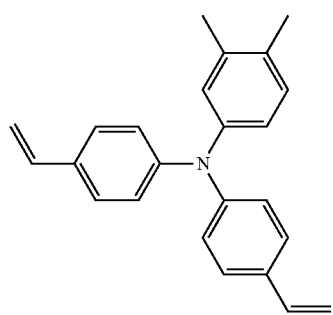
II-25
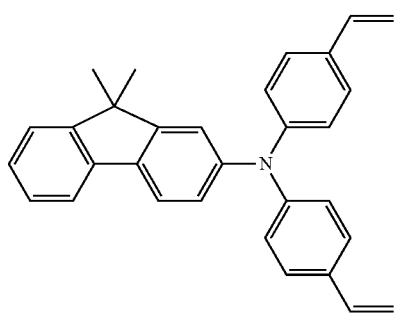

II-26
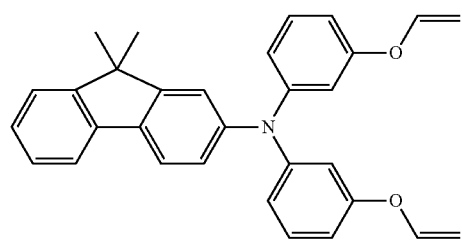
II-27
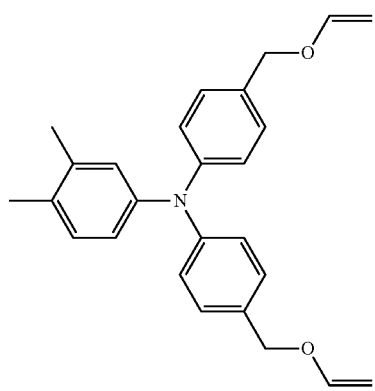
II-28
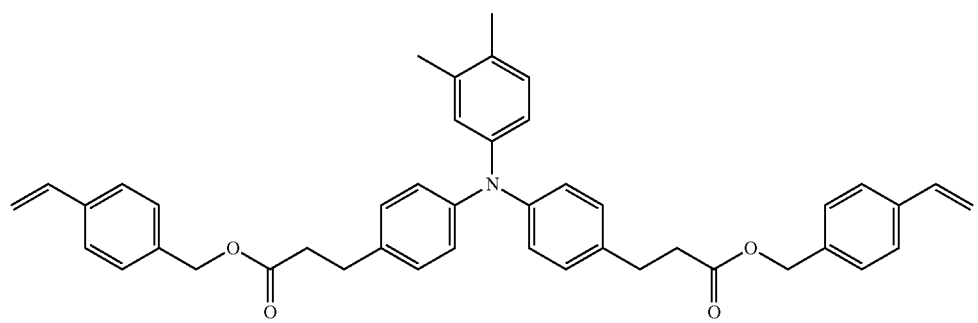
II-29
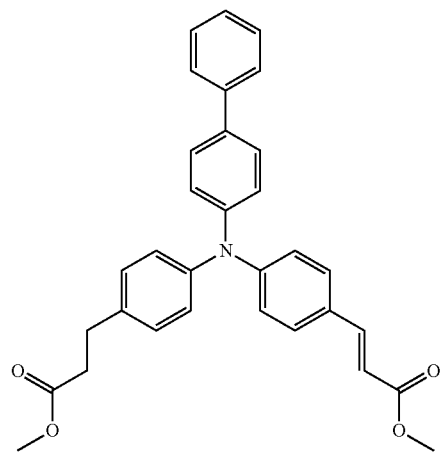
II-30
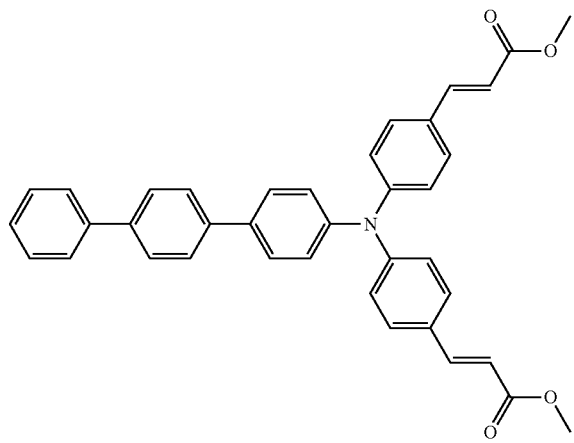
II-31
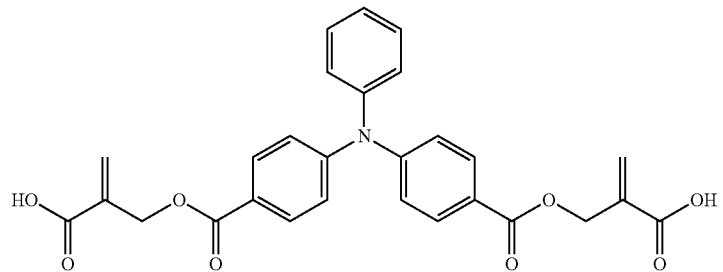

-continued
II-32
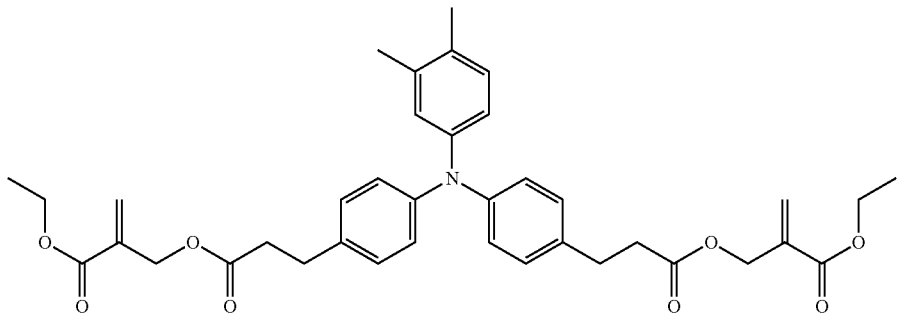
II-33
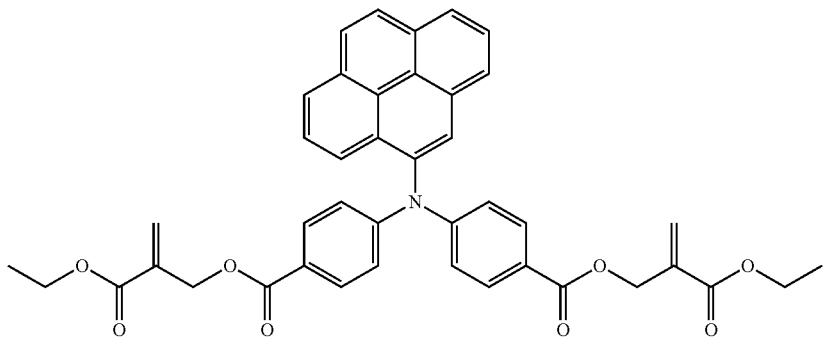
II-34
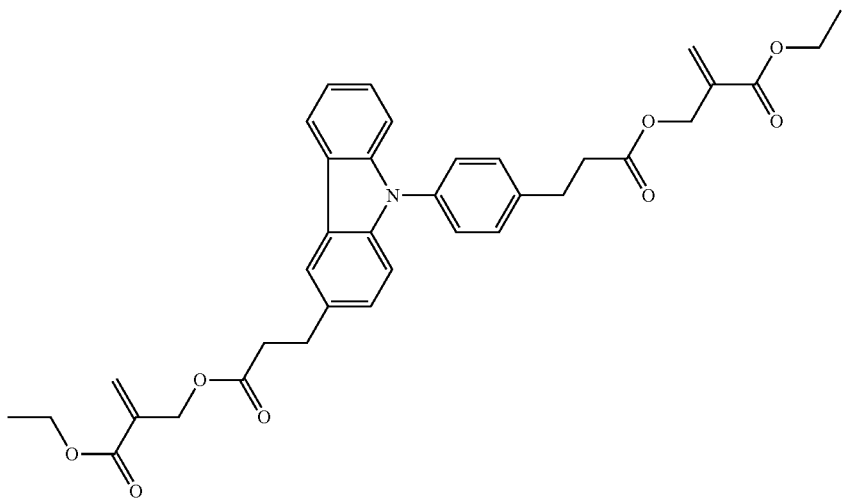
II-35
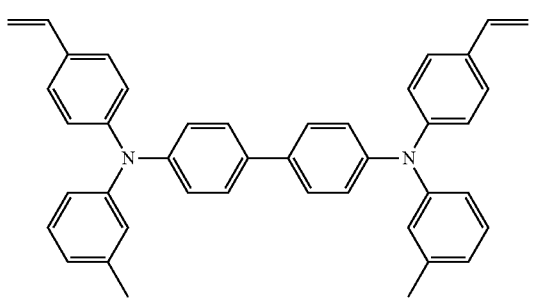
II-36
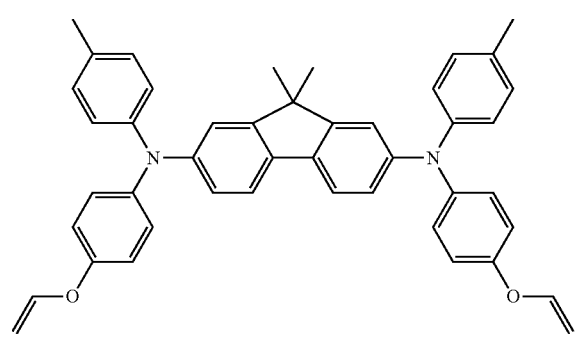

II-37
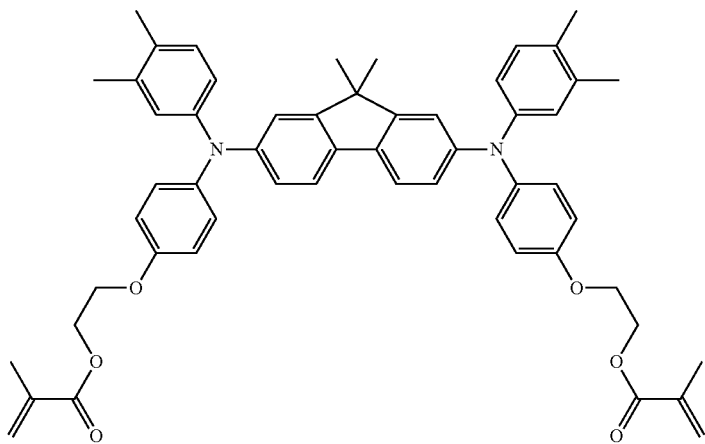
II-38
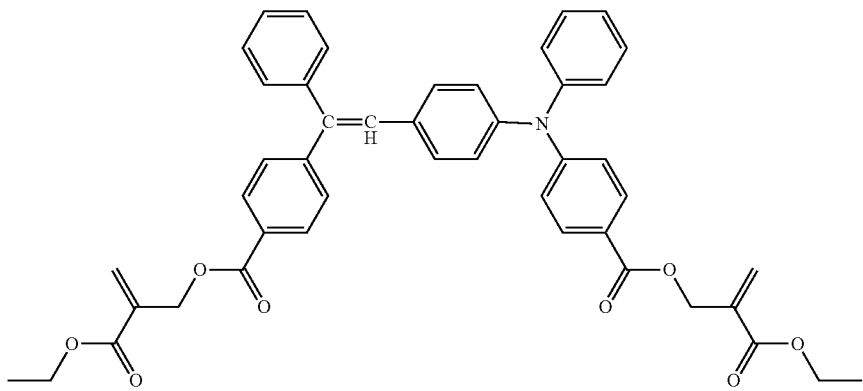
II-39
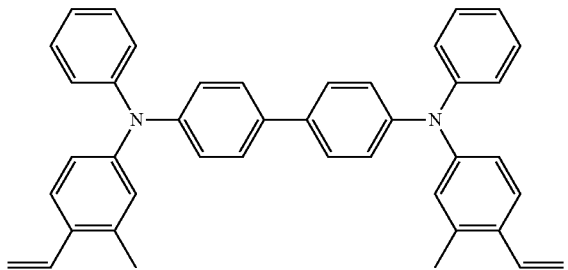
II-40
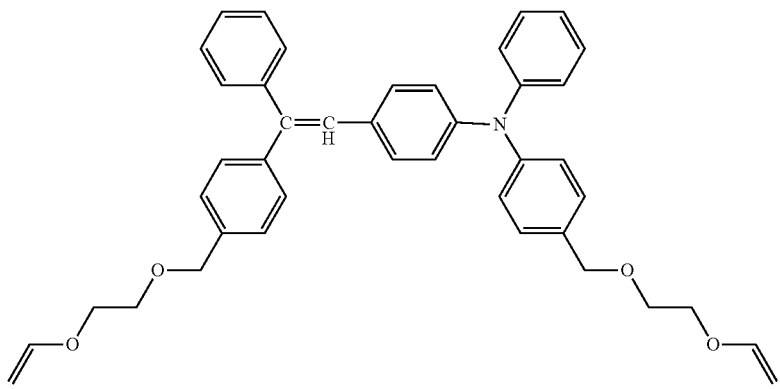

-continued
II-41
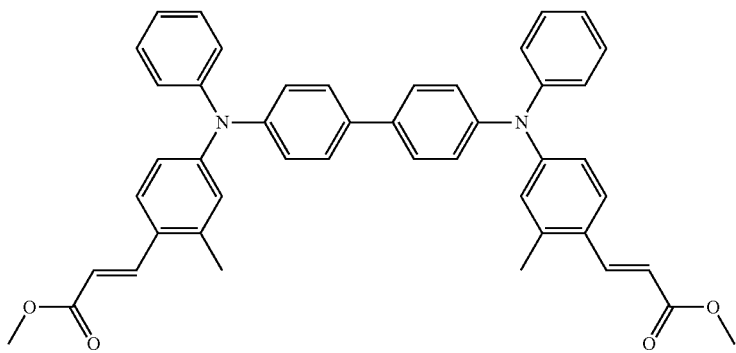
II-42
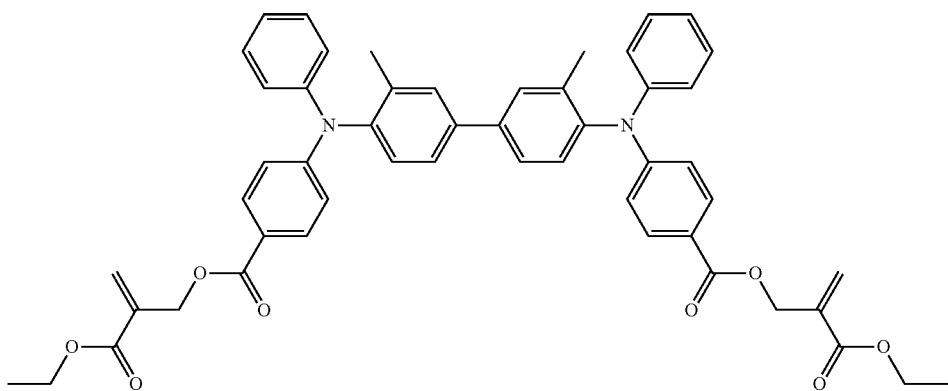
II-43
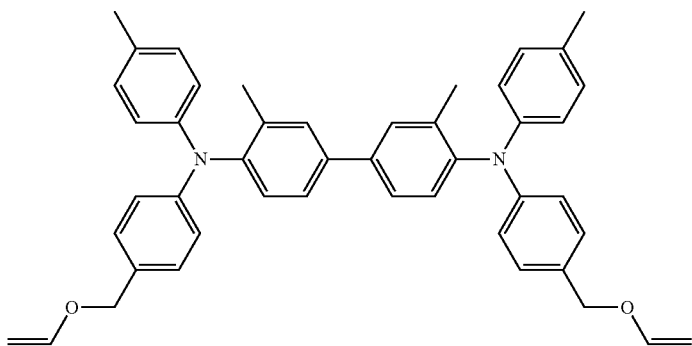
II-44
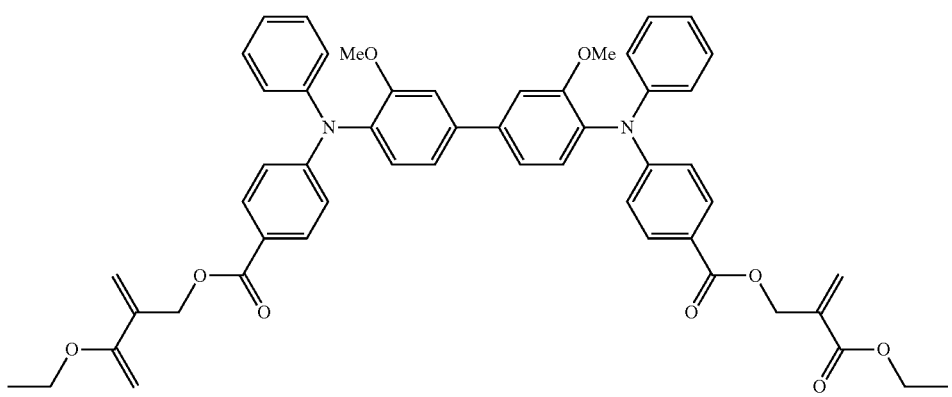

-continued
II-45
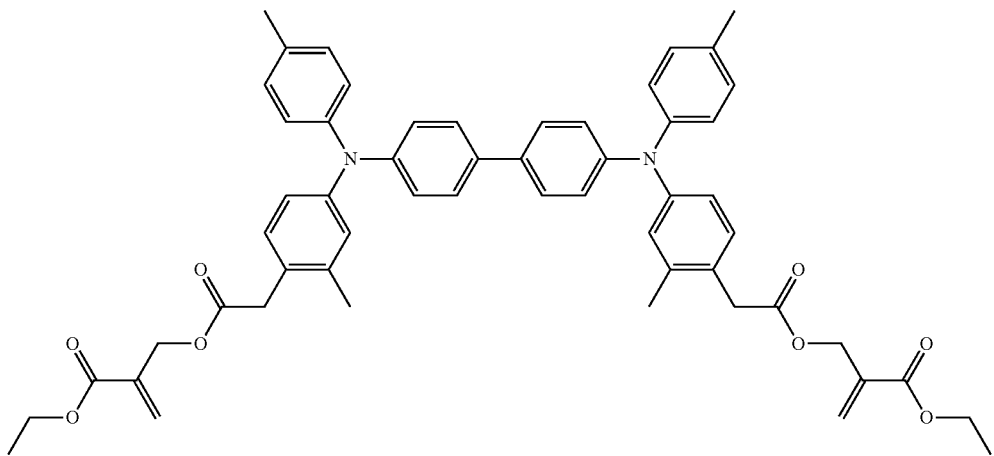
II-46
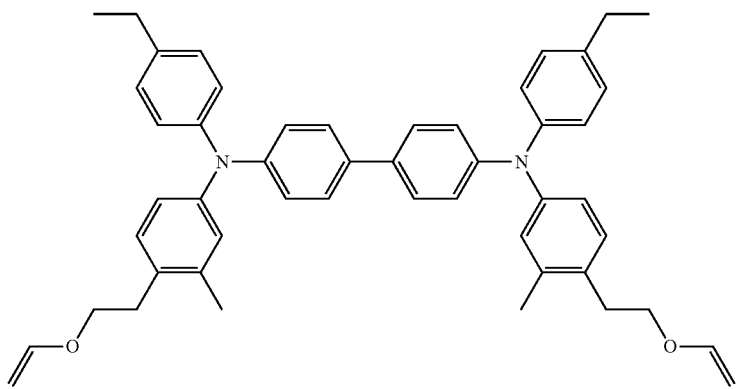
II-47
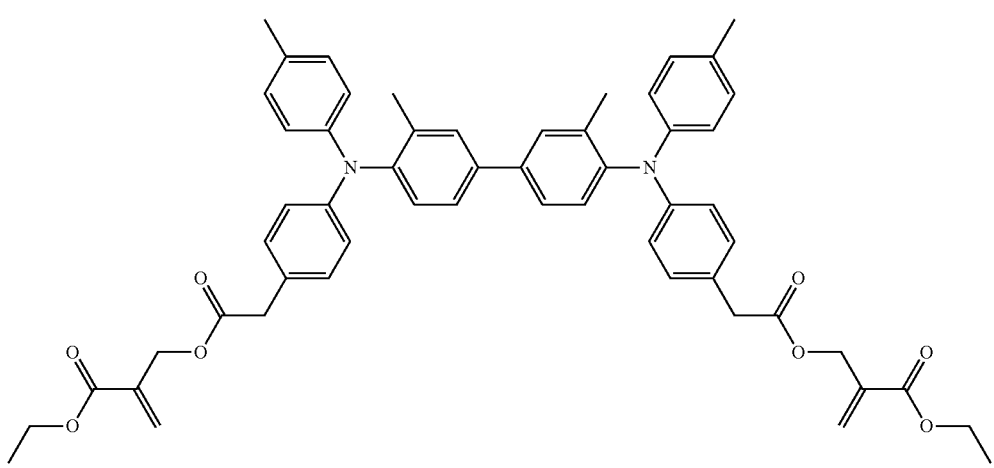

II-48
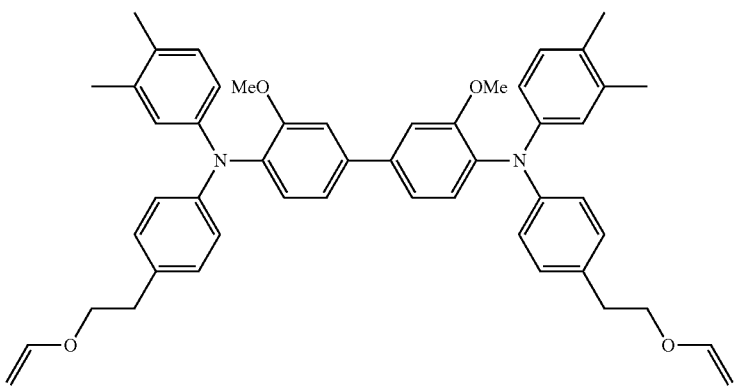
II-49
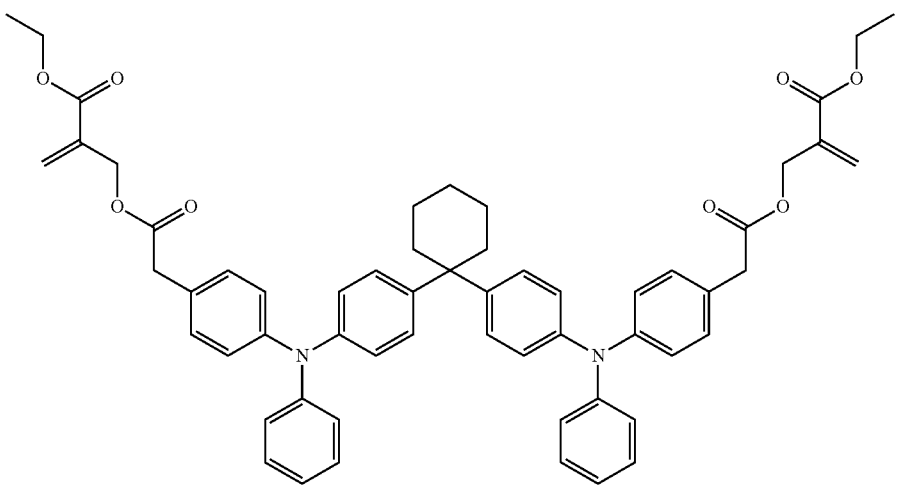
II-50
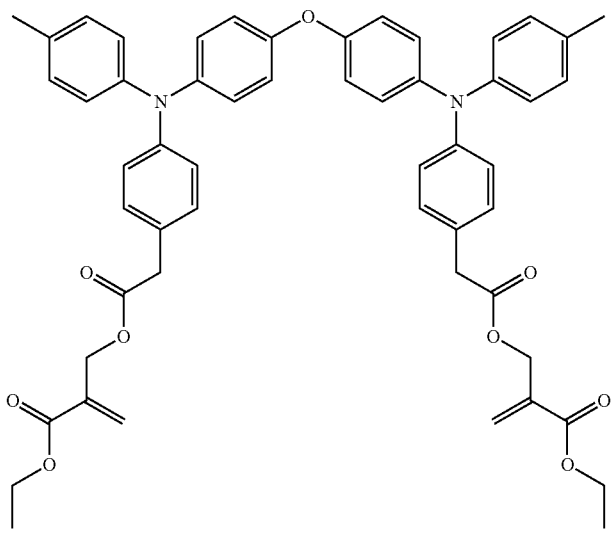

II-51
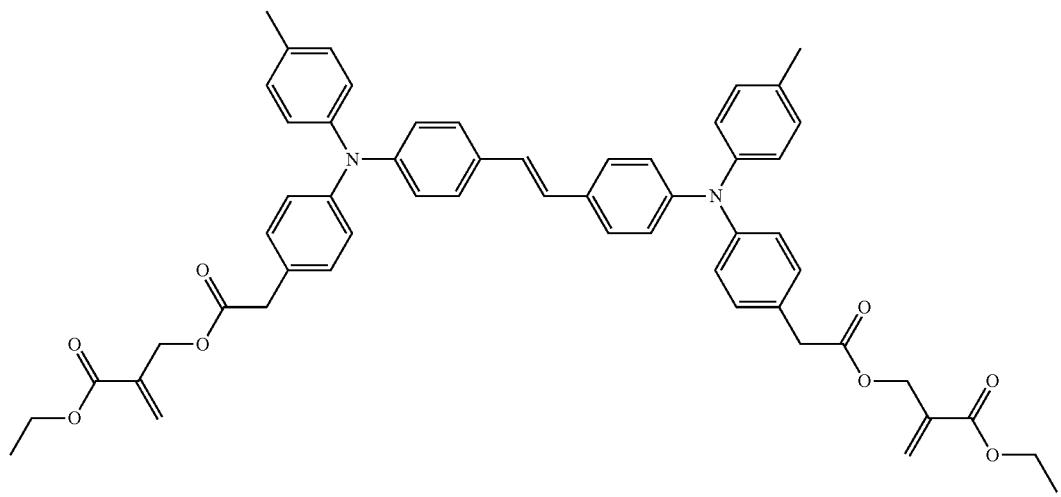
II-52
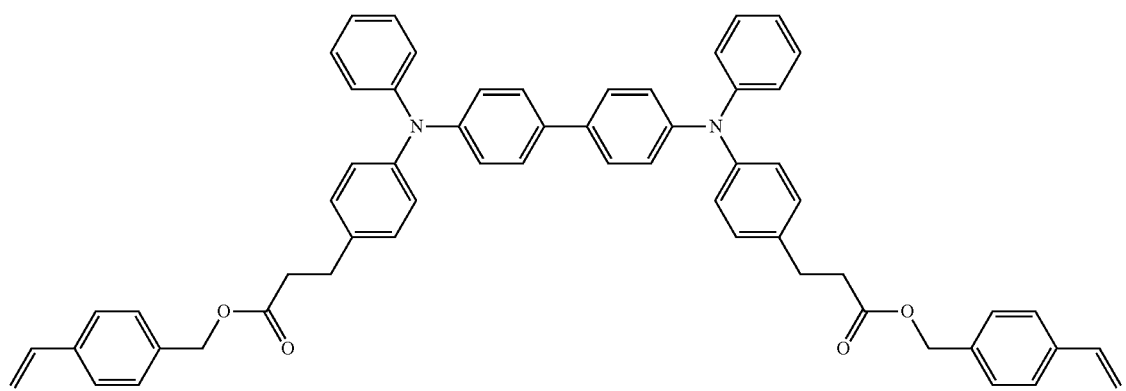
III-1
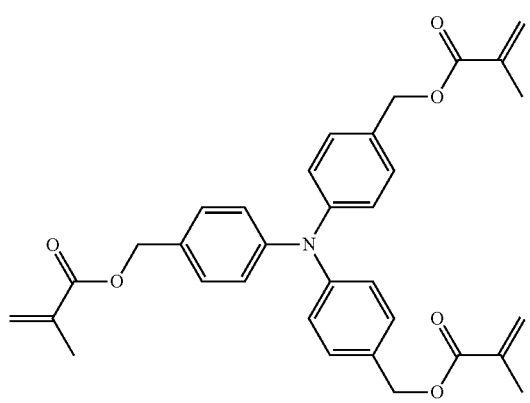
III-2
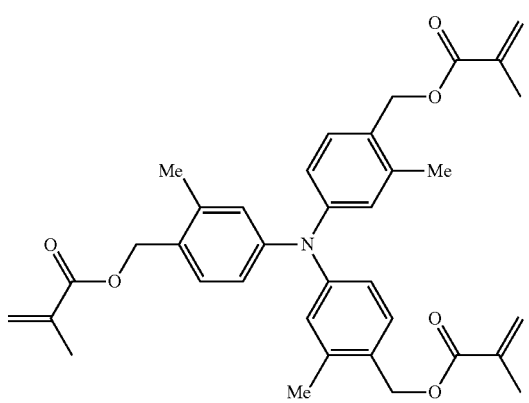

-continued
III-3
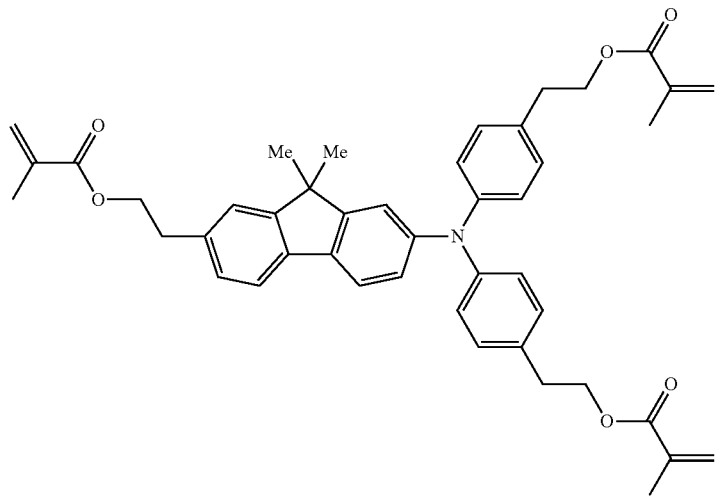
III-4
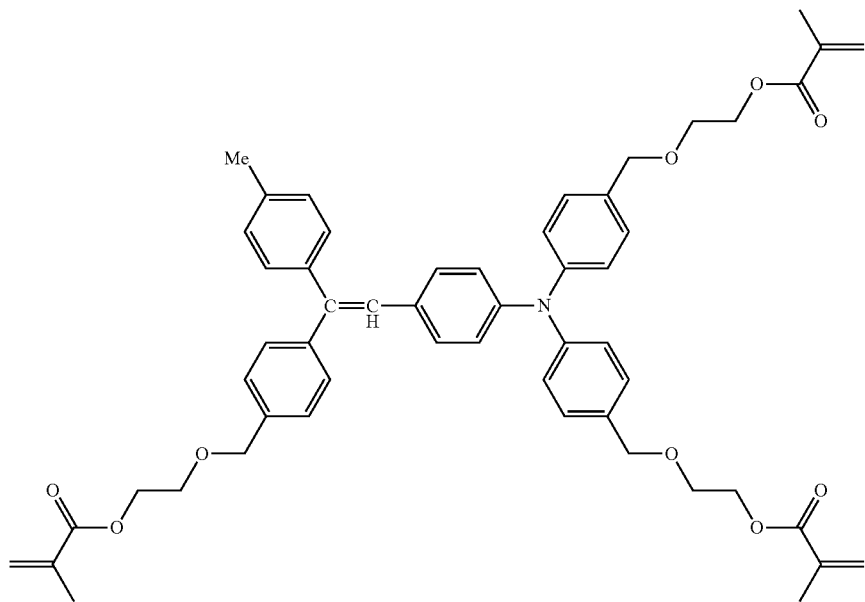
III-5
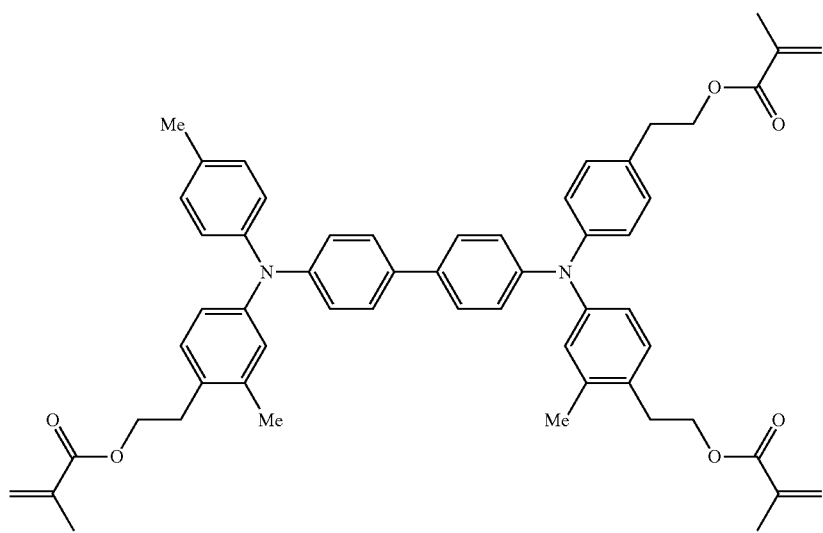

III-6
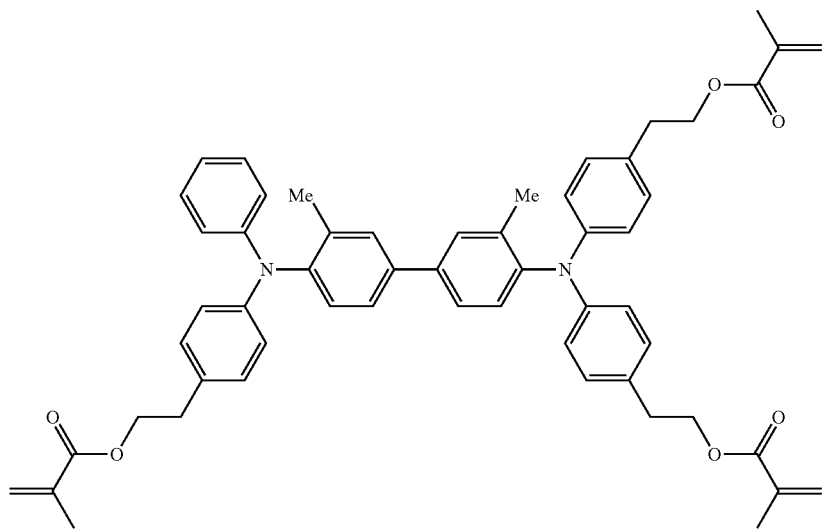
III-7
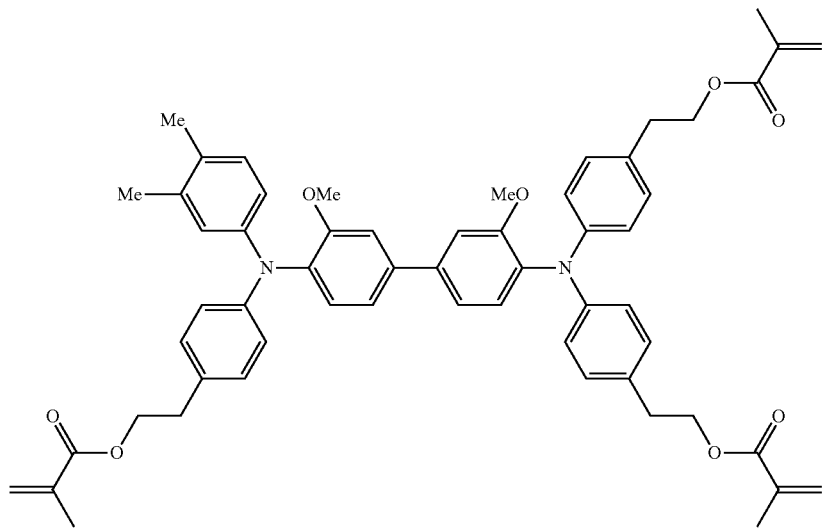
III-8
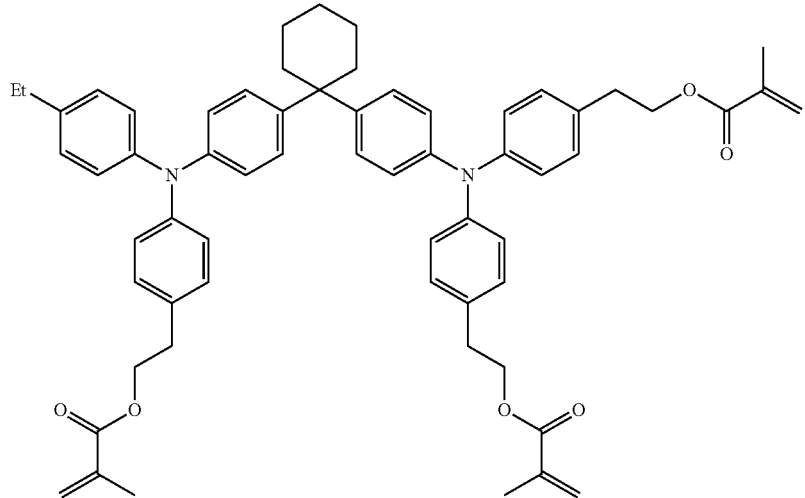

III-9
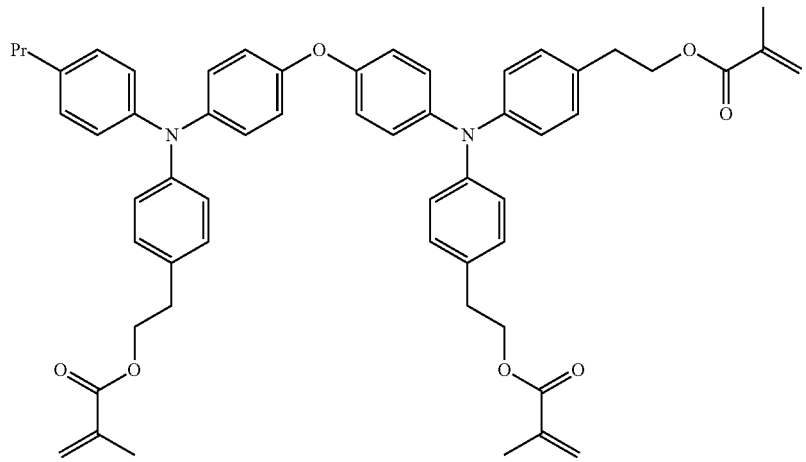
III-10
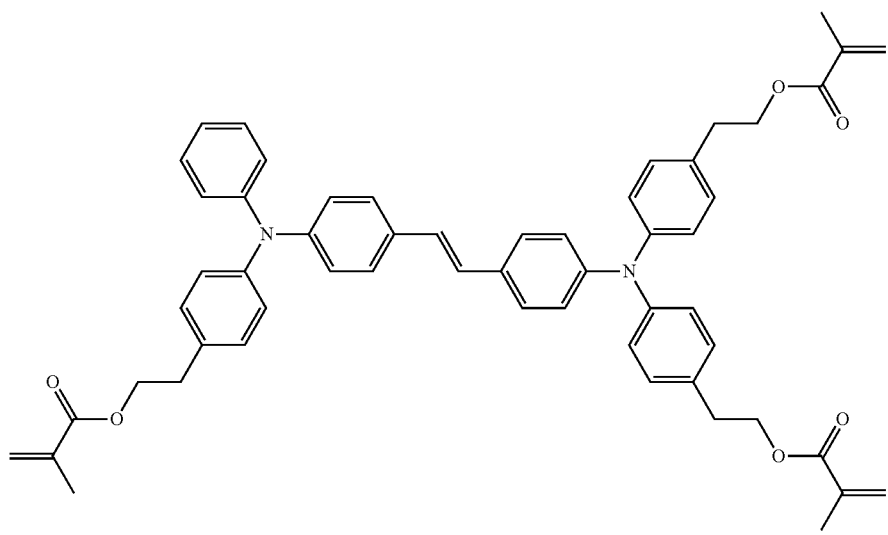
III-11
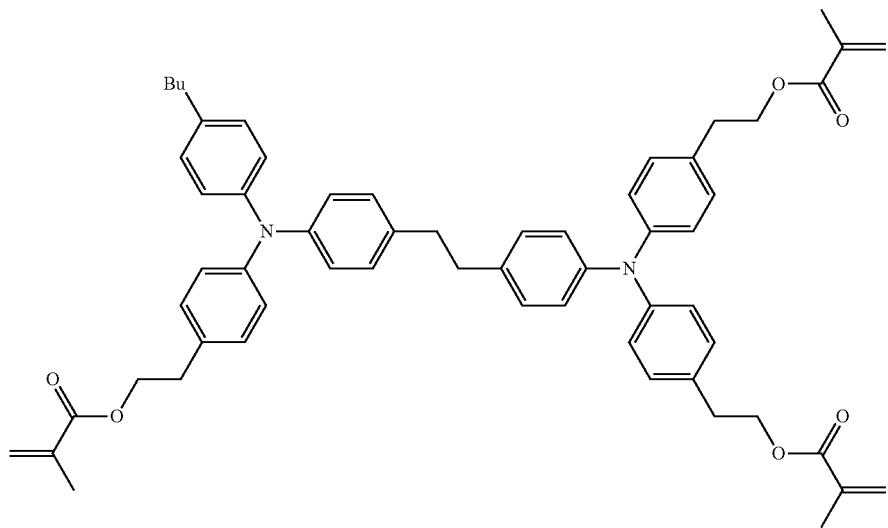

-continued
III-12
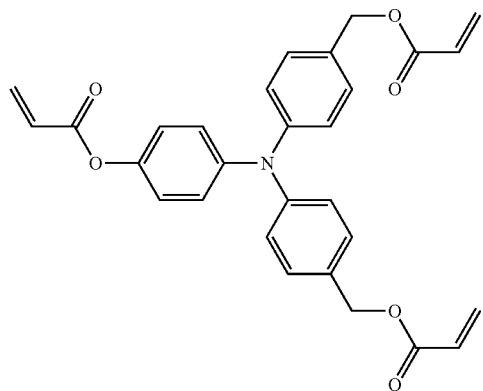
III-13
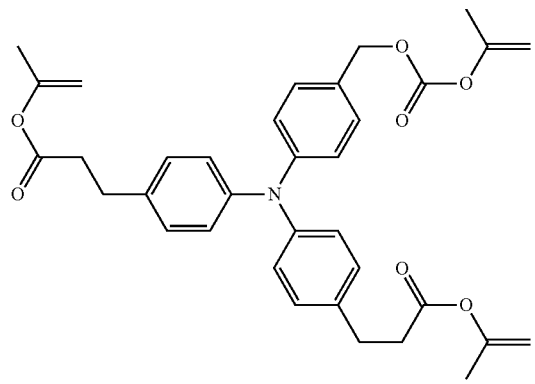
III-14
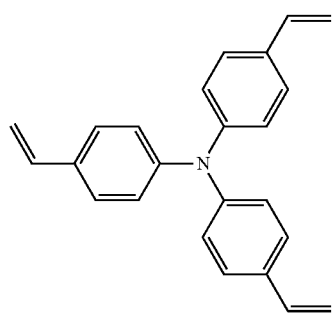
III-15
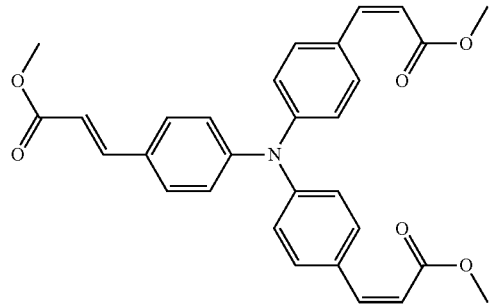
III-16
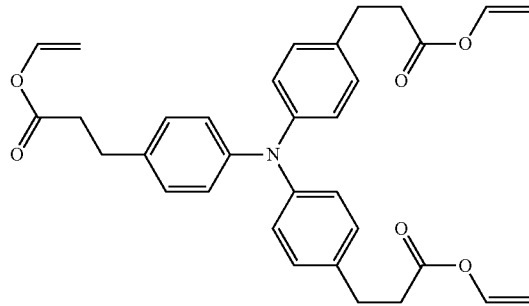
III-17
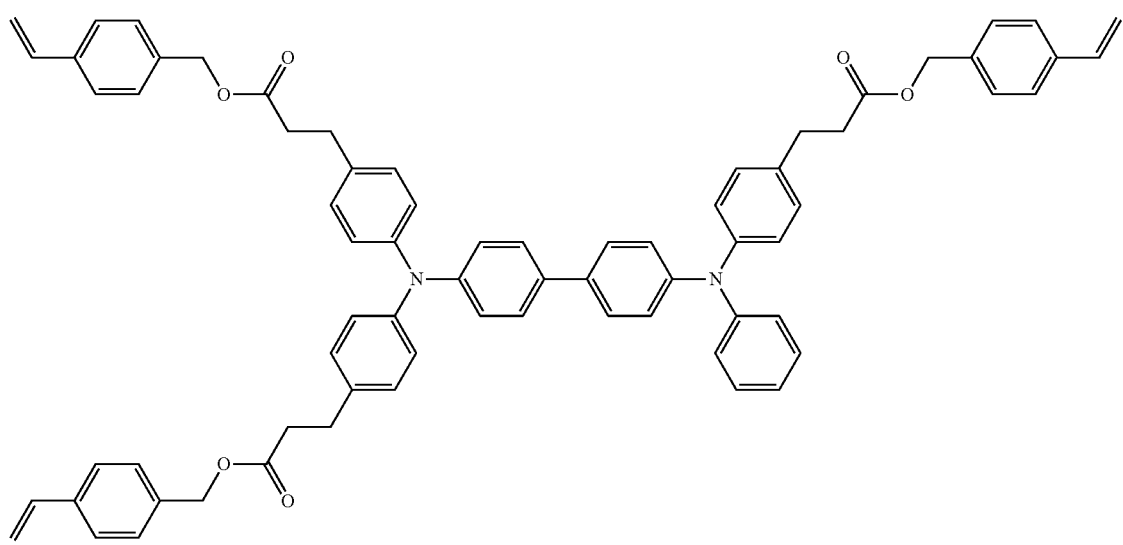

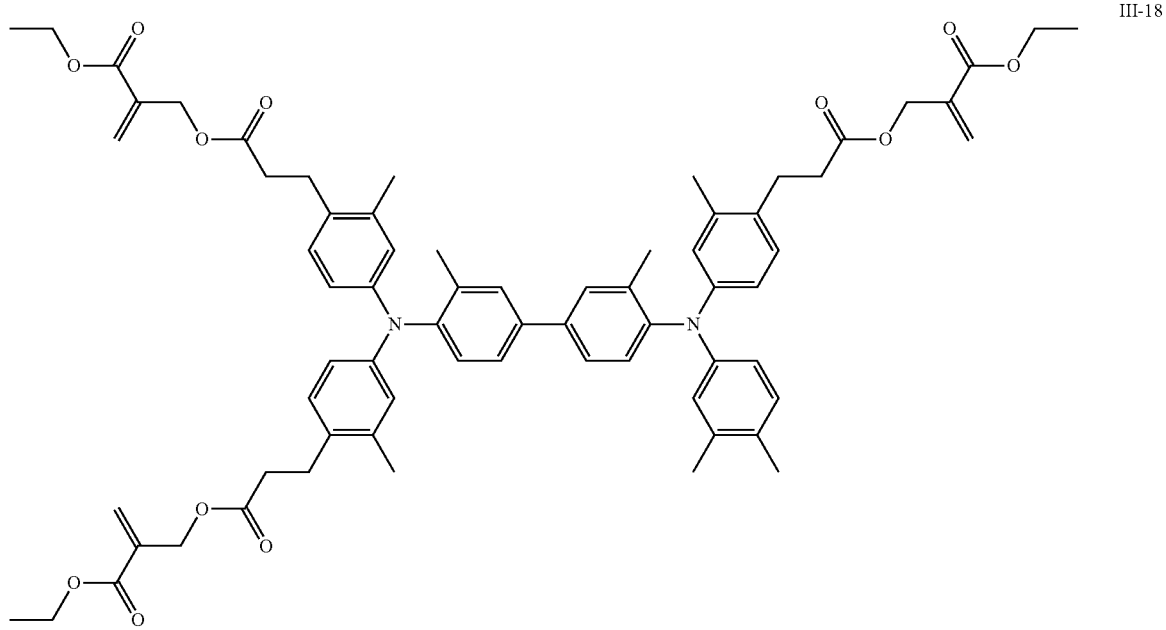
III-18
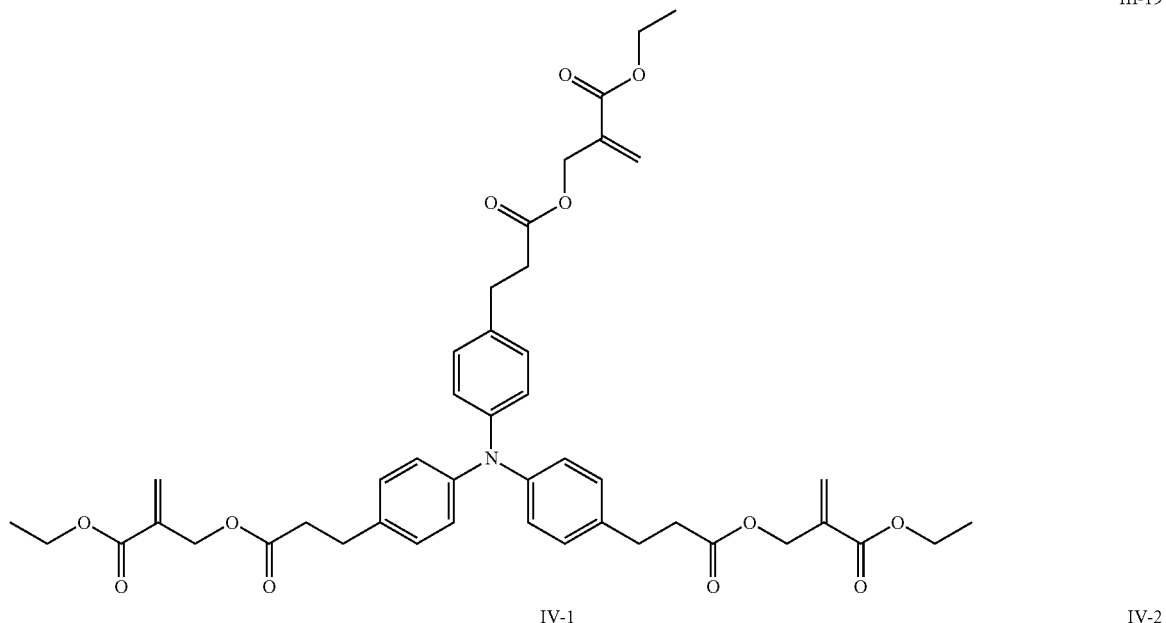
III-19
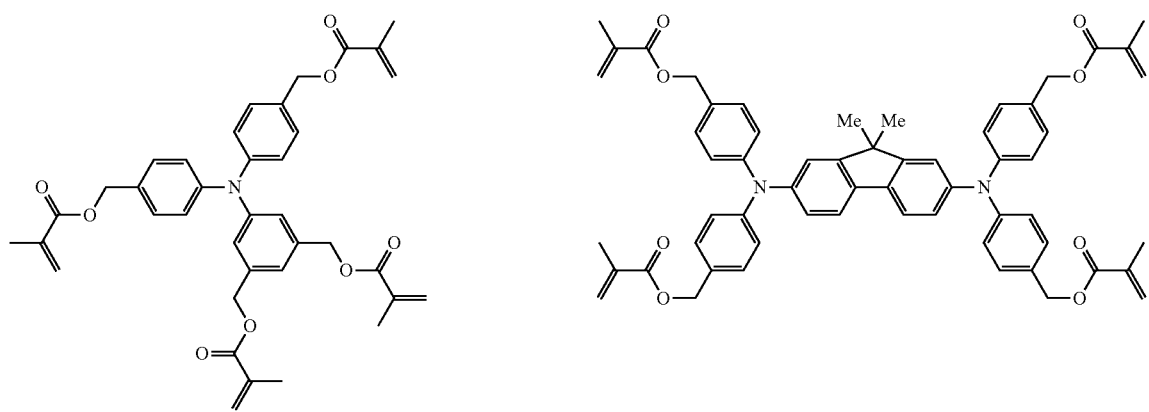
IV-1  IV-2

-continued
IV-3
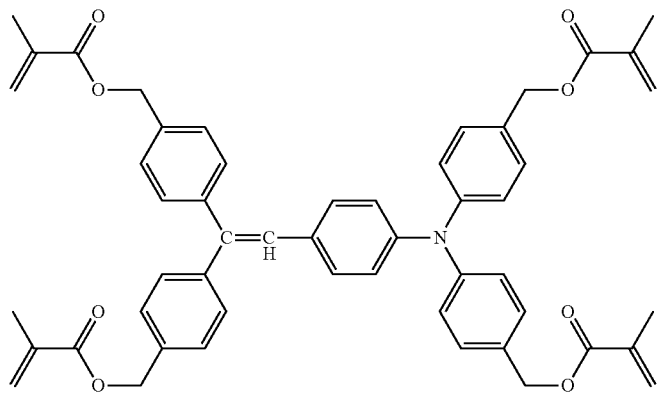
IV-4
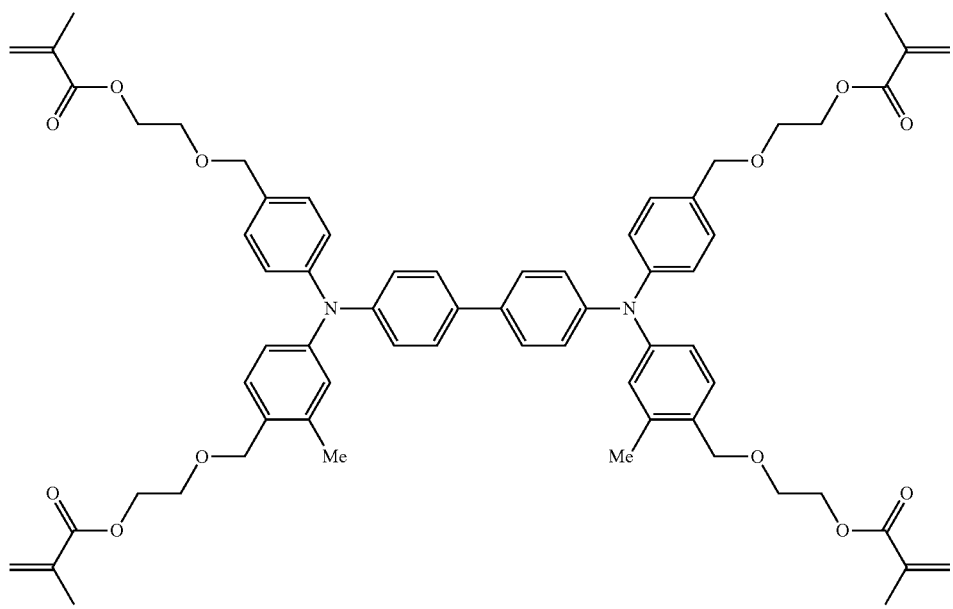
IV-5
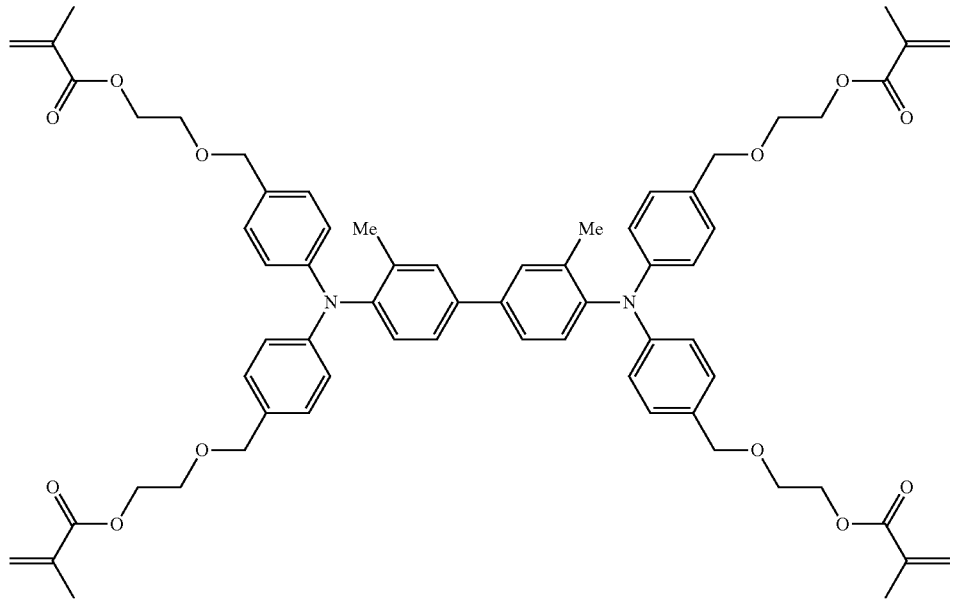

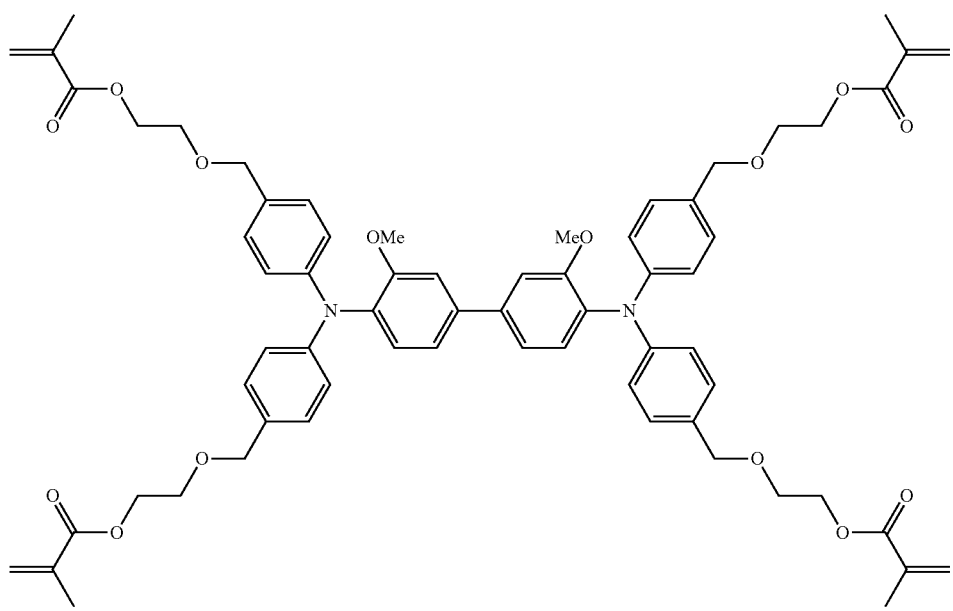
IV-6
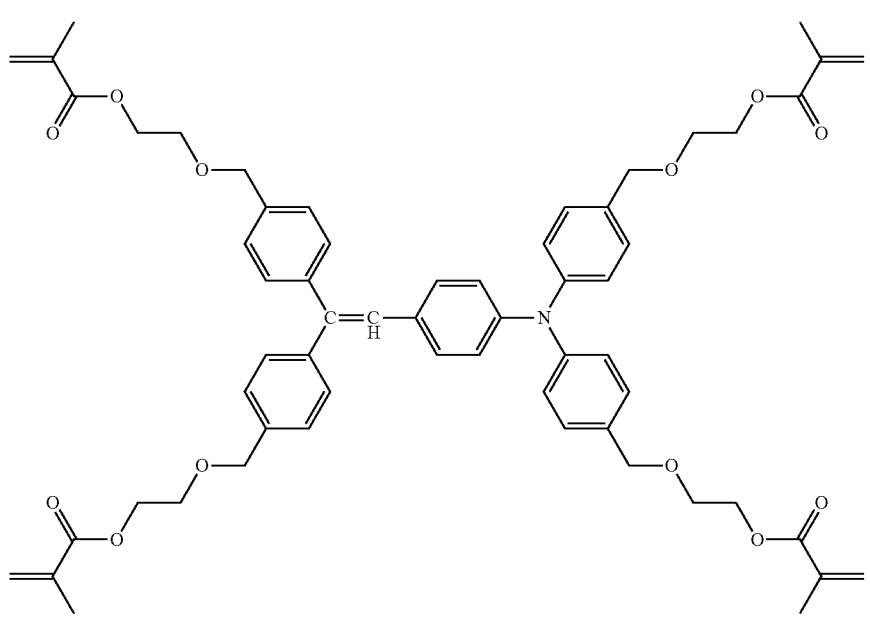
IV-7

IV-8
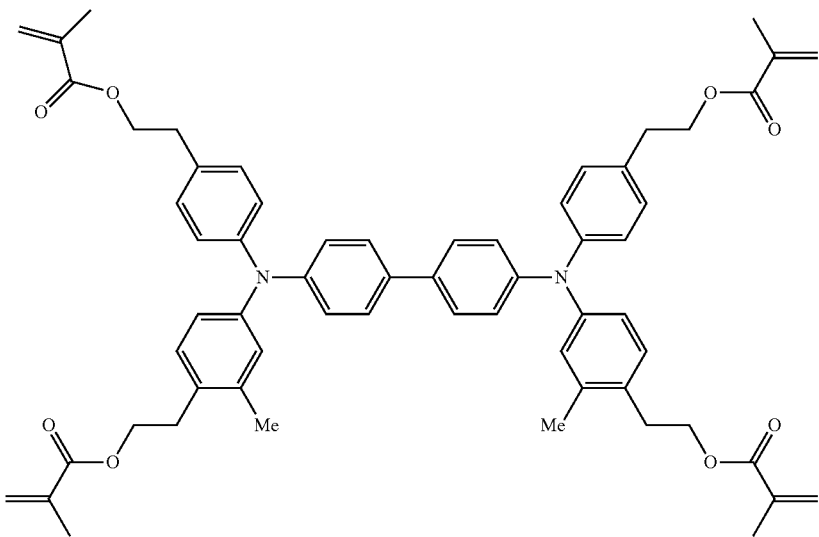
IV-9
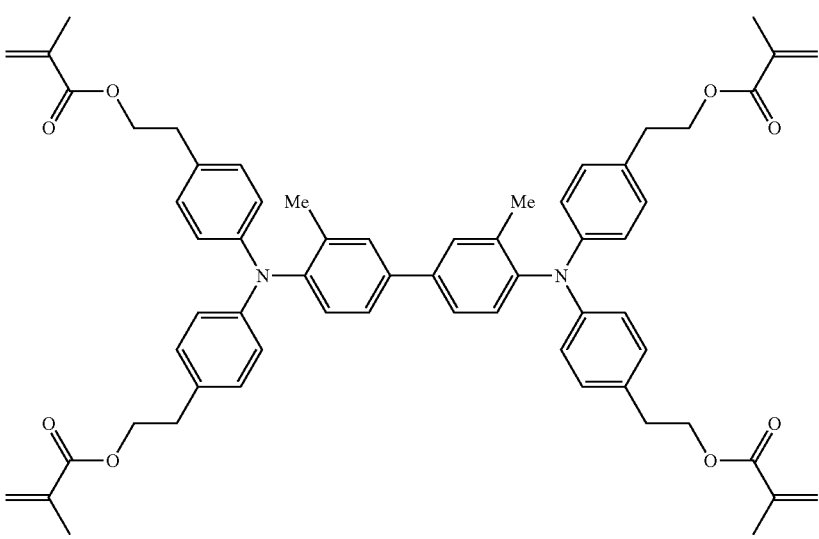
IV-10
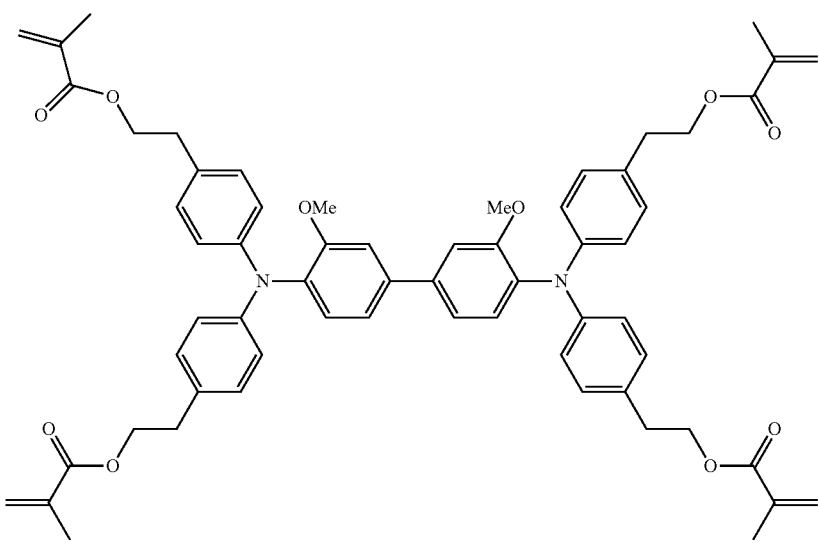

IV-11
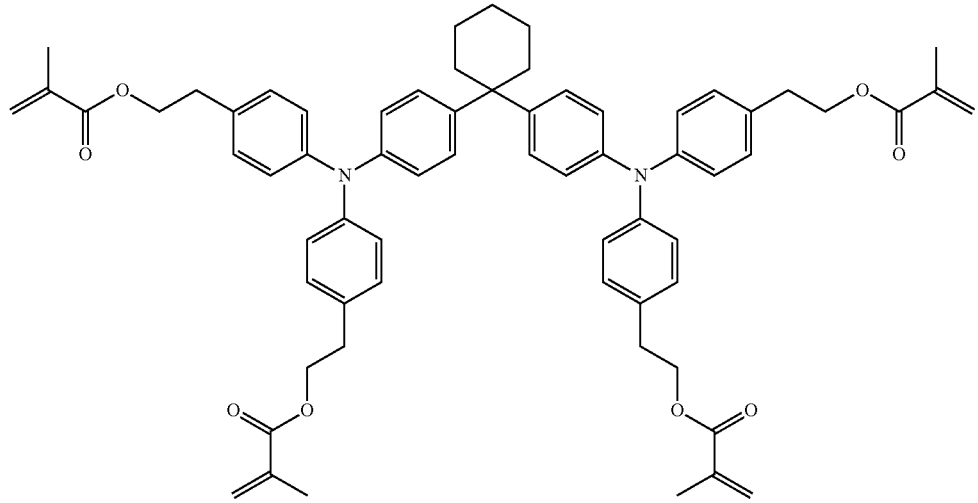
IV-12
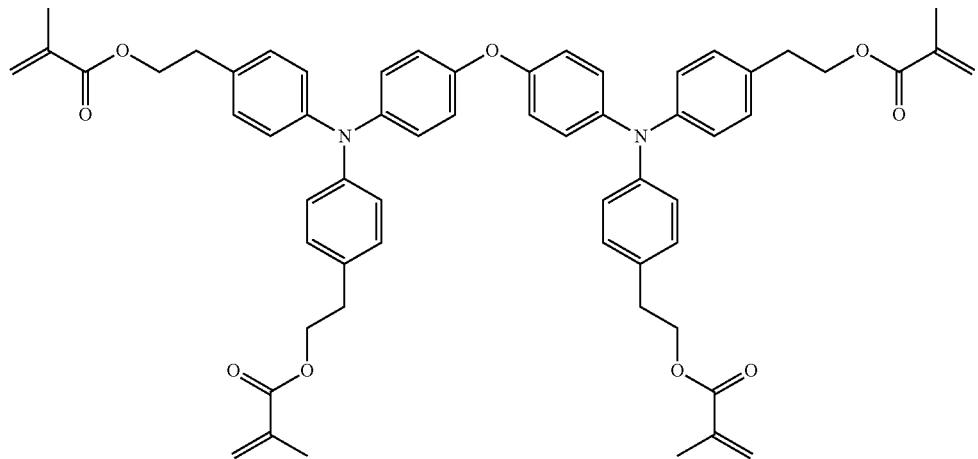
IV-13
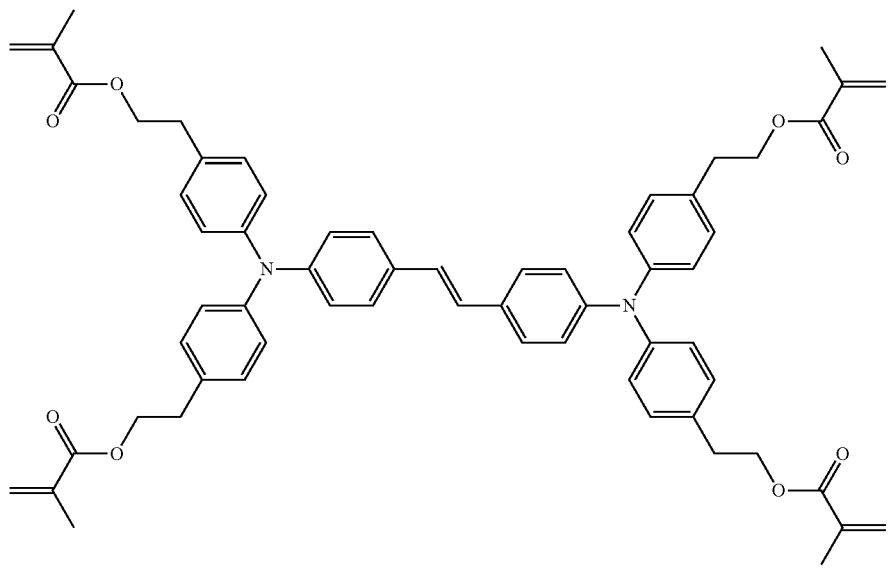

-continued
IV-14
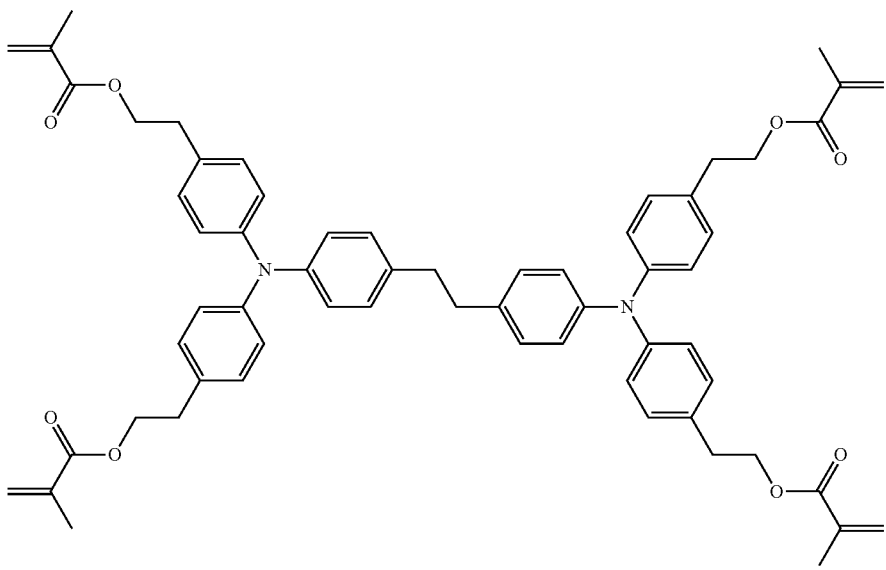
IV-15
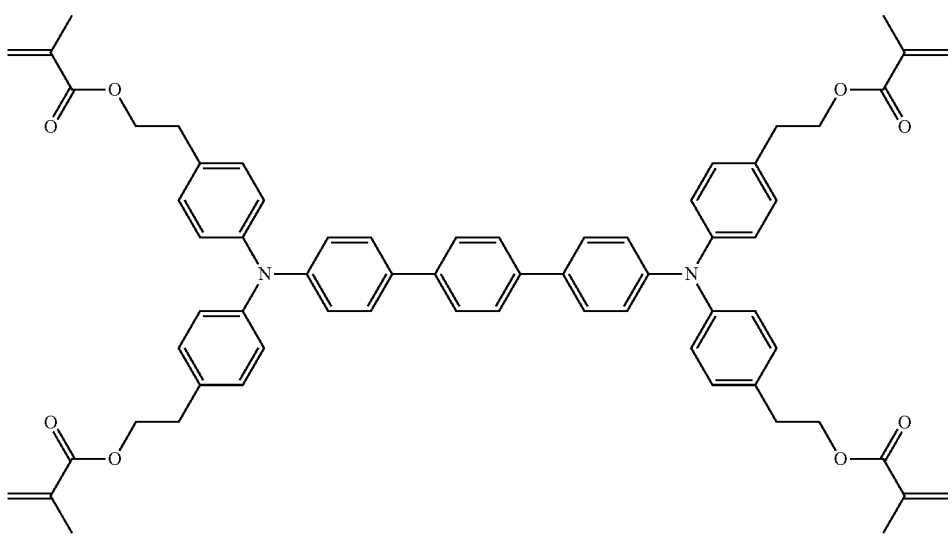
IV-16
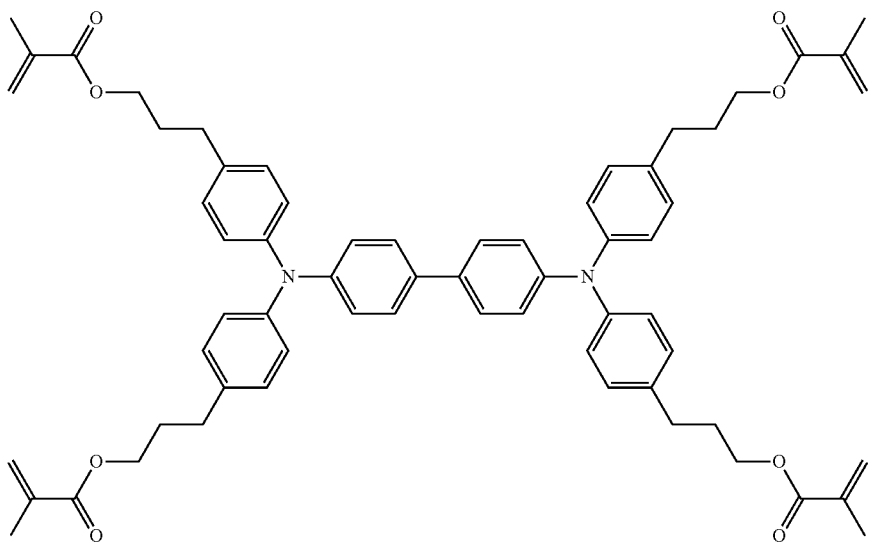

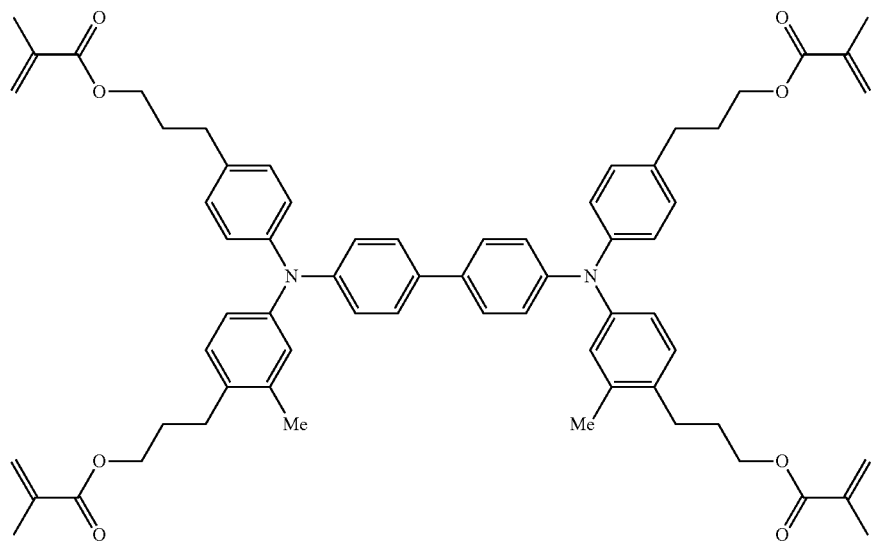
IV-17
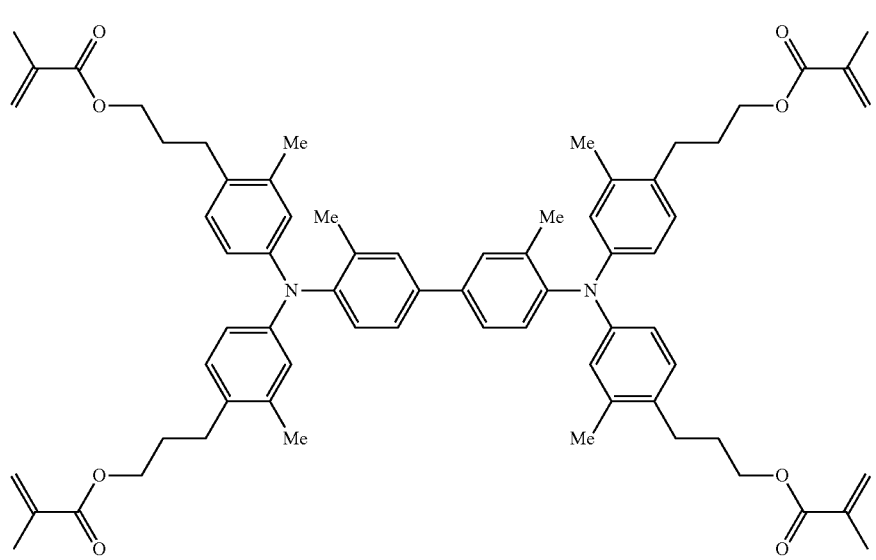
IV-18

-continued
IV-19
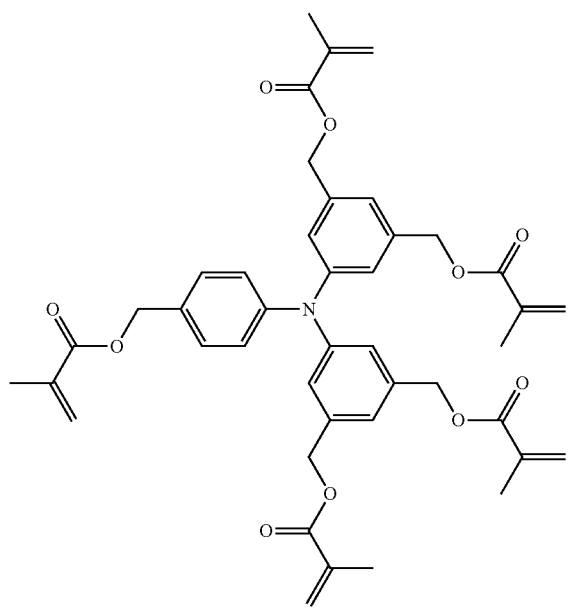
IV-20
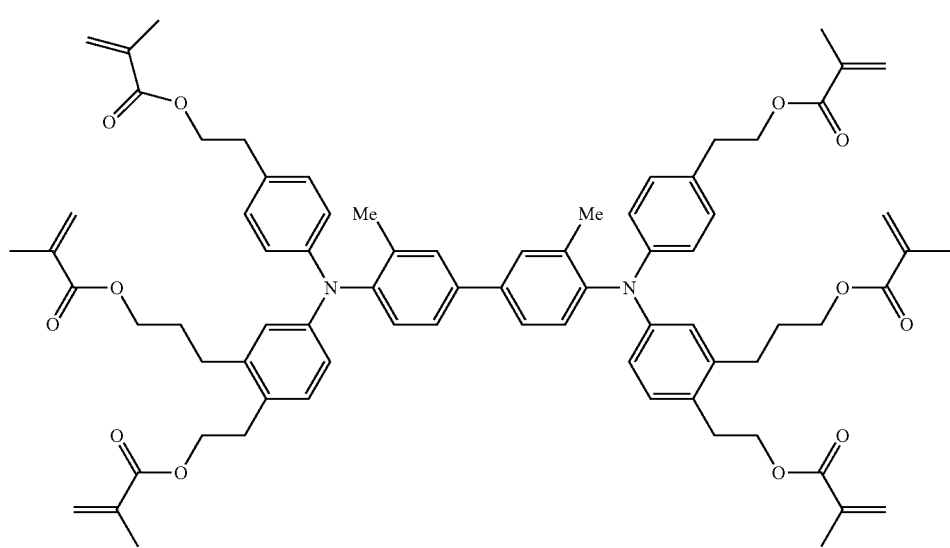

-continued
IV-21
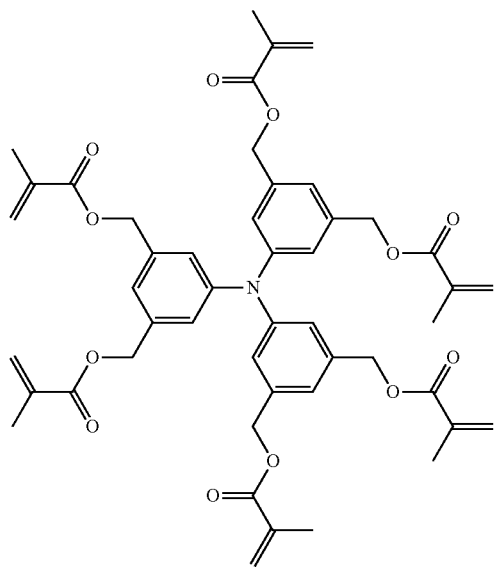
IV-22
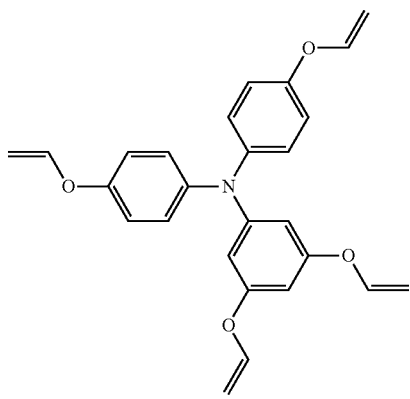
IV-23
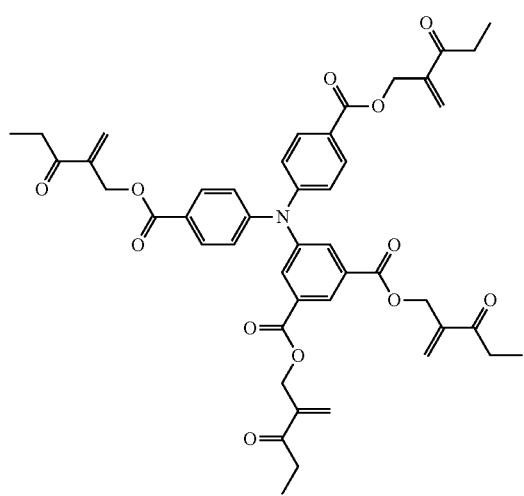
IV-24
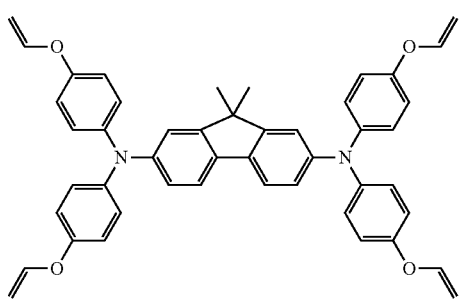

IV-25
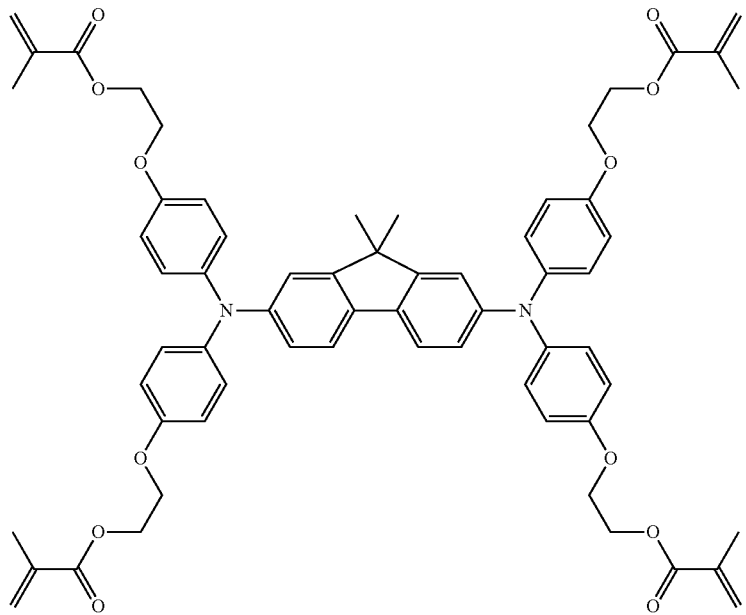
IV-26
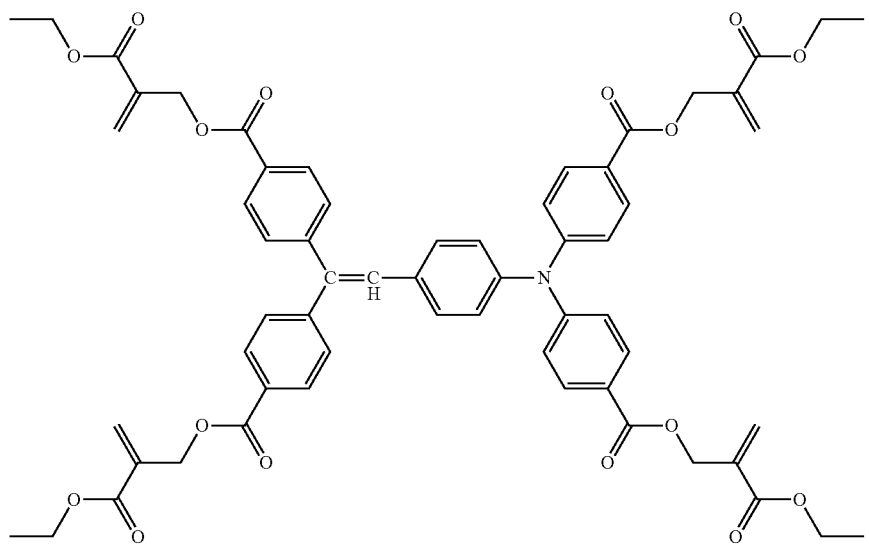

-continued
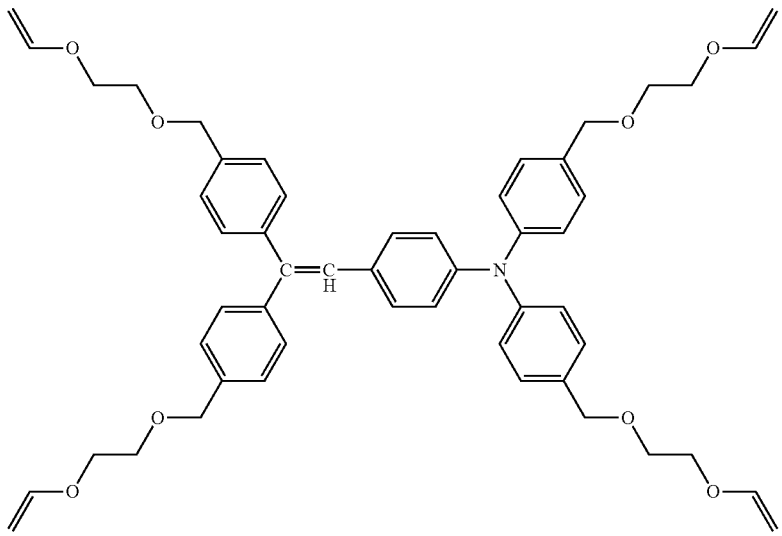
IV-27
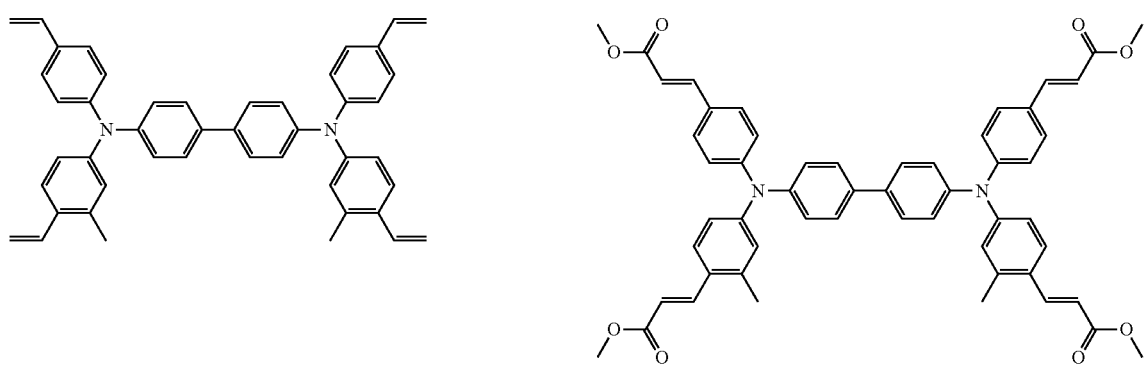
IV-28  IV-29
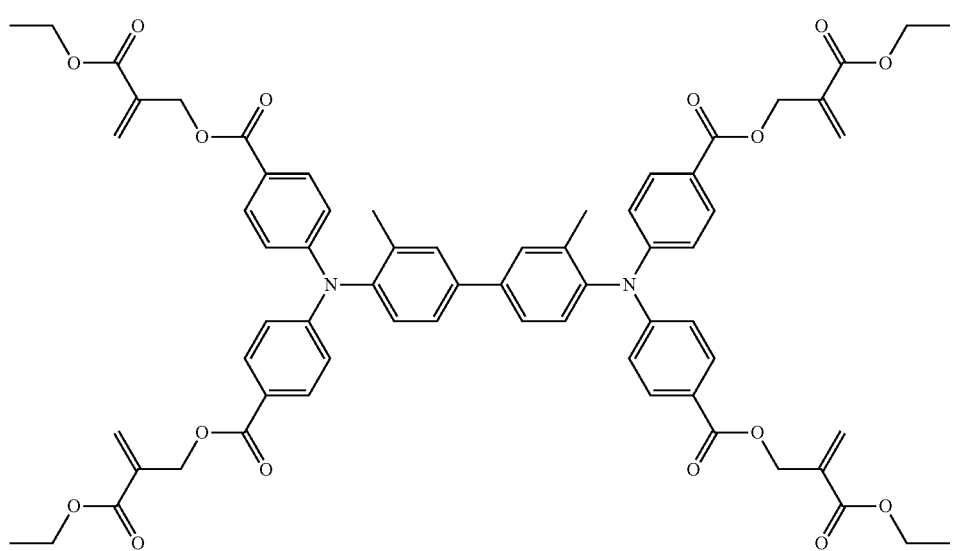
IV-30

IV-31
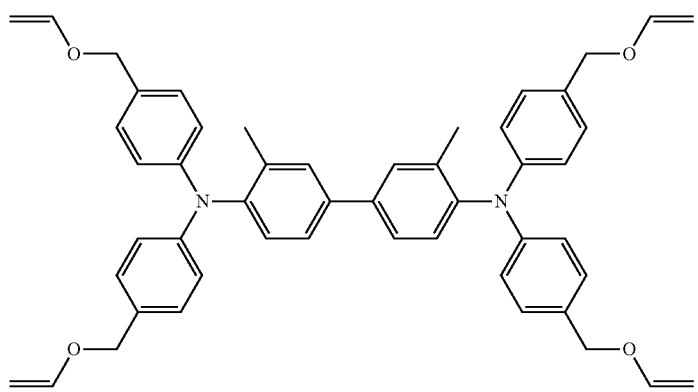
IV-32
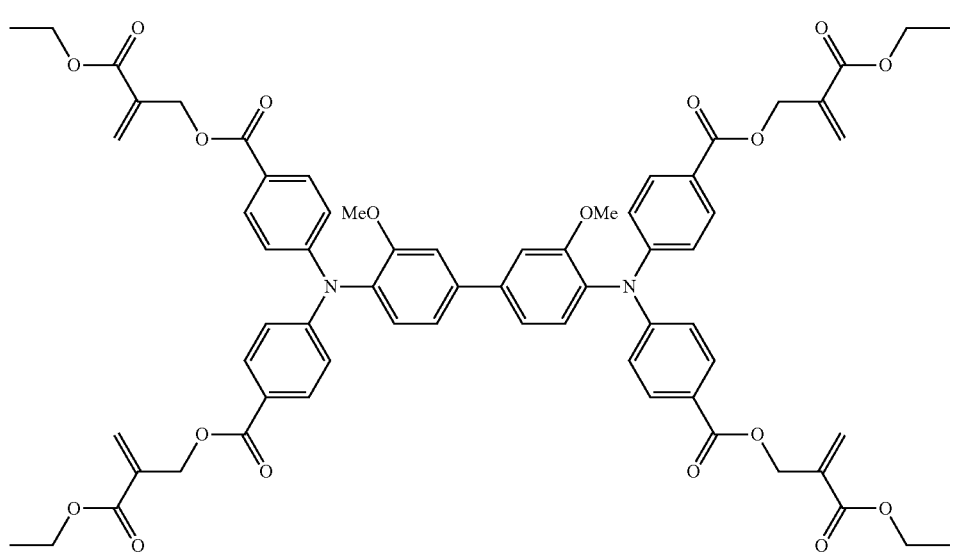
IV-33
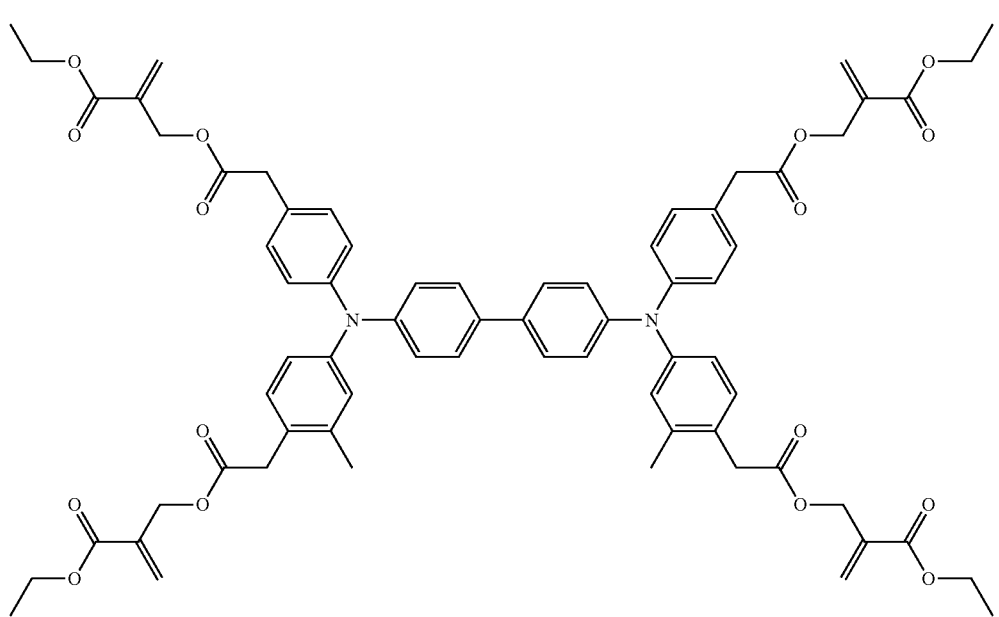

IV-34
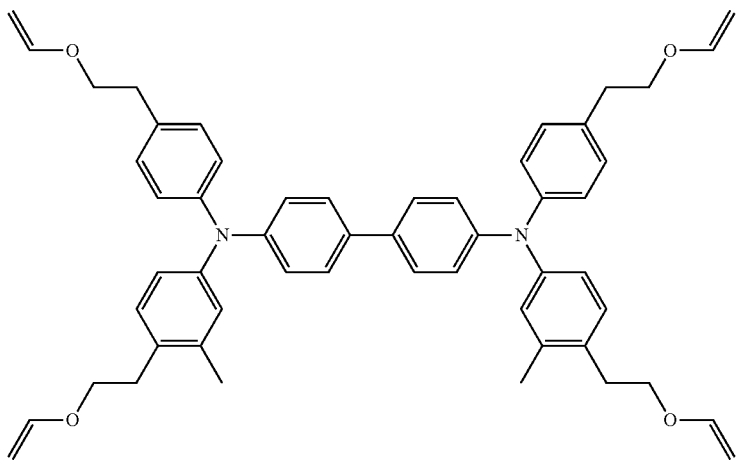
IV-35
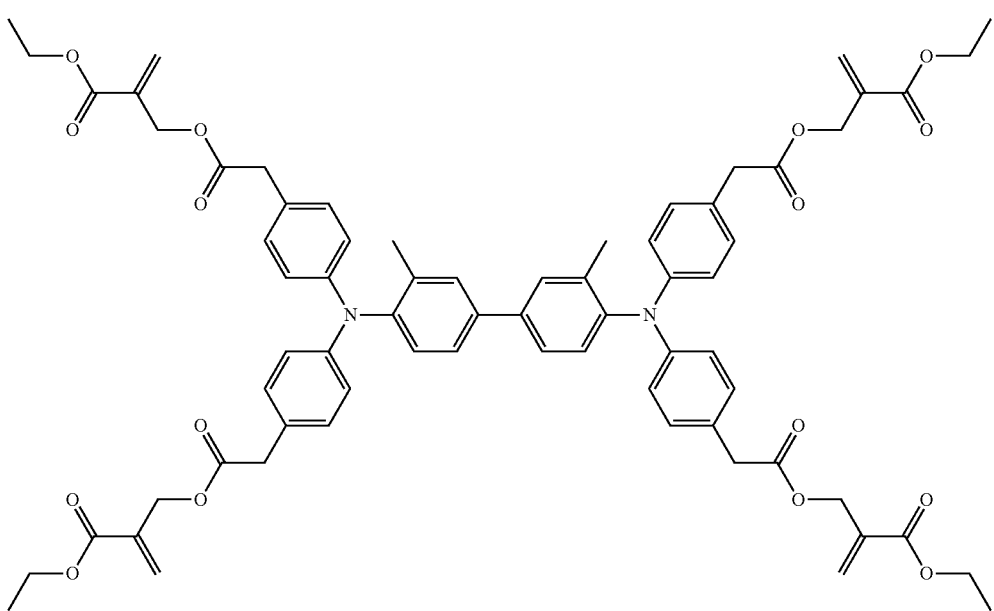
IV-36
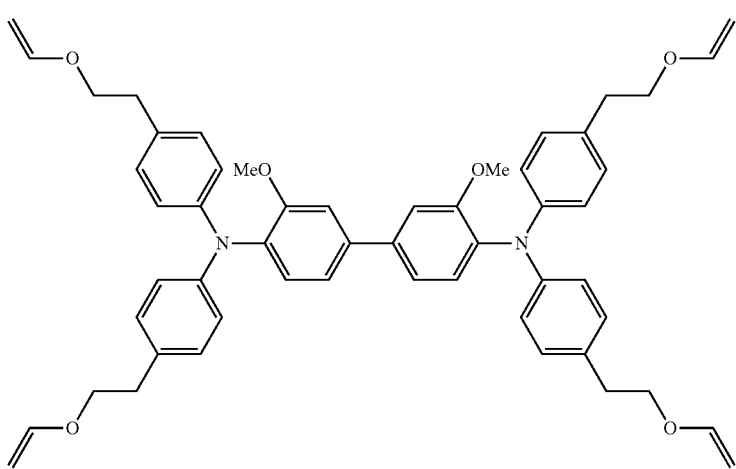

-continued
IV-37
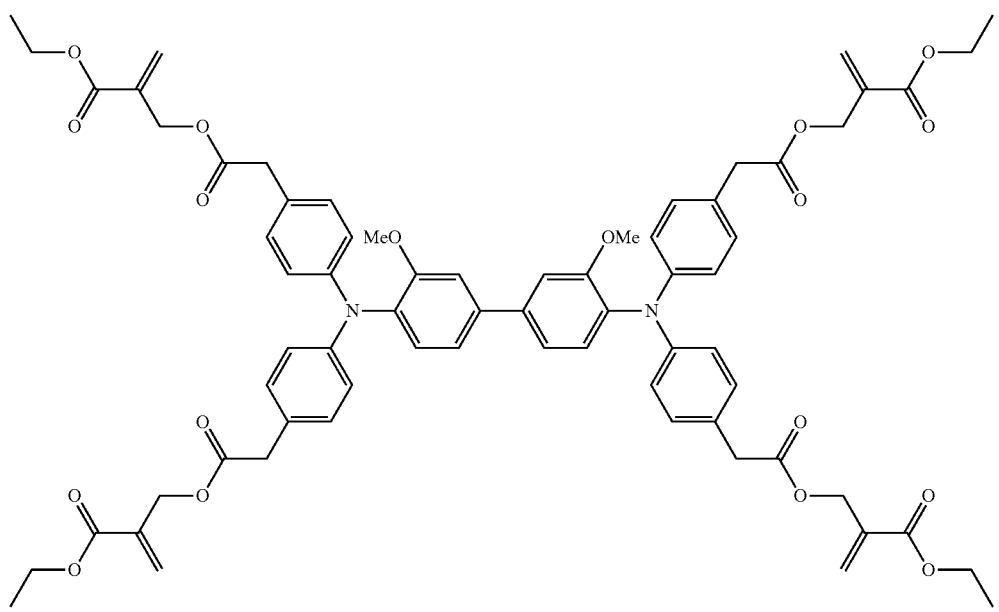
IV-38
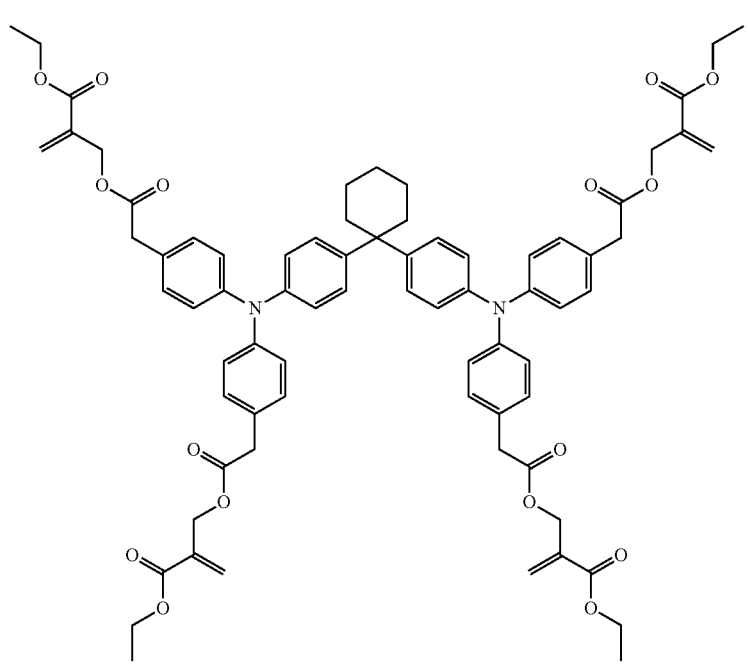

-continued
IV-39
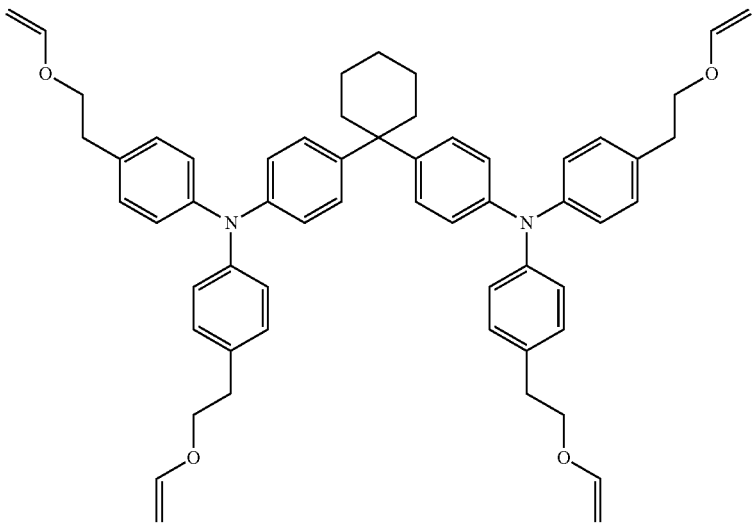
IV-40
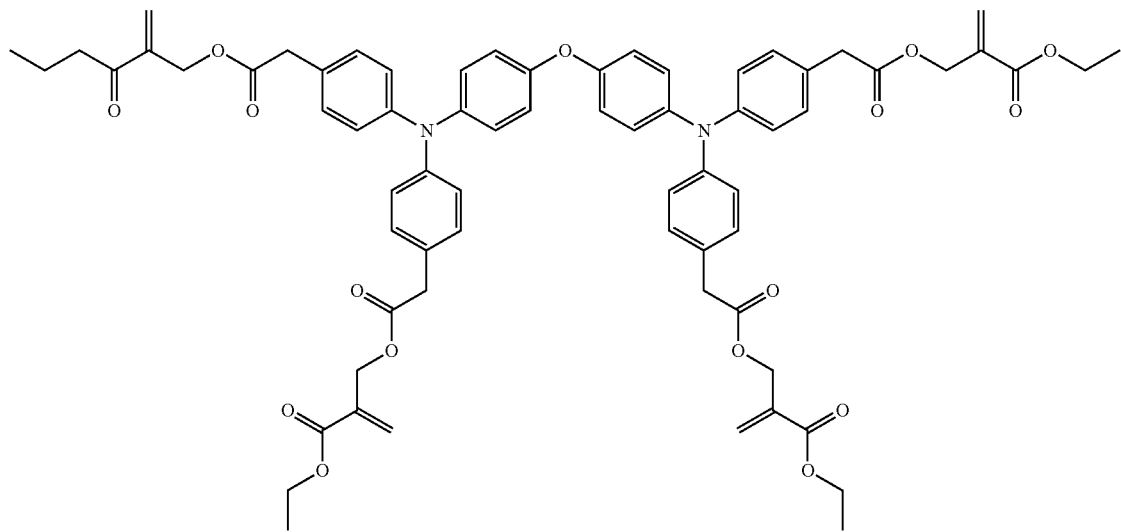

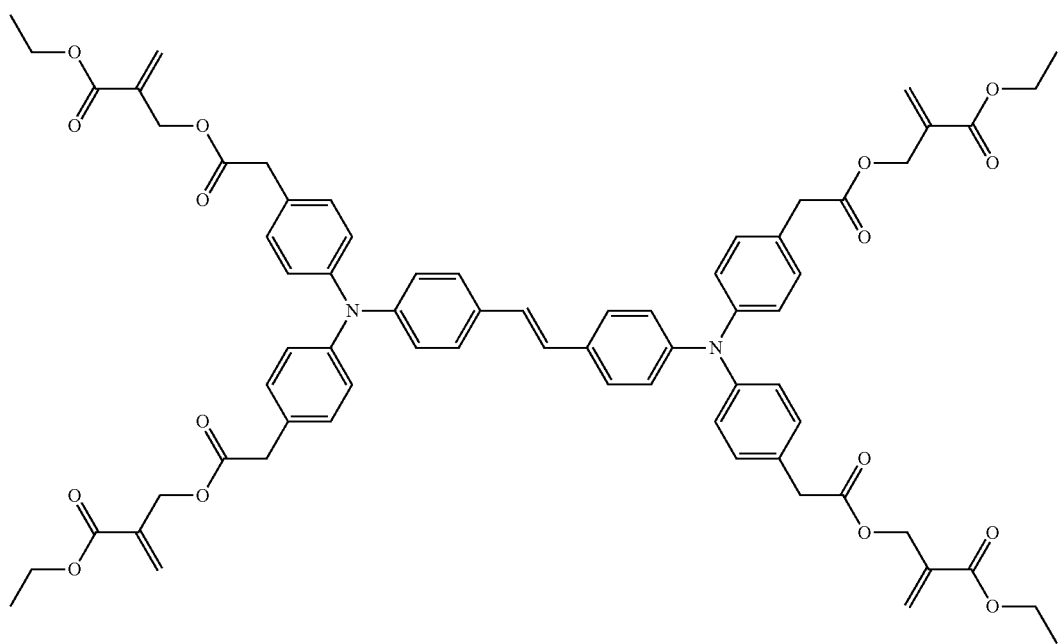
IV-41
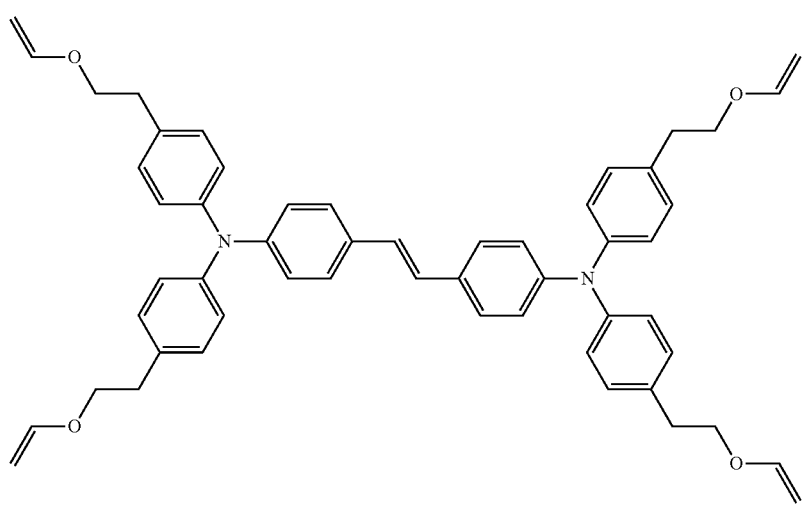
IV-42

IV-43
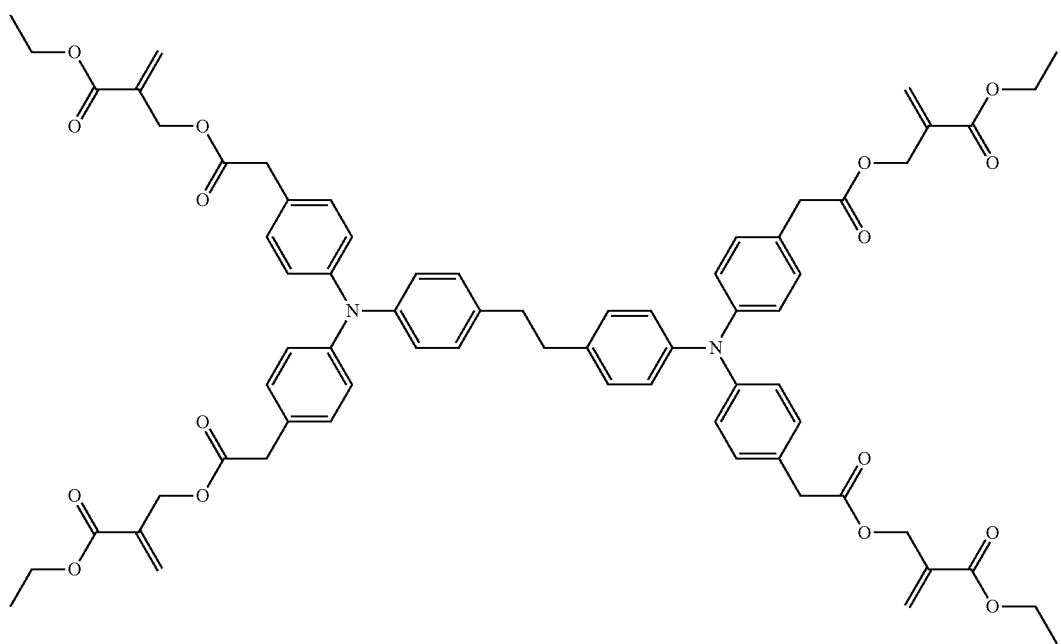
IV-44
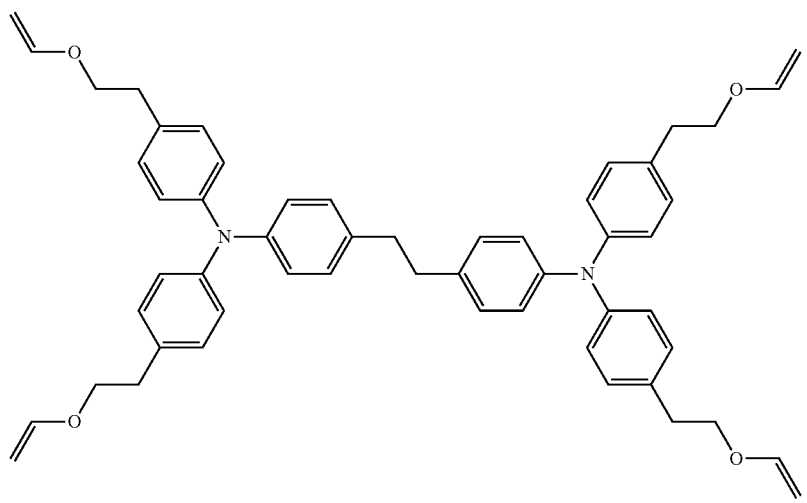

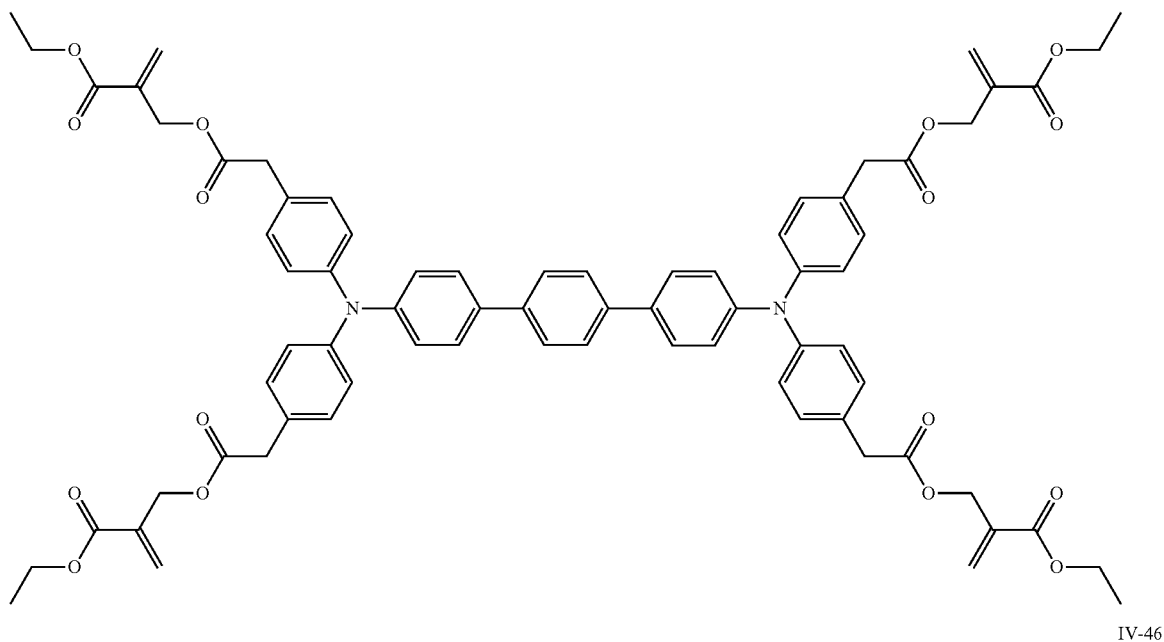
IV-45
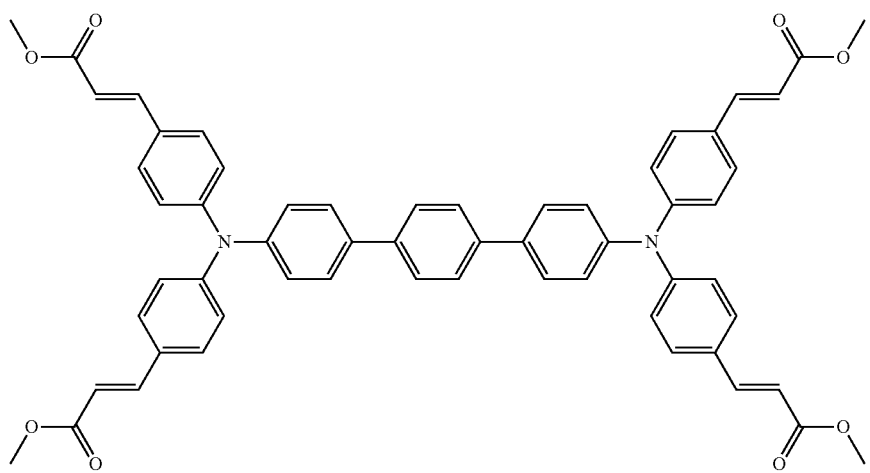
IV-46
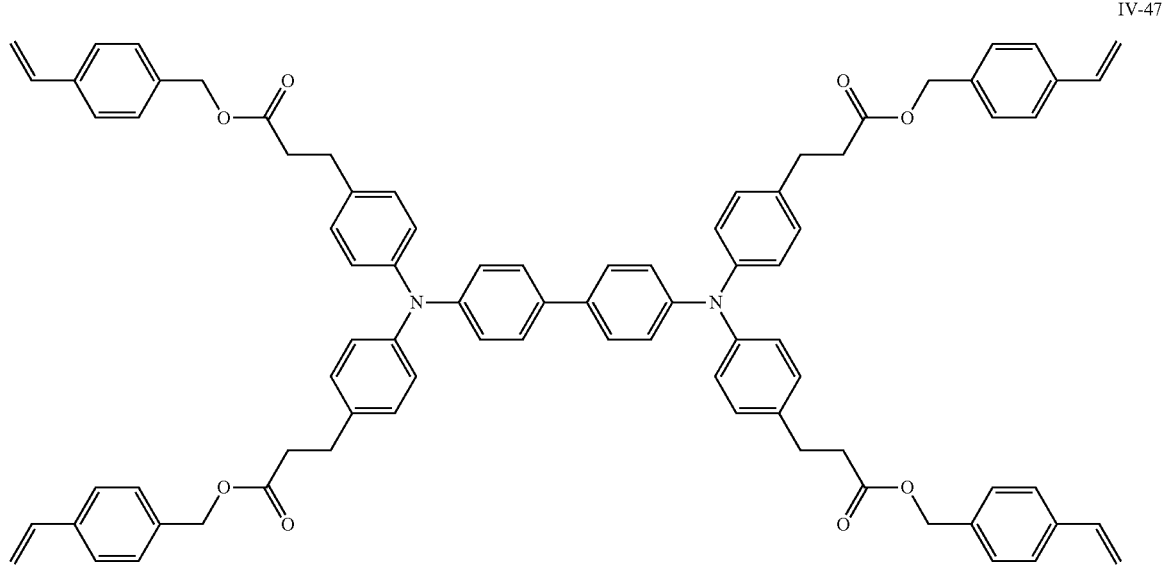
IV-47

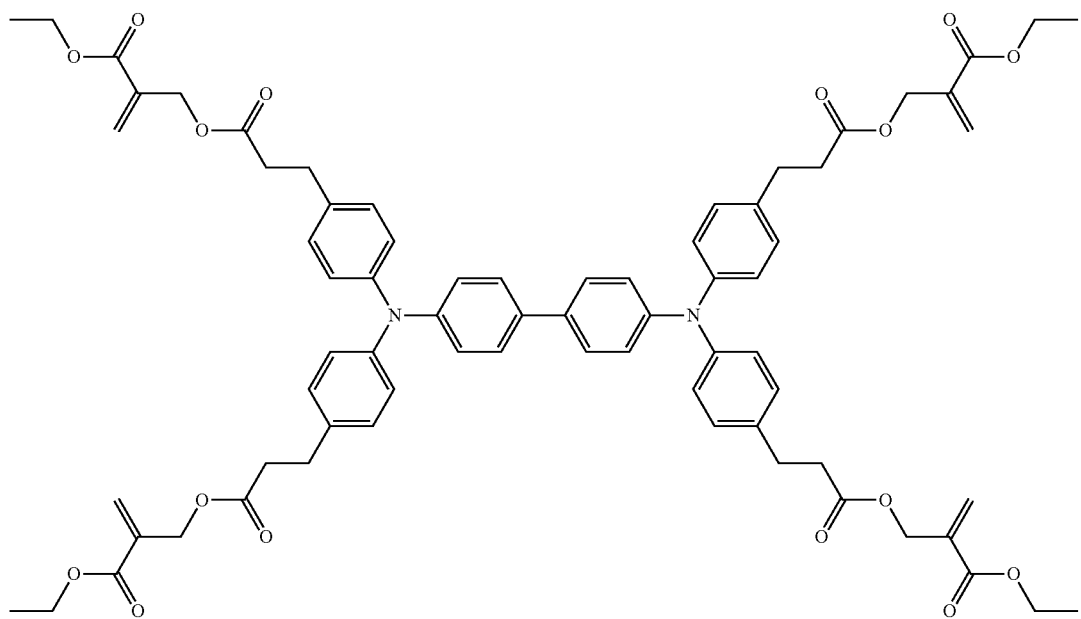
IV-48
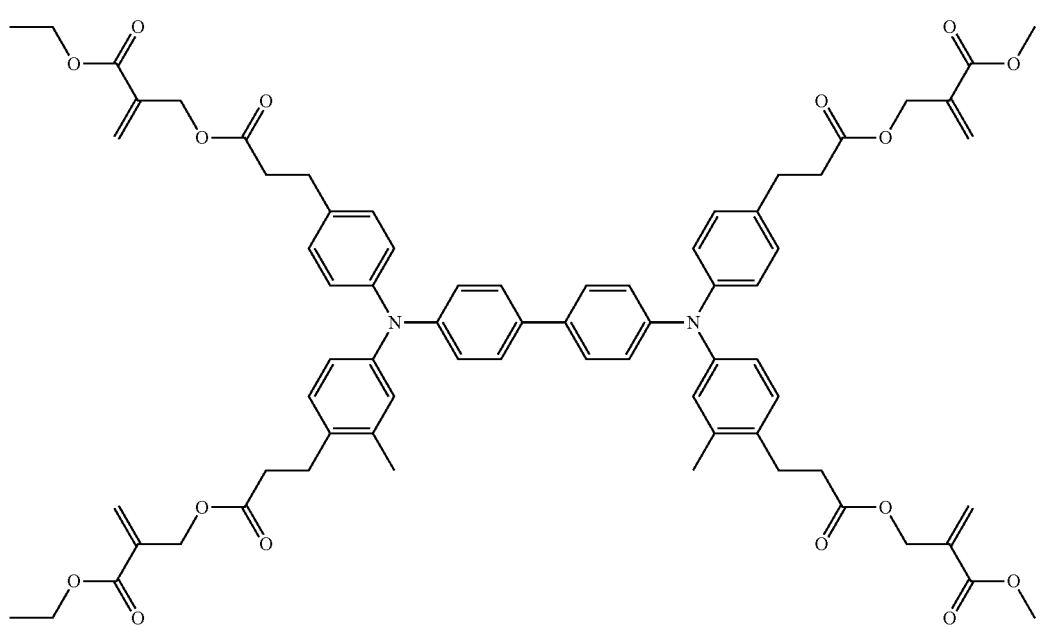
IV-49

IV-50
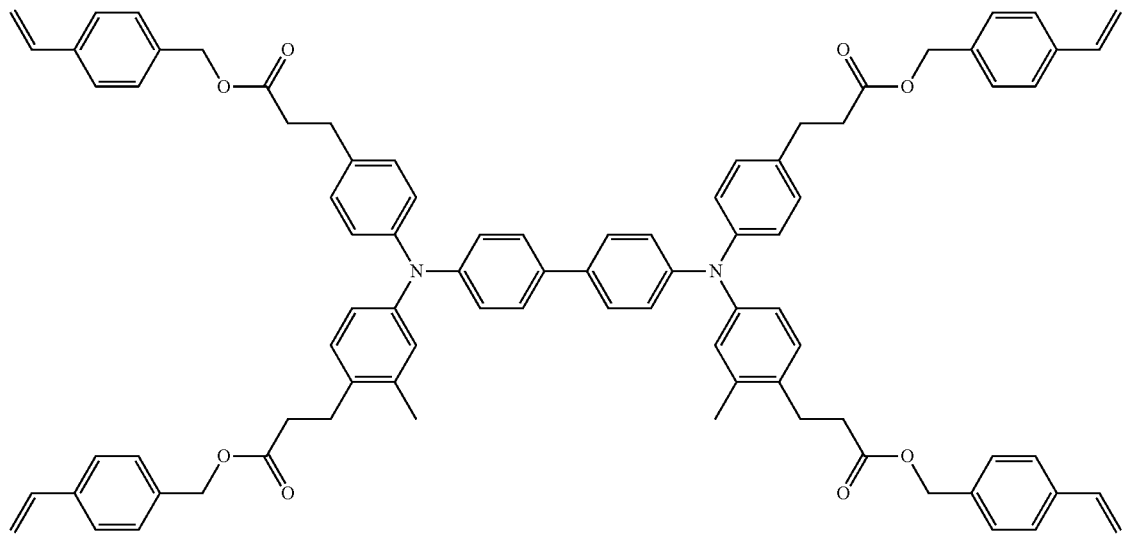
IV-51
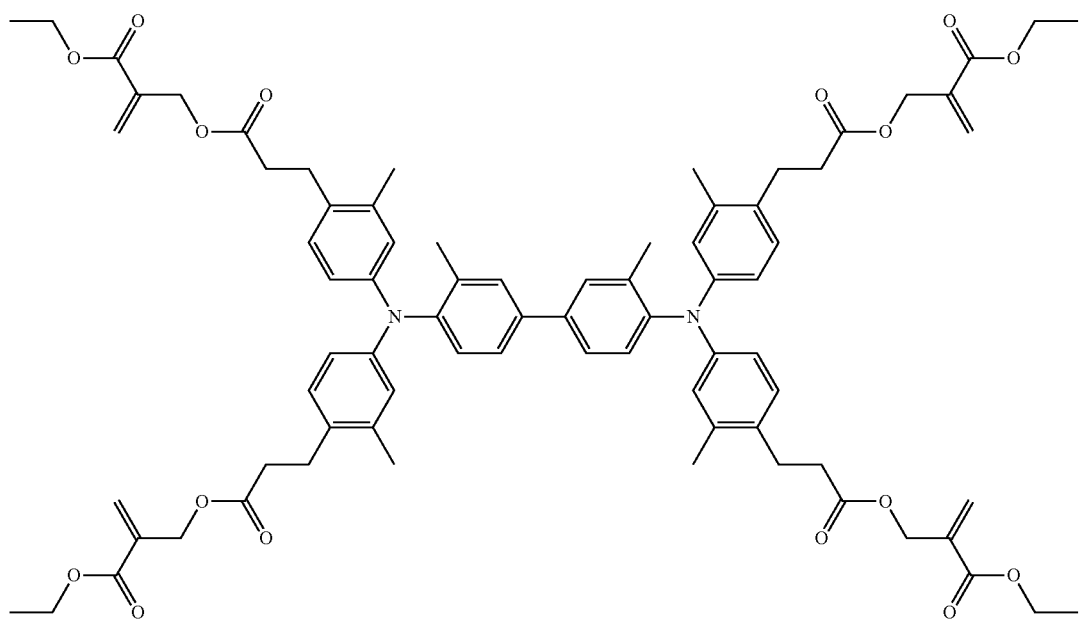

-continued
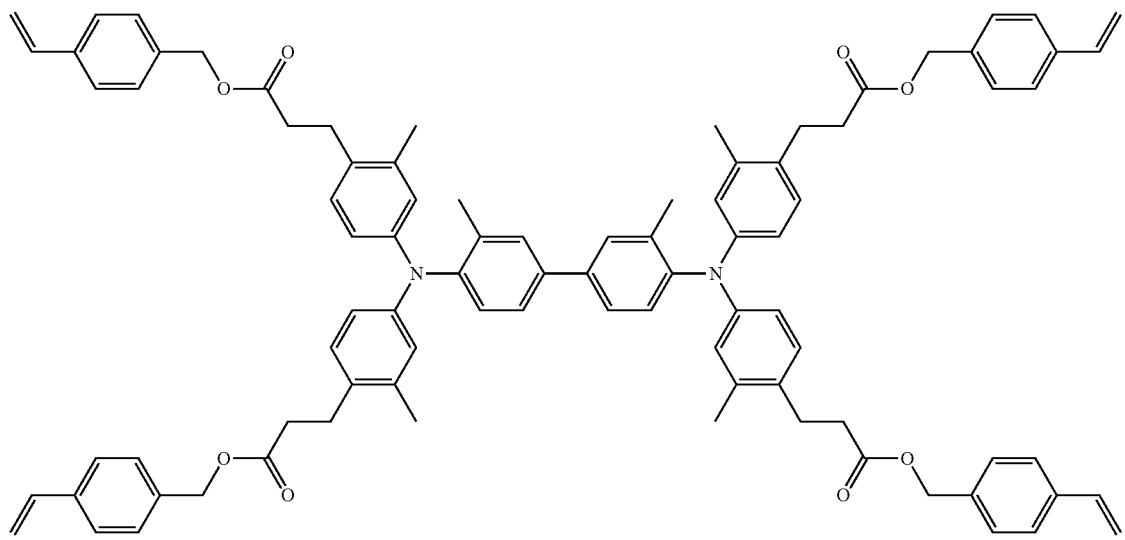
IV-52
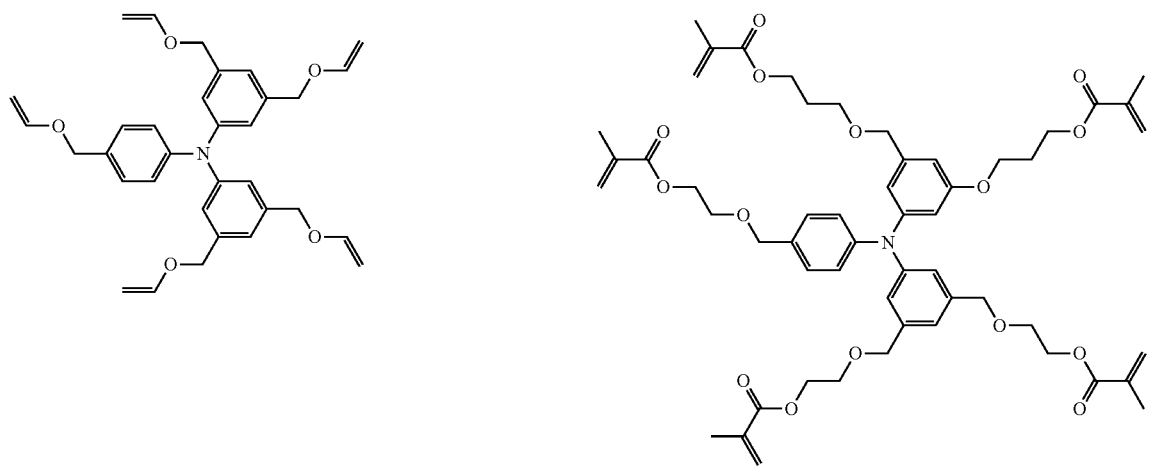
IV-53  IV-54

IV-55
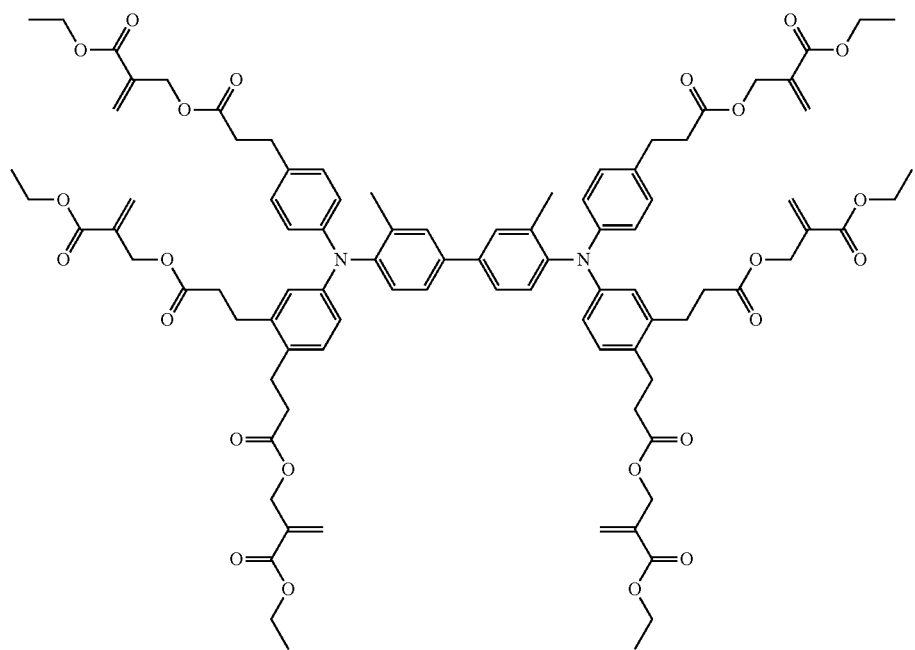
IV-56
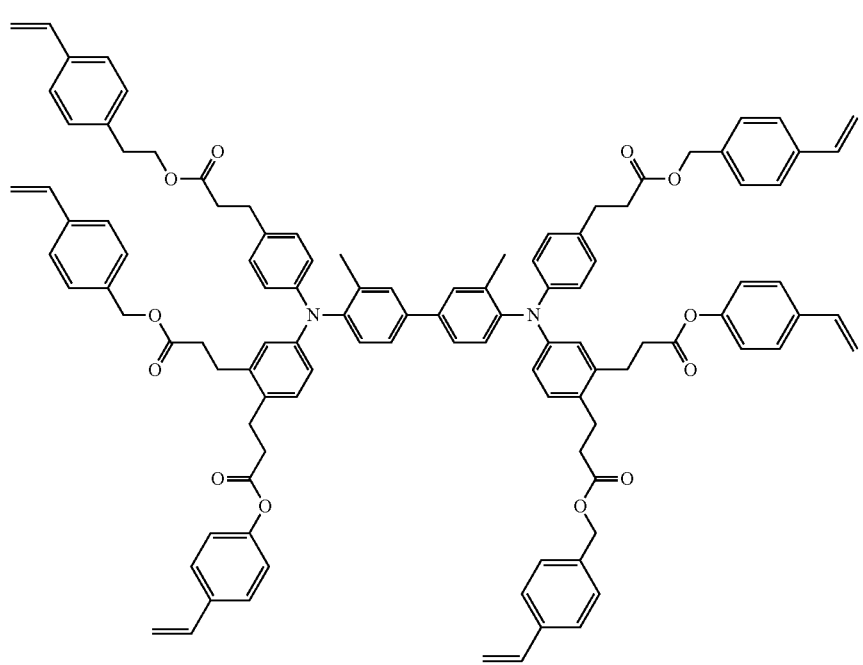

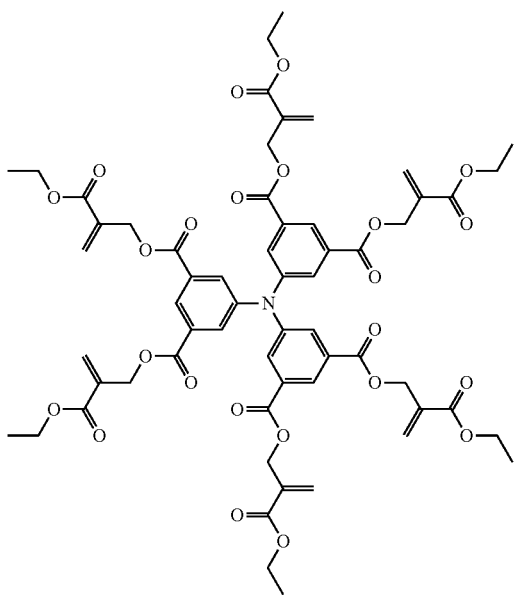

IV-57

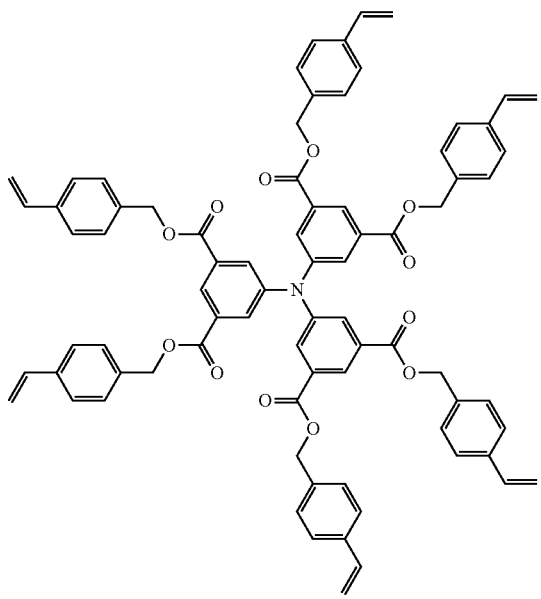

IV-58

Furthermore, it is preferable that in the charge transporting material, one or more carbon atoms are present between a charge transporting component and the reactive group, and it is most preferable that the linking group is an alkylene group.

In addition, the reactive group particularly preferably has a structure having a methacryl group.

The compound represented by the general formula (1) is synthesized as follows.

That is, the compound represented by the general formula (1) is synthesized by condensing an alcohol which is a precursor with a corresponding compound having a reactive group (for example, methacrylic acid or a methacrylic halide), or in the case where the alcohol which is a precursor has a benzyl alcohol structure, by dehydration/etherification or the like with a methacrylic acid derivative having a hydroxyl group, or the like, such as hydroxyethyl methacrylate and the like.

The synthesis route for the compound IV-4 and the compound IV-17 used in the present exemplary embodiment is shown below.

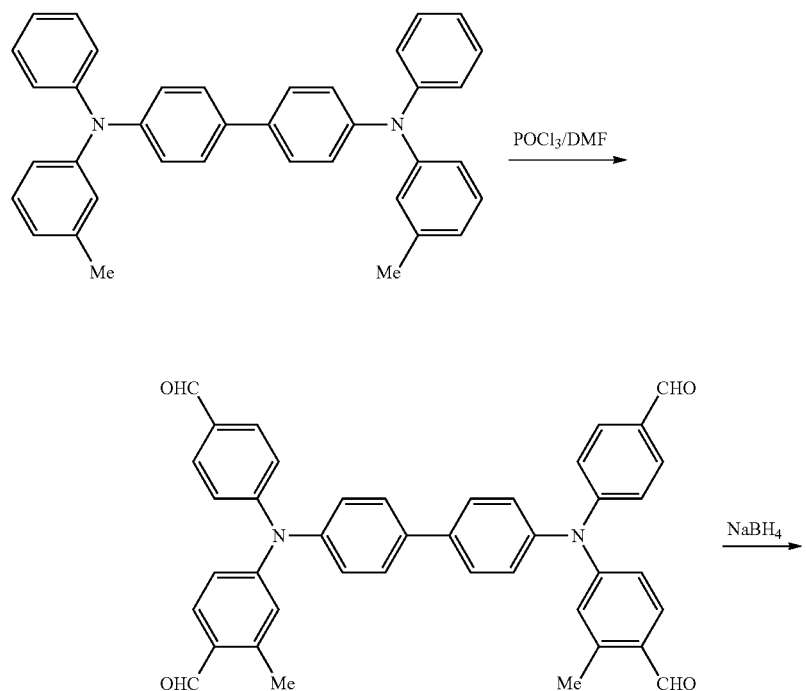

-continued
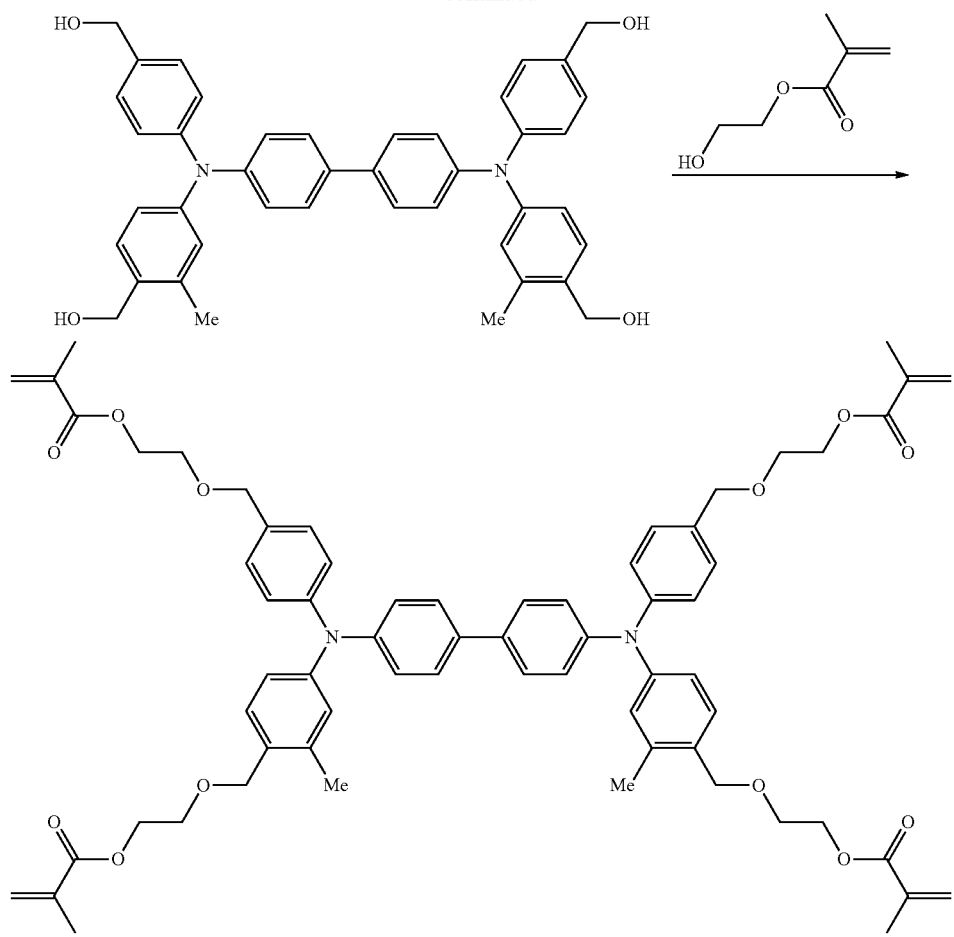
Compound IV-4
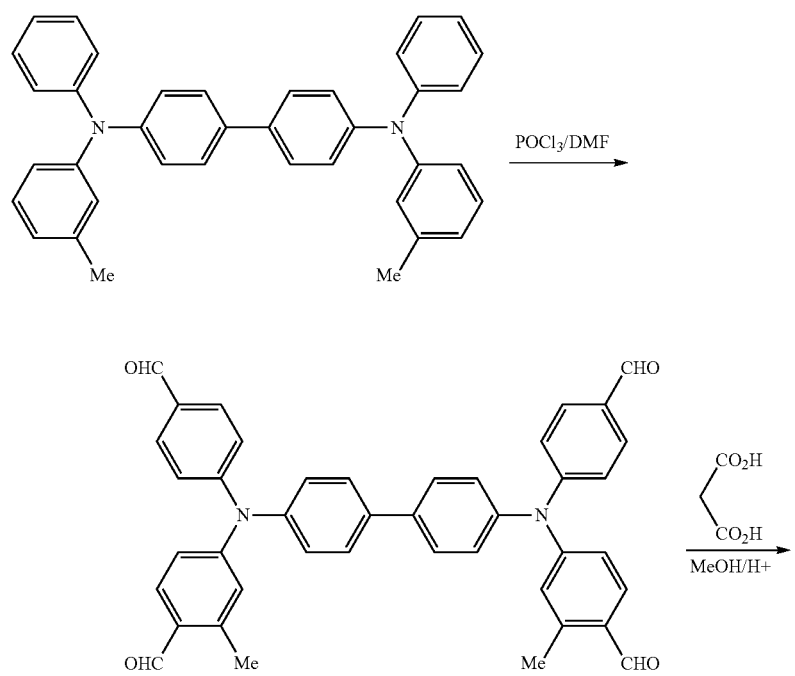

111
-continued
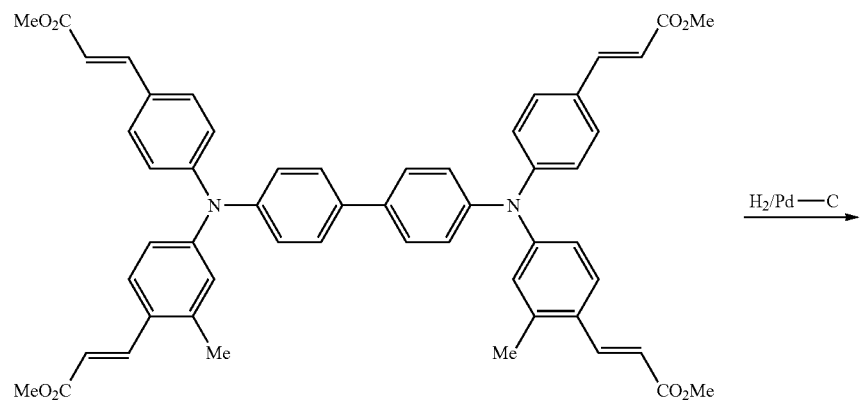
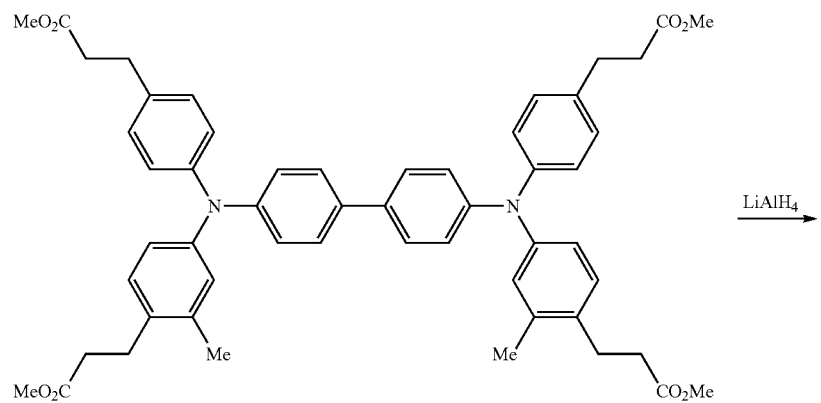
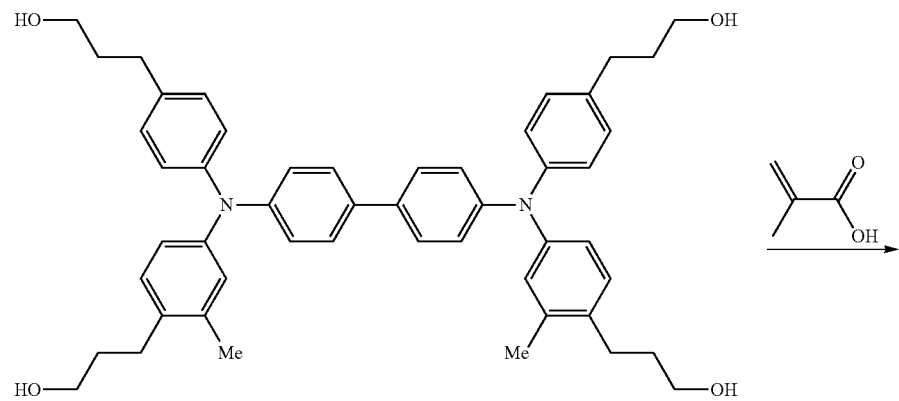

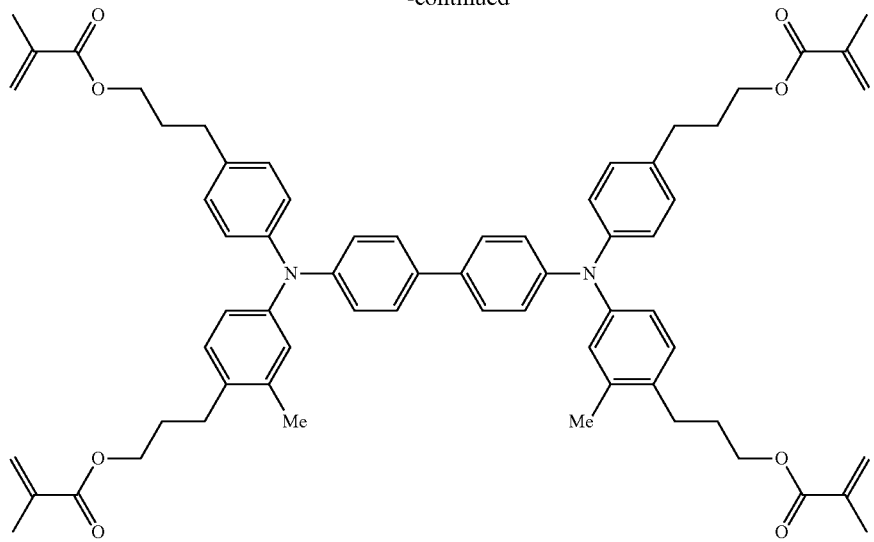

Compound IV-17

When the electrophotographic photoreceptor according to the first exemplary embodiment is prepared, in the coating liquid for forming the charge transporting layer 2B-2 which is a surface photosensitive layer, the amount of the charge transporting material is preferably 30% by weight or more and 90% by weight or less, more preferably 40% by weight or more and 85% by weight or less, and particularly preferably 50% by weight or more and 80% or less, based on the total amount of the solid contents in the coating liquid, in the case of using the charge transporting material having a reactive group.

The charge transporting material having a reactive group preferably has two or more reactive groups in the same molecule, and a compound having a triphenyl amine skeleton and four or more methacryl groups in the same molecule is more preferably used. The amount of the compound having a triphenyl amine skeleton and four or more methacryl groups in the same molecule is preferably 5% by weight or more, more preferably 10% by weight or more, and particularly preferably 15% by weight or more, based on the total amount of the solid contents in the coating liquid.

(Other Materials) As a material constituting the charge transporting layer 2B-2 which will be a surface photosensitive layer, a reactive material having no charge transporting property, a binding resin, or the like may be used, in addition to those described above.

Reactive Monomer Having No Charge Transporting Property

The charge transporting layer 2B-2 which will be a surface photosensitive layer may contain a reactive monomer having no charge transporting ability.

Examples of the reactive group of the reactive monomer having no charge transporting ability include at least one selected from an acryl group, a methacryl group, a styryl group, and derivatives thereof.

Furthermore, examples of the reactive monomer having no charge transporting ability include compounds having the structure represented by the following general formula (2).

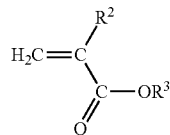

General Formula (2)

(in the general formula (2), $R^2$ represents hydrogen or an alkyl group having 1 to 4 carbon atoms; $R^3$ represents an organic group having 4 or more carbon atoms, having no charge transporting ability).

Examples of the reactive monomer having no charge transporting ability, represented by the general formula (2), include the following monomers. Further, in the following examples, the "(meth)acrylate" means acrylate or methacrylate, and for example, the "isobutyl (meth)acrylate" means both of isobutyl acrylate and isobutyl methacrylate.

Examples of the monofunctional monomer include isobutyl (meth)acrylate, t-butyl (meth)acrylate, isooctyl (meth)acrylate, lauryl (meth)acrylate, isodecyl (meth)acrylate, tridecyl (meth)acrylate, stearyl (meth)acrylate, isobornyl (meth)acrylate, caprolactone (meth)acrylate, cyclohexyl (meth)acrylate, methoxy triethylene glycol (meth)acrylate, 2-ethoxyethyl (meth)acrylate, 2-(2-ethoxyethoxy)ethyl (meth)acrylate, tetrahydrofurfuryl (meth)acrylate, benzyl (meth)acrylate, ethyl carbitol (meth)acrylate, phenoxyethyl (meth)acrylate, 2-hydroxypropyl (meth)acrylate, 4-hydroxybutyl (meth)acrylate, methoxy polyethylene glycol (meth)acrylate, methoxy polyethylene glycol(meth)acrylate, phenoxy polyethylene glycol (meth)acrylate hydroxyethyl-O-phenyl phenol (meth)acrylate, O-phenylphenol glycidyl ether (meth)acrylate, alkoxylated alkyl (meth)acrylate, and the like.

Examples of the bifunctional monomer include 1,3-butylene glycol di(meth)acrylate, 1,4-butadiene glycol di(meth)acrylate, 1,6-hexanediol di(meth)acrylate, neopentylglycol di(meth)acrylate, tetraethylene glycol di(meth)acrylate, triethylene glycol di(meth)acrylate, tripropylene glycol di(meth)acrylate, diethylene glycol di(meth)acrylate, ethoxylated bisphenol A di(meth)acrylate, cyclohexane dimethanol di(meth)acrylate, tricyclodecane di(meth)acrylate, alkoxylated neopentylglycol di(meth)acrylate, polyethylene glycol di(meth)acrylate, polypropylene glycol di(meth)acrylate, and the like.

Examples of the trifunctional monomer include trimethylolpropane tri(meth)acrylate, pentaerythritol tri(meth)acrylate, aliphatic tri(meth)acrylate, alkoxylated trimethylol propane tri(meth)acrylate, and the like.

Examples of the tetrafunctional monomer include pentaerythritol tetra(meth)acrylate, ditrimethylolpropane tetra(meth)acrylate, aliphatic tetra(meth)acrylate, and the like.

As the pentafunctional or higher functional monomer, dipentaerythritol penta(meth)acrylate, dipentaerythritol hexa(meth)acrylate, or the like is used.

These reactive monomers having no charge transporting ability, having a side chain having 4 or more carbon atoms may be used singly or two or more kinds of the reactive monomers may also be used.

The reactive monomer having no charge transporting ability is used in an amount of less than 100%, and preferably 50% or less, and more preferably 30% or less in terms of a weight ratio, as a constituent unit derived from the reactive monomer in the photosensitive layer.

Polymerization Initiator

When the charge transporting layer 2B-2 which is a surface photosensitive layer is formed using a dispersion including the above-described charge transporting material having a reactive group, the reactive monomer having no charge transporting property, or the like, polymerization may be carried out by electron beam irradiation without the use of a polymerization initiator, but a thermal polymerization initiator, for example, may be added in advance, and then polymerization may be carried out using a polymerization initiator.

Examples of the thermal polymerization initiator include azo-based initiators such as V-30, V-40, V-59, V-601, V-65, V-70, VF-096, Vam-110, and Vam-111 (manufactured by Wako Pure Chemical Industries, Ltd.), OTazo-15, OTazo-30, AIBN, AMBN, ADVN, and ACVA (manufactured by Otsuka Pharmaceutical Co., Ltd.), as well as PERTETRAA, PERHEXA HC, PERHEXA C, PERHEXA V, PERHEXA 22, PERHEXA MC, PERBUTYL H, PERCUMYL H, PERCUMYL P, PERMENTA H, PEROCTA H, PERBUTYL C, PERBUTYL D, PERHEXYL D, PEROYL IB, PEROYL 355, PEROYL L, PEROYL SA, NYPER BW, NYPER BMT-K40/M, PEROYL IPP, PEROYL NPP, PEROYL TCP, PEROYL OPP, PEROYL SBP, PERCUMYL ND, PEROCTA ND, PERHEXYL ND, PERBUTYL ND, PERBUTYL NHP, PERHEXYL PV, PERBUTYL PV, PERHEXA 250, PEROCTA O, PERHEXYL O, PERBUTYL O, PERBUTYL L, PERBUTYL 355, PERHEXYL I, PERBUTYL I, PERBUTYL E, PERHEXA 25Z, PERBUTYL A, PERHEXYL Z, PERBUTYL ZT, and PERBUTYL Z (manufactured by NOF Corporation), Kayaketal AM-055, Trigonox 36-C75, Laurox, Perkadox L-W75, Perkadox CH-50L, Trigonox TMBH, Kayacumene H, Kayabutyl H-70, Perkadox BC-FF, Kayahexa AD, Perkadox 14, Kayabutyl C, Kayabutyl D, Kayahexa YD-E85, Perkadox 12-XL25, Perkadox 12-EB20, Trigonox 22-N70, Trigonox 22-70E, Trigonox D-T50, Trigonox 423-C70, Kayaester CND-C70, Kayaester CND-W50, Trigonox 23-C70, Trigonox 23-W50N, Trigonox 257-C70, Kayaester P-70, Kayaester TMPO-70, Trigonox 121, Kayaester O, Kayaester HTP-65W, Kayaester AN, Trigonox 42, Trigonox F-050, Kayabutyl B, Kayacarbon EH-C70, Kayacarbon EH-W60, Kayacarbon 1-20, Kayacarbon BIC-75, Trigonox 117, and Kayalen 6-70 (manufactured by Kayaku Akzo Corporation), Luperox 610, Luperox 188, Luperox 844, Luperox 259, Luperox 10, Luperox 701, Luperox 11, Luperox 26, Luperox 80, Luperox 7, Luperox 270, Luperox P, Luperox 546, Luperox 554, Luperox 575, Luperox TANPO, Luperox 555, Luperox 570, Luperox TAP, Luperox TBIC, Luperox TBEC, Luperox JW, Luperox TRIC, Luperox TAEC, Luperox DC, Luperox 101, Luperox F, Luperox DI, Luperox 130, Luperox 220, Luperox 230, Luperox 233, and Luperox 531 (manufactured by Arkema Yoshitomi, Ltd.), and the like.

Examples of the photopolymerization initiator include intramolecular cleavage-type photopolymerization initiators, hydrogen abstraction-type photopolymerization initiators, and the like. Examples of the intramolecular cleavage-type photopolymerization initiator include benzyl ketal-based photopolymerization initiators, alkylphenone-based photopolymerization initiators, aminoalkylphenone-based photopolymerization initiators, phosphine oxide-based photopolymerization initiators, titanocene-based photopolymerization initiators, and oxime-based photopolymerization initiators. Specifically, examples of the benzyl ketal-based photopolymerization initiator include 2,2-dimethoxy-1,2-diphenylethan-1-one. Examples of the alkylphenone-based photopolymerization initiator include 1-hydroxycyclohexylphenylketone, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, acetophenone, and 2-phenyl-2-(p-toluenesulfonyloxy)-acetophenone. Examples of the aminoalkylphenone-based photopolymerization initiator include p-dimethylaminoacetophenone, p-dimethylaminopropiophenone, 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, and the like. Examples of the phosphine oxide-based photopolymerization initiator include 2,4,6-trimethylbenzoyl-diphenyl phosphine oxide, bis(2,4,6-trimethylbenzoyl)phenyl phosphine oxide, and the like. Examples of the titanocene-based photopolymerization initiator include bis($\eta$5-2,4-cyclopentadien-1-yl)-bis[2,6-difluoro-3-(1H-pyrrol-1-yl)-phenyl]titanium and the like. Examples of the oxime-based photopolymerization initiator include 1-[4-(phenylthio)-2-(O-benzoyloxime)-1,2-octanedione, 1-[9-ethyl-6-(2-methylbenzoyl)-9H-carbazol-3-yl]-1-(O-acetyloxime)-ethanone, and the like.

Examples of the hydrogen abstraction-type photopolymerization initiator include benzophenone-based photopolymerization initiators, thioxanthone-based photopolymerization initiators, benzyl-based photopolymerization initiators, Michler's ketone-based photopolymerization initiators, and the like. Specific examples of the hydrogen abstraction-type photopolymerization initiator include benzophenone-based photopolymerization initiators, 2-benzoyl benzoic acid, 2-chlorobenzophenone, 4,4'-dichlorobenzophenone, 4-benzoyl-4'-methyldiphenyl sulfide, p,p'-bisdiethylaminobenzophenone, and the like. Examples of the thioxanthone-based photopolymerization initiator include 2,4-diethylthioxanthen-9-one, 2-chlorothioxanthone, 2-isopropylthioxanthone, and the like. Examples of the benzil-based photopolymerization initiator include benzil, (±)-camphor-quinone, p-anisil, and the like.

These polymerization initiators are added in an amount of 0.2% by weight or more and 10% by weight or less, preferably 0.5% by weight or more and 8% by weight or less, more preferably 0.7% by weight or more and 5% by weight or less, based on the total amount of the solid contents when a coating liquid for forming the charge transporting layer 2B-2 which is a surface photosensitive layer is prepared.

It is preferable that the polymerization reaction is carried out in vacuo, or at a low oxygen concentration of an oxygen concentration of 10% or less, preferably 5% or less, and more preferably 1% or less, such as under an inert gas atmosphere, so that the chain reaction may be carried out without deactivating the radicals generated.

Binding Resin

Specific examples of the binding resin which may be used in the charge transporting layer 2B-2 include known polymer resin compounds, for example, acetal resins such as a polyvinyl butyral resin and the like, polyvinyl alcohol resins, casein, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenolic resins, phenol-formaldehyde resins, melamine resins, urethane resins, and the like; zirconium chelate compounds; charge transporting resins having charge transporting groups; and conductive resins such as polyaniline and the like. Among these, polyvinyl acetal resins, phenol-formaldehyde resins, phenol resins, and polyvinyl acetate resins are preferable.

Furthermore, polymer charge transporting materials such as the polyester-based polymer charge transporting materials disclosed in JP-A-8-176293 and JP-A-8-208820 may also be used.

In the case where a binding resin is used in the surface photosensitive layer (the charge transporting layer 2B-2 in the first exemplary embodiment), the viscosity average molecular weight of the binding resin is preferably 50000 or more, and more preferably 55000 or more. These binding resins are used singly or as a mixture of two or more kinds thereof.

Furthermore, the proportion of the binding resin in the surface photosensitive layer is preferably 10% by weight or more and 80% by weight or less.

Other Materials

In the charge transporting layer 2B-2 of the present exemplary embodiment, an antioxidant, other coupling agents, fluorine compounds, or other additives are mixed and used.

As the other coupling agents or fluorine compounds, various silane coupling agents and commercially available silicon-based hardcoating agents are used.

As a silane coupling agent, vinyltrichlorosilane, vinyltrimethoxysilane, vinyltriethoxysilane, γ-glycidoxypropylmethyldiethoxysilane, γ-glycidoxypropyltrimethoxysilane, γ-glycidoxypropyltriethoxysilane, γ-aminopropyltriethoxysilane, γ-aminopropyltrimethoxysilane, γ-aminopropylmethyldimethoxysilane, N-β(aminoethyl)-γ-aminopropyltriethoxysilane, tetramethoxysilane, methyltrimethoxysilane, dimethyldimethoxysilane, or the like is used.

As a commercially available hardcoating agent, KP-85, X-40-9740, and X-8239 (all manufactured by Shin-Etsu Chemical Co., Ltd.), and AY42-440, AY42-441, and AY49-208 (all manufactured by Dow Corning Toray Co., Ltd.), or the like is used.

Furthermore, a fluorine-containing compound such as (tridecafluoro-1,1,2,2-tetrahydrooctyl)triethoxysilane, (3,3,3-trifluoropropyl)trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane, 1H,1H,2H,2H-perfluorooctyltriethoxysilane, and the like may be added.

The amount of the silane coupling agent is arbitrary, but the amount of the fluorine-containing compound is preferably 0.25 time or less by weight with respect to the compound containing no fluorine. In addition, a polymerizable fluorine compound as disclosed in JP-A-2001-166510 or the like may be mixed. Moreover, a resin which is dissolved in an alcohol may be added.

Furthermore, when the coating liquid is obtained by reacting the above-mentioned components, the components may simply be mixed and dissolved, but are preferably heated to room temperature (20° C.) or higher and 100° C. or lower, and more preferably 30° C. or higher and 80° C. or lower, for 10 minutes or more and 100 hours or less, and preferably 1 hour or more and 50 hours or less. Further, at this time, it is also preferable to irradiate ultrasonic waves.

A deterioration inhibitor is preferably added to the charge transporting layer 2B-2. Preferable examples of the deterioration inhibitor include hindered phenol-based deterioration inhibitors and hindered amine-based deterioration inhibitors, and known antioxidants such as organic sulfur-based antioxidants, phosphite-based antioxidants, dithiocarbamate-based antioxidants, thiourea-based antioxidants, benzoimidazole-based antioxidants, and the like are used. The amount of the deterioration inhibitor to be used is preferably 20% by weight or less, and more preferably 10% by weight or less.

Examples of the hindered phenol-based antioxidant include "IRGANOX 1076", "IRGANOX 1010", "IRGANOX 1098", "IRGANOX 245", "IRGANOX 1330", "IRGANOX 3114", and "IRGANOX 1076" (manufactured by Ciba Japan), "3,5-di-t-butyl-4-hydroxybiphenyl", and the like.

Examples of the hindered amine-based antioxidants include "SANOL LS2626", "SANOL LS765", "SANOL LS770", and "SANOL LS744" (all manufactured by Sankyo Lifetech Co., Ltd.), "TINUVIN 144" and "TINUVIN 622LD" (all manufactured by Ciba Japan), and "MARK LA57", "MARK LA67", "MARK LA62", "MARK LA68", and "MARK LA63" (all manufactured by Adeka Corporation); examples of the thioether-based antioxidants include "SUMILIZER TPS" and "SUMILIZER TP-D" (all manufactured by Sumitomo Chemical Co., Ltd.); and examples of the phosphate antioxidants include "MARK 2112", "MARK PEP-8", "MARK PEP-24G", "MARK PEP-36", "MARK 329K", and "MARK HP-10" (all manufactured by Adeka Corporation).

Furthermore, conductive particles, organic particles, or inorganic particles may be added to the charge transporting layer 2B-2. Examples of the particles include silicon-containing particles. The silicon-containing particles refer to particles which include silicon as a constitutional element, and specific examples thereof include colloidal silica and silicone particles. The colloidal silica used as the silicon-containing particles is selected from silica having an average particle diameter of 1 nm or more and 100 nm or less, and preferably 10 nm or more and 30 nm or less, and is used after being dispersed in an acidic or alkaline aqueous dispersion or in an organic solvent such as an alcohol, a ketone, an ester, and the like. Commercially available silica is usually used. The solid content of the colloidal silica is not particularly limited, but it is used in an amount in the range of 0.1% by weight or more and 50% by weight or less, and preferably 0.1% by weight or more and 30% by weight or less, based on the total amount of the solid contents.

The silicone particles used as the silicon-containing particles are selected from silicone resin particles, silicone rubber particles, and treated silica particles whose surfaces have been treated with silicone, and commercially available silicone particles may be used. These silicone particles are spherical, and the average particle diameter is preferably 1 nm or more and 500 nm or less, and more preferably 10 nm or more and 100 nm or less. The amount of the silicone particles is preferably 0.1% by weight or more and 30% by weight or less, and more preferably 0.5% by weight or more and 10% by weight or less, based on the total amount of the solid contents.

Examples of other particles include fluorine-containing particles such as ethylene tetrafluoride, ethylene trifluoride, propylene hexafluoride, vinyl fluoride and vinylidene fluoride; particles consisting of a resin obtained by copolymerizing a fluorine resin with monomers having a hydroxy group as shown in "Collected Abstract of $8^{th}$ Polymer Material Forum, p. 89"; and semiconductive metal oxides such as $ZnO-Al_2O_3$, $SnO_2-Sb_2O_3$, $In_2O_3-SnO_2$, $ZnO_2-TiO_2$, $ZnO-TiO_2$, $MgO-Al_2O_3$, $FeO-TiO_2$, $TiO_2$, $SnO_2$, $In_2O_3$, $ZnO$, $MgO$, and the like.

Furthermore, oils such as a silicone oil may be added. Examples of the silicone oil include silicone oils such as dimethylpolysiloxane, diphenylpolysiloxane, phenylmethylsiloxane, and the like; polymerizable silicone oils such as amino-modified polysiloxane, epoxy-modified polysiloxane, carboxyl-modified polysiloxane, carbinol-modified polysiloxane, methacryl-modified polysiloxane, mercapto-modified polysiloxane, phenol-modified polysiloxane, and the like; cyclic dimethylcyclosiloxanes such as hexamethylcyclotrisiloxane, octamethylcyclotetrasiloxane, decamethylcyclopentasiloxane, dodecamethylcyclohexasiloxane, and the like; cyclic methylphenylcyclosiloxanes such as 1,3,5-trimethyl-1,3,5-triphenylcyclotrisiloxane, 1,3,5,7-tetramethyl-1,3,5,7-tetraphenylcyclotetrasiloxane, 1,3,5,7,9-pentamethyl-1,3,5,7,9-pentaphenylcyclopentasiloxane, and the like; cyclic phenylcyclosiloxanes such as hexaphenylcyclotrisiloxane and the like; fluorine-containing cyclosiloxanes such as 3-(3,3,3-trifluoropropyl)methylcyclotrisiloxane and the like; hydrosilyl group-containing cyclosiloxanes such as methylhydrosiloxane mixtures, pentamethylcyclopentasiloxane, phenylhydrocyclosiloxane, and the like; and vinyl group-containing cyclosiloxanes such as pentavinylpentamethylcyclopentasiloxane and the like.

Furthermore, a metal, a metal oxide, carbon black, or the like may be added. Examples of the metal include aluminum, zinc, copper, chromium, nickel, silver and stainless steel, and plastic particles on which any of these metals have been deposited. Examples of the metal oxide include zinc oxide, titanium oxide, tin oxide, antimony oxide, indium oxide, bismuth oxide, indium oxide on which tin has been doped, tin oxide on which antimony or tantalum has been doped, zirconium oxide, and the like, on which antimony has been doped. These may be used singly or in combination of two or more kinds thereof. When two or more kinds are used in combination, they may be simply mixed, or formed into a solid solution or a fused product. The average particle diameter of the conductive particles is 0.3 μm or less, and particularly preferably 0.1 μm or less.

As a coating method when the coating liquid for forming the charge transporting layer 2B-2, a blade coating method, a Meyer bar coating method, a spray coating method, a dip coating method, a bead coating method, an air knife coating method, a curtain coating method, an inkjet method, or the like is used.

The film thickness of the charge transporting layer 2B-2 is preferably 2 μm or more and 60 μm or less, and more preferably 5 μm or more and 50 μm or less.

Charge Transporting Layer 2B-1

As the charge transporting layer 2B-1 in the first exemplary embodiment, a layer formed using the materials used in the above-described charge transporting layer 2B-2 is employed as it is. However, in the charge transporting layer 2B-1 which is not the surface photosensitive layer constituting an outermost surface in the first exemplary embodiment, it is not necessary to contain fluorine-containing resin particles having the above-described specific resin adhered on the surface thereof. That is, the charge transporting layer 2B-1 may be constituted with, for example, known charge transporting materials and a binding resin.

Substrate

As a substrate 1, a substrate having conductivity is used, and examples thereof include metal plates, metal drums, metal belts, and the like, using metals such as aluminum, copper, zinc, stainless steel, chromium, nickel, molybdenum, vanadium, indium, gold, platinum, and the like, or alloys thereof; and paper, plastic films and belts which are coated, deposited, or laminated with a conductive compound such as a conductive polymer, indium oxide, and the like, a metal such as aluminum, palladium, gold, and the like, or alloys thereof. The term "conductive" here means that the volume resistivity is less than $10^{13}$ Ωcm.

When the photoreceptor according to the first exemplary embodiment is used in a laser printer, the surface of the substrate 1 is preferably roughened so as to have a centerline average roughness Ra of 0.04 μm or more and 0.5 μm or less. However, when non-interfering light is used as a light source, surface roughening is not necessarily carried out.

As a method for surface roughening, wet honing in which a suspension prepared by containing an abrasive in water is sprayed onto a substrate; centerless grinding in which a substrate is continuously ground by pressing the substrate onto a rotating grind stone; anodic oxidation; or the like is preferable.

In addition, as other surface roughening methods, a method, in which conductive or semiconductive powders are dispersed in a resin to form a layer on the surface of a support 1, and the particles to be dispersed in the layer are used for surface roughening, is used.

Here, in the surface roughening treatment by anodic oxidation, an oxide film is formed on an aluminum surface by anodic oxidation in which the aluminum as an anode is anodized in an electrolyte solution. Examples of the electrolyte solution include a sulfuric acid solution, an oxalic acid solution, and the like. However, the porous anodic oxide film formed by anodic oxidation without modification is chemically active, easily contaminated and has a large resistance variation depending on the environment. Therefore, it is preferable to conduct a sealing treatment in which fine pores of the anodic oxide film are sealed by cubical expansion caused by a hydration in pressurized water vapor or boiled water (to which a metallic salt such as a nickel salt and the like may be added) to transform the anodic oxide into a more stable hydrated oxide. The film thickness of the anodic oxide film is preferably 0.3 μm or more and 15 μm or less.

Furthermore, the substrate 1 may be subjected to a treatment with an acidic aqueous solution or a boehmite treatment.

The treatment using an acidic treatment solution containing phosphoric acid, chromic acid, and hydrofluoric acid is carried out by preparing an acidic treatment solution and forming a coating layer using the acidic treatment solution. The blending ratios of phosphoric acid, chromic acid, and hydrofluoric acid in the acidic treatment solution are preferably 10% by weight or more and 11% by weight or less of phosphoric acid; 3% by weight or more and 5% by weight or less of chromic acid; and 0.5% by weight or more and 2% by weight or less of hydrofluoric acid. The total concentration of the acid components is preferably in a range of 13.5% by weight or more and 18% by weight or less. The treatment temperature is preferably 42° C. or higher and 48° C. or lower. The film thickness of the film is preferably 0.3 µm or more and 15 µm or less.

The boehmite treatment is carried out by immersing the substrate in pure water at a temperature of 90° C. to 100° C. for 5 minutes to 60 minutes, or by bringing the substrate into contact with heated water vapor at a temperature of 90° C. or higher and 120° C. or lower for 5 minutes or more and 60 minutes or less. The film thickness is preferably 0.1 µm or more and 5 µm or less. The film may further be subjected to an anodic oxidation treatment using an electrolyte solution such as a solution of adipic acid, boric acid, borate, phosphate, phthalate, maleate, benzoate, tartrate, citrate, and the like, which is less capable of dissolving the film, as compared with other species.

Undercoating Layer

The undercoating layer 4 is constituted with, for example, a layer containing inorganic particles in the binding resin.

As the inorganic particles, ones having a powder resistance (volume resistivity) of $10^2$ Ω·cm or more and $10^{11}$ Ω·cm or less are preferably used.

Among these, as the inorganic particles having the above-described foregoing resistance value, inorganic particles (conductive metal oxide) such as particles of tin oxide, titanium oxide, zinc oxide, zirconium oxide, and the like are preferably used, and in particular, particles of zinc oxide is particularly preferably used.

Furthermore, the inorganic particles may be subjected to a surface treatment, or two or more kinds of particles which have been subjected to different surface treatments, or having different particle diameters, may be used in combination. The volume average particle diameter of the inorganic particles is preferably in the range of 50 nm or more and 2000 nm or less (preferably 60 or more and 1000 or less).

Furthermore, as the inorganic particles, ones having a specific surface area as measured by a BET method of 10 m$^2$/g or more are preferably used.

Furthermore, in addition to the inorganic particles, an acceptor compound may be contained. Any acceptor compound may be used, but preferred examples thereof include electron transporting materials such as quinone-based compounds such as chloranil, bromanil, and the like, tetracyanoquinodimethane-based compounds, fluorenone compounds such as 2,4,7-trinitrofluorenone, 2,4,5,7-tetranitro-9-fluorenone, and the like, oxadiazole-based compounds such as 2-(4-biphenyl)-5-(4-t-butylphenyl)-1,3,4-oxadiazole, 2,5-bis(4-naphthyl)-1,3,4-oxadiazole, 2,5-bis(4-diethylaminophenyl)-1,3,4-oxadiazole, and the like, xanthone-based compounds, thiophene compounds, and diphenoquinone compounds such as 3,3',5,5'-tetra-t-butyldiphenoquinone and the like, and compounds having an anthraquinone structure are preferable. Furthermore, acceptor compounds having an anthraquinone structure, such as a hydroxyanthraquinone-based compound, an aminoanthraquinone-based compound, an aminohydroxyanthraquinone-based compound, and the like are preferably used, and specific examples thereof include anthraquinone, alizarin, quinizarin, anthrarufin, purpurin, and the like.

The content of the acceptor compound may be arbitrarily determined, but is preferably in a range of 0.01% by weight or more and 20% by weight or less, and more preferably in a range of 0.05% by weight or more and 10% by weight or less, based on the inorganic particles.

The acceptor compound may be simply added to a solution for forming an undercoating layer 4, or may be previously attached to the surface of the inorganic particles. Examples of the method for attaching the acceptor compound to the surface of the inorganic particles include a dry method and a wet method.

When the surface treatment is conducted according to a dry method, irregular distribution of the acceptor compound may be avoided by adding the acceptor compound, either directly or in a state being dissolved in an organic solvent, in a dropwise manner to the inorganic particles and spraying the drip of the acceptor compound onto the inorganic particles with dry air or a nitrogen gas while stirring the inorganic particles with a mixer or the like having a high shearing force. The addition or spraying is preferably carried out at a temperature lower than the boiling point of the solvent. After the addition or spraying of the acceptor compound, the inorganic particles may further be subjected to baking at a temperature of 100° C. or higher. The baking is carried out at a temperature and a time period in arbitrary ranges.

For a wet method, the inorganic particles are dispersed in a solvent using a stirrer, ultrasonic waves, a sand mill, an attritor, a ball mill, or the like. Thereafter, the acceptor compound is added to the inorganic particles and the mixture is further stirred or dispersed, and then the solvent is removed for the treatment. For a method for removing the solvent, the solvent is removed by filtration or evaporation. After removing the solvent, the particles may be further subjected to baking at a temperature of 100° C. or higher. The baking is carried out at a temperature and a time period in arbitrary ranges. In the wet method, moisture contained in the inorganic particles may be removed prior to adding the surface treatment agent. As the method for removing the moisture, a method of stirring and heating the particles in a solvent used for the surface treatment to remove the moisture, or a method of performing azeotropic removal with the solvent is used.

Furthermore, the inorganic particles may be subjected to a surface treatment prior to the addition of the acceptor compound. The surface treatment agent is selected from known materials. Examples thereof include a silane coupling agent, a titanate-based coupling agent, an aluminum-based coupling agent, a surfactant, and the like. Among these, a silane coupling agent is preferably used. Moreover, a silane coupling agent having an amino group is also preferably used.

As the silane coupling agent having an amino group, any silane coupling agent may be used, but specific examples thereof include γ-aminopropyltriethoxysilane, N-β-(aminoethyl)-γ-aminopropyltrimethoxysilane, N-β-(aminoethyl)-γ-aminopropylmethyldimethoxysilane, N,N-bis(β-hydroxyethyl)-γ-aminopropyltriethoxysilane, and the like, but are not limited thereto.

The silane coupling agents are used singly or in combination of two or more kinds thereof. Examples of the silane coupling agent that is used in combination with the silane coupling agent having an amino group include vinyltrimethoxysilane, γ-methacryloxypropyl-tris(β-methoxyethoxy)silane, β-(3,4-epoxycyclohexyl)ethyltrimethoxysilane, γ-glycidoxypropyltrimethoxysilane, vinyltriacetoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N,N-bis(R-hydroxyethyl)-γ-aminopropyltriethoxysilane, γ-chloropropyltrimethoxysilane, and the like, but are not limited thereto.

Any known method is usable for the surface treatment method, but a dry method or a wet method is preferably used. Further, addition of the acceptor compound and surface treatment with surface treatment agents such as a coupling agent and the like may be carried out simultaneously.

The amount of the silane coupling agent based on the inorganic particles contained in the undercoating layer 4 may be arbitrarily determined, but is preferably 0.5% by weight or more and 10% by weight or less, based on the inorganic particles.

As the binding resin contained in the undercoating layer 4, any known resins may be used. Examples thereof include known polymer resin compounds, for example, acetal resins such as polyvinyl butyral and the like, polyvinyl alcohol resins, casein, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenolic resins, phenol-formaldehyde resins, melamine resins, urethane resins, and the like; charge transporting resins having a charge transporting group; and conductive resins such as polyaniline and the like. Among these, resins which are insoluble in a coating solvent for an upper layer are preferably used, and phenolic resins, phenol-formaldehyde resins, melamine resins, urethane resins, epoxy resins, and the like are particularly preferably used. When these resins are used in combination of two or more kinds thereof, the mixing ratio may be appropriately determined as desired.

Furthermore, the ratio of the metal oxide to which an acceptor property is imparted to the binding resin, or the ratio of the inorganic particles to the binding resin, in the coating liquid for forming an undercoating layer, may be arbitrarily determined.

Various additives may be used in the undercoating layer 4. Examples of the additives include known materials including polycyclic condensed electron transporting pigments, azo-based electron transporting pigments, and the like, zirconium chelate compounds, titanium chelate compounds, aluminum chelate compounds, titanium alkoxide compounds, organic titanium compounds, silane coupling agents, and the like. The silane coupling agent is used for the surface treatment of metal oxides, but may also be added to the coating liquid as additives. Specific examples of the silane coupling agents include vinyltrimethoxysilane, γ-methacryloxypropyl-tris(β-methoxyethoxy)silane, β-(3,4-epoxycyclohexyl)ethyltrimethoxysilane, γ-glycidoxypropyltrimethoxysilane, vinyltriacetoxysilane, γ-mercaptopropyltrimethoxysi lane, γ-aminopropyltriethoxysilane, N-β-(aminoethyl)-γ-aminopropyltrimethoxysilane, N-β-(aminoethyl)-γ-aminopropylmethylmethoxysilane, N,N-bis (β-hydroxyethyl)-γ-aminopropyltriethoxysilane, γ-chloropropyltrimethoxysilane, and the like.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, isostearate zirconium butoxide, and the like.

Examples of the titanium chelate compounds include tetraisopropyl titanate, tetra(n-butyl)titanate, butyl titanate dimer, tetra(2-ethylhexyl)titanate, titanium acetyl acetonate, polytitanium acetyl acetonate, titanium octylene glycolate, titanium lactate ammonium salt, titanium lactate, titanium lactate ethyl ester, titanium triethanol aminate, polyhydroxytitanium stearate, and the like.

Examples of the aluminum chelate compounds include aluminum isopropylate, monobutoxy aluminum diisopropylate, aluminum butylate, ethylacetoacetate aluminum diisopropylate, aluminum tris(ethylacetoacetate), and the like.

These compounds may be used singly, or as a mixture or a polycondensate of two or more kinds thereof.

The solvent for preparing the coating liquid for forming an undercoating layer is selected from known organic solvents such as an alcohol-based solvent, an aromatic solvent, a hydrocarbon halide-based solvent, a ketone-based solvent, a ketone alcohol-based solvent, an ether-based solvent, an ester-based solvent, and the like. As the solvent, common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, toluene, and the like is used.

Furthermore, these solvents may be used singly or in a mixture of two or more kinds thereof. As the solvent to be used, any solvent may be used to prepare the mixed solvent as long as the resultant mixed solvent is capable of dissolving the binding resin.

When the coating liquid for forming the undercoating layer is prepared, as a method for dispersing the inorganic particles, known methods using a roll mill, a ball mill, a vibration ball mill, an attritor, a sand mill, a colloid mill, a paint shaker, or the like are used. Further, as the method for coating the undercoating layer 4, ordinary methods such as a blade coating method, a wire bar coating method, a spray coating method, a dip coating method, a bead coating method, an air knife coating method, a curtain coating method, and the like are used.

The undercoating layer 4 is formed on the substrate using the thus-obtained coating liquid for forming an undercoating layer.

Furthermore, the Vickers hardness of the undercoating layer 4 is preferably 35 or more.

Moreover, the thickness of the undercoating layer 4 may be optionally set, but the thickness is preferably 15 μm or more, and more preferably 15 μm or more and 50 μm or less.

Furthermore, the surface roughness (ten point average roughness) of the undercoating layer 4 is adjusted within a range of ¼n (wherein n represents a refractive index of the upper layer) to ½λ of the wavelength λ of the laser for exposure. Particles of a resin or the like may also be added to the undercoating layer for adjusting the surface roughness thereof. Examples of the resin particles include silicone resin particles, crosslinking methyl polymethacrylate resin particles, and the like.

Furthermore, the undercoating layer may be polished in order to adjust the surface roughness thereof. As the method for polishing, buff polishing, sand blast treatment, wet honing, grinding treatment, or the like is used.

The undercoating layer is obtained by drying the applied coating, which is usually carried out by evaporating the solvent at a temperature at which a film may be formed.

Charge Generating Layer

The charge generating layer 2A is preferably a layer containing at least a charge generating material and a binding resin.

Examples of the charge generating material include azo pigments such as a bisazo pigment, a trisazo pigment, and the like, and condensed aromatic pigments such as dibromoantanthrone, perylene pigments, pyrrolopyrrole pigments, phthalocyanine pigments, zinc oxides, trigonal selenium, and the like. Among these, for laser exposure in the near-infrared region, metal or nonmetal phthalocyanine pigments are preferable, and hydroxygallium phthalocyanine disclosed in JP-A-5-263007, JP-A-5-279591, and the like, chlorogallium phthalocyanine disclosed in JP-A-5-98181 and the like, dichlorotin phthalocyanine disclosed in JP-A-5-140472, JP-A-5-140473, and the like, and titanyl phthalocyanine disclosed in JP-A-4-189873, JP-A-5-43823, and the like. Further, for laser exposure in the near-ultraviolet region, condensed aromatic pigments such as dibromoantanthrone, a thioindigo pigment, porphyrazine compounds, zinc oxides, trigonal selenium, and the like are more preferable. Further, as the charge generating material, an inorganic pigment is preferable to correspond to a case where a light source having an exposure wavelength of 380 nm or more and 500 nm or less is used, and, a metal phthalocyanine pigment and a metal-free phthalocyanine pigment are preferable to correspond to a case where a light source having an exposure wavelength of 700 nm or more and 800 nm or less is used.

As the charge generating material, a hydroxygallium phthalocyanine pigment having a maximum peak wavelength in the range of 810 nm or more and 839 nm or less in a spectral absorption spectrum in a wavelength region of 600 nm or more and 900 nm or less is preferably used. The hydroxygallium phthalocyanine pigment is different from the conventional V-type hydroxygallium phthalocyanine pigment, and a maximum peak wavelength of the spectral absorption spectrum is shifted to a shorter wavelength than the conventional V-type hydroxygallium phthalocyanine pigment.

Furthermore, the hydroxygallium phthalozyanine pigment having a maximum peak wavelength in a range of 810 nm or more and 839 nm or less preferably has an average particle diameter and a BET specific surface area in a certain range. Specifically, the average particle diameter is preferably 0.20 μm or less, and more preferably 0.01 μm or more and 0.15 μm or less. The BET specific surface area is preferably 45 m$^2$/g or more, more preferably 50 m$^2$/g or more, and particularly preferably 55 m$^2$/g or more and 120 m$^2$/g or less. The average particle diameter here is a volume average particle diameter (d50 average particle diameter) measured by a laser diffraction/scattering particle diameter distribution tester (LA-700, manufactured by Horiba, Ltd.), and the BET specific surface area is measured by a nitrogen substitution method using a BET specific surface area analyzer (FLOWSORB II 2300, manufactured by Shimadzu Corporation).

Furthermore, the maximum particle diameter (maximum primary particle diameter) of the hydroxygallium phthalozyanine pigment is preferably 1.2 μm or less, more preferably 1.0 μm or less, and particularly preferably 0.3 μm or less.

Furthermore, the hydroxygallium phthalocyanine pigment preferably has an average particle diameter of 0.2 μm or less, a maximum particle diameter of 1.2 μm or less, and a specific surface area of 45 m$^2$/g or more.

Moreover, the hydroxygallium phthalocyanine pigment preferably has diffraction peaks at 7.5°, 9.9°, 12.5°, 16.3°, 18.6°, 25.1°, and 28.3° of Bragg angles (2θ±0.2°) in an X-ray diffraction spectrum obtained using CuKα characteristic X rays.

Furthermore, the hydroxygallium phthalocyanine pigment preferably has a thermogravimetric reduction rate, when a temperature is increased from 25° C. to 400° C., of 2.0% or more and 4.0% or less, and more preferably 2.5% or more and 3.8% or less.

The binding resin used in charge generating layer 2A may be selected from a wide range of insulating resins, and from organic photoconductive polymers such as poly-N-vinyl carbazole, polyvinyl anthracene, polyvinyl pyrene, polysilane, and the like. Preferable examples of the binding resin include polyvinyl butyral resins, polyarylate resins (polycondensates of bisphenols and aromatic divalent carboxylic acid, or the like), polycarbonate resins, polyester resins, phenoxy resins, vinyl chloride-vinyl acetate copolymers resins, polyamide resins, acrylic resins, polyacrylamide resins, polyvinyl pyridine resins, cellulose resins, urethane resins, epoxy resins, casein, polyvinyl alcohol resins, polyvinyl pyrrolidone resins, and the like. These binding resins may be used singly or in combination of two or more kinds thereof. The mixing ratio of the charge generating material to the binding resin is preferably in the range of 10:1 to 1:10 by weight ratio. Here, the term "conductive" means that the volume resistivity is $10^{13}$ Ωcm or more.

The charge generating layer 2A is formed, for example, using a coating liquid in which the above-mentioned charge generating materials and binding resins are dispersed in a solvent.

Examples of the solvent used for the dispersion include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, toluene, and the like. These solvents are used singly or in a mixture of two or more kinds thereof.

Furthermore, as a method for dispersing the charge generating material and the binding resin in the solvent, any ordinary method such as a ball mill dispersion method, an attritor dispersion method, a sand mill dispersion method, and the like is used. Furthermore, the average particle diameter of the charge generating material when dispersed is preferably 0.5 μm or less, more preferably 0.3 μm or less, and further preferably 0.15 μm or less.

Furthermore, when forming the charge generating layer 2A, ordinary methods such as a blade coating method, a Meyer bar coating method, a spray coating method, a dip coating method, a bead coating method, an air knife coating method, a curtain coating method, and the like are used.

The film thickness of the charge generating layer 2A thus obtained is preferably 0.1 μm or more and 5.0 μm or less, and further preferably 0.2 μm or more and 2.0 μm or less.

Second Exemplary Embodiment: Surface Photosensitive Layer=Charge Transporting Layer 2B The photoreceptor according to the second exemplary embodiment as one example of the present exemplary embodiment has a layered constitution where an undercoating layer 4, a charge generating layer 2A, and a charge transporting layer 2B are laminated in this order on a substrate 1, as shown in FIG. 2, and the photosensitive layer 2B is a surface photosensitive layer constituting an outermost surface.

As the substrate 1, the undercoating layer 4, and the charge generating layer 2A in the second exemplary embodiment, the same as the substrate 1, the undercoating layer 4, and the charge generating layer 2A in the first exemplary embodiment as shown in FIG. 1 above are used as they are.

Furthermore, as the charge transporting layer 2B in the second exemplary embodiment, the charge transporting layer 2B-2 in the first exemplary embodiment is used as it is. That is, the charge transporting layer 2B which is a surface photosensitive layer in the second exemplary embodiment is configured to include fluorine-containing resin particles having the above-described specific resin adhered on the surface thereof.

Third Exemplary Embodiment: Surface
Photosensitive Layer=Functionally Integrated
Photosensitive Layer 6

The photoreceptor according to the third exemplary embodiment as one example of the present exemplary embodiment has a layered constitution where an undercoating layer 4 and a photosensitive layer 6 are laminated in this order on a substrate 1, as shown in FIG. 3, and the functionally integrated photosensitive layer 6 is a surface photosensitive layer.

As the substrate 1 and the undercoating layer 4 in the third exemplary embodiment, the same as the substrate and the undercoating layer 4 in the first exemplary embodiment as shown in FIG. 1 above are used as they are.

Functionally Integrated Photosensitive Layer 6

In the photoreceptor according to the third exemplary embodiment, the functionally integrated photosensitive layer 6 is a surface photosensitive layer constituting an outermost surface. The photosensitive layer 6 which is a surface photosensitive layer in the third exemplary embodiment is configured to include fluorine-containing resin particles having the above-described specific resin adhered on the surface thereof.

Furthermore, the content of the charge generating material in the photosensitive layer 6 in the present exemplary embodiment is preferably 20% by weight or more and 50% by weight or less.

<Method for Preparing Electrophotographic Photoreceptor>

The method for preparing an electrophotographic photoreceptor according to the present exemplary embodiment is not particularly limited, but it includes, for example, a surface photosensitive layer forming step in which a coating liquid for forming a surface photosensitive layer including the fluorine-containing resin particles having the above-described specific resin adhered on the surface thereof on the substrate is made to intervene with other layers such as an undercoating layer and the like or directly applied on the surface of the substrate, and then dried to form a surface photosensitive layer.

Furthermore, the coating liquid for forming a surface photosensitive layer including the fluorine-containing resin particles is prepared by the method described in the section, "Preparation of Fluorine-Containing Resin Particle Dispersion", or the like. Further, the drying temperature is preferably 100° C. or higher and 180° C. or lower.

<Image Forming Apparatus and Process Cartridge>

Next, a process cartridge and an image forming apparatus, in which the electrophotographic photoreceptor of the present exemplary embodiment is used, will be described.

The process cartridge of the present exemplary embodiment is configured to be detachable from an image forming apparatus in which a toner image obtained by developing an electrostatic latent image on the surface of the latent image holding body is transferred to a recording medium, and an image is formed on the recording medium, and to include at least the electrophotographic photoreceptor according to the present exemplary embodiment.

Furthermore, the image forming apparatus of the present exemplary embodiment is configured to include the electrophotographic photoreceptor according to the present exemplary embodiment, a charging device that charges the electrophotographic photoreceptor, an exposure device that exposes the surface of the charged electrophotographic photoreceptor to form an electrostatic latent image on the surface, a developing device that develops the electrostatic latent image with a developer to form a toner image, and a transfer device that transfers the toner image to a recording medium. Further, the image forming apparatus of the present exemplary embodiment may be a so-called tandem device having a plurality of photoreceptors corresponding to each color, and in this case, all the photoreceptors are preferably electrophotographic photoreceptors of the present exemplary embodiment. Further, the transfer of the toner image may have an intermediate transfer type using an intermediate transfer body.

Figure 4:
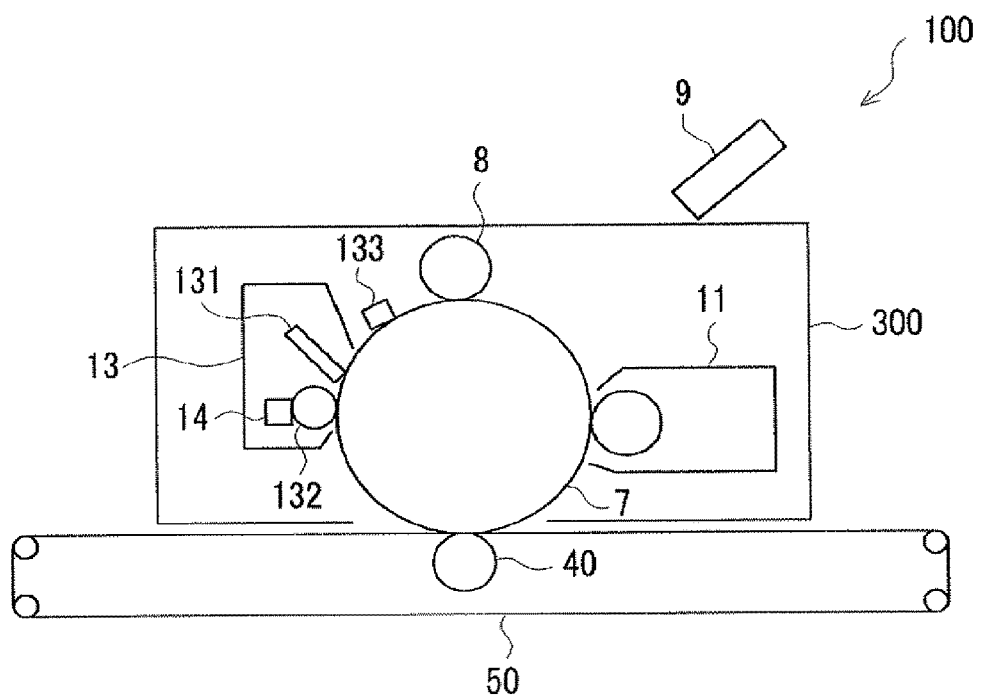
FIG. 4 is a schematic cross-sectional view of an image forming apparatus according to the present exemplary embodiment.

FIG. 4 is a schematic structural view showing the image forming apparatus according to the present exemplary embodiment. As shown in FIG. 4, the image forming apparatus 100 includes a process cartridge 300 including an expose the electrophotographic photoreceptor 7, an exposure device 9, a transfer device 40, and an intermediate transfer body 50. Further, in the image forming apparatus 100, the exposure device 9 is disposed so as to expose the electrophotographic photoreceptor 7 through the opening of the process cartridge 300, the transfer device 40 is disposed at a position facing the electrophotographic photoreceptor 7 through the intermediate transfer body 50, and the intermediate transfer body 50 is disposed so as to partially contact with the electrophotographic photoreceptor 7.

The process cartridge 300 shown in FIG. 4 integrally supports the electrophotographic photoreceptor 7, the charging device 8, the developing device 11, and the cleaning device 13 in a housing. The cleaning device 13 has a cleaning blade 131 (cleaning member), and the cleaning blade 131 is disposed so as to contact the surface of the electrophotographic photoreceptor 7.

Furthermore, an example uses a fibrous member 132 (roll-shaped) for supplying a lubricant 14 to the surface of the photoreceptor 7 and a fibrous member 133 for assisting the (flat brush-shaped) cleaning, but the fibrous members 132 and 133 may not be used.

As the charging device 8, for example, a contact-type charger including a conductive or semiconductive charging roller, a charging brush, a charging film, a charging rubber blade, a charging tube, or the like is used. Further, known chargers such as a non-contact-type roller charger, a scorotron or corotron charger using corona discharge, or the like are also used.

Furthermore, although not shown, around the electrophotographic photoreceptor 7, the temperature of the electrophotographic photoreceptor 7 may be raised, and thus, a photoreceptor heating member for lowering the relative temperature may be provided.

Examples of the exposure device 9 include optical instruments which may expose the surface of the photoreceptor 7 to an image by using light of semiconductor laser light, LED light, or a liquid-crystal shutter light, and the like. The wavelength of a light source is preferably in the spectral sensitivity region of the photoreceptor. As the wavelength of the semiconductor laser light, near-infrared light having an oscillation wavelength, for example, in the vicinity of 780 nm is preferable. However, the wavelength is not limited to the above-described wavelength, and laser light having an oscillation wavelength on the order of 600 nm and blue laser light having an oscillation wavelength of 400 nm or more and 450 nm or less may also be used. Further, a surface-emitting laser light source which performs multi-beam output is also effective to form a color image.

As the developing device 11, for example, a common developing device, in which a magnetic or non-magnetic one- or two-component developer, or the like is brought into contact or not brought into contact for developing may be used. Such a developing device is not particularly limited as long as it has the above-mentioned functions, and may be appropriately selected according to the purpose. Examples thereof include known developing devices in which the one- or two-component developer is applied to photoreceptor 7 using a brush or a roller. Among these, a developing roller holding the developer on the surface thereof is preferably used.

Hereinbelow, a toner to be used in the developing device 11 will be described.

The toner used in the image forming apparatus of the present exemplary embodiment preferably has an average shape factor $((ML^2/A)\times(\pi/4)\times100$, wherein ML represents the maximum length of a particle and A represents the projection area of the particle) of 100 or more and 150 or less, more preferably 105 or more and 145 or less, and further preferably 110 or more and 140 or less. Furthermore, for the toner, the volume average particle diameter is preferably 3 μm or more and 12 μm or less, and more preferably 3.5 μm or more and 9 μm or less.

The toner is not particularly limited by the preparation method, but used are the toners obtained by methods including a kneading and grinding method in which a binding resin, a colorant, a releasing agent, and optionally a charge control agent, or the like are mixed and kneaded, ground, and classified; a method in which the shape of the particles obtained by the kneading and grinding method is changed using mechanical shock or heat energy; an emulsion polymerization aggregation method in which a dispersion solution obtained by emulsion-polymerizing polymerizable monomers of a binding resin is mixed with a dispersion solution containing a colorant and a releasing agent, and optionally a charge control agent and the like, then aggregated, heated and fused to obtain toner particles, a suspension polymerization method in which polymerizable monomers to obtain a binding resin and a solution containing a colorant, a releasing agent, and optionally a charge control agent and the like, are suspended in an aqueous solvent and polymerized therein; and a dissolution-suspension method in which a binding resin and a solution containing a colorant, a releasing agent, and optionally a charge control agent and other agents, is suspended in an aqueous solvent to form particles.

Moreover, known methods such as a method for preparing a toner having a core-shell structure in which aggregated particles are further attached to the toner obtained by the above-mentioned method, as a core, then heated and fused, and other methods are be used. As the method for preparing the toner, a suspension-polymerization method, an emulsion polymerization aggregation method and a dissolution suspension method carried out in an aqueous solvent are preferable, and an emulsion polymerization aggregation method is particularly preferable, in view of controlling the shape and the particle diameter distribution.

Toner mother particles include a binding resin, a colorant and a releasing agent, and may further include silica or a charge control agent.

Examples of the binding resins used in the toner mother particles include homopolymers and copolymers of styrenes such as styrene, chlorostyrene, and the like, monoolefins such as ethylene, propylene, butylene, isoprene, and the like, vinyl esters such as vinyl acetate, vinyl propionate, vinyl benzoate, vinyl butyrate, and the like, α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate, and the like, vinyl ethers such as vinyl methyl ether, vinyl ethyl ether, vinyl butyl ether, and the like, vinyl ketones such as vinyl methyl ketone, vinyl hexyl ketone, vinyl isopropenyl ketone, and the like, polyester resins synthesized by copolymerization of dicarboxylic acids and diols, and the like.

Examples of specific typical binding resins include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester resins, and the like. Other examples of binding resins include polyurethane, epoxy resins, silicone resins, polyamide, modified rosin, paraffin wax, and the like.

Furthermore, examples of the typical colorants include magnetic powder such as magnetite, ferrite, and the like, carbon black, aniline blue, calco oil blue, chrome yellow, ultramarine blue, Du Pont oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Yellow 17, C. I. Pigment Blue 15:1, C. I. Pigment Blue 15:3, and the like.

Examples of the typical releasing agents include low-molecular-weight polyethylene, low-molecular-weight polypropylene, Fischer-Tropsch wax, montan wax, carnauba wax, rice wax, candelilla wax, and the like.

Furthermore, as the charge control agent, any of known agents such as an azo-based metal-complex compound, a metal-complex compound of salicylic acid, and a resin-type charge control agent having a polar group is used. When a toner is prepared by a wet method, materials which are hardly soluble in water are preferably used. The toner may be either a magnetic toner which contains a magnetic material or a non-magnetic toner which contains no magnetic material.

The toner used in the developing device 11 is prepared by mixing the above-mentioned toner mother particles and external additives using a Henschel mixer, a V blender, or the like. When the toner mother particles are produced by a wet process, external additives may be added by a wet method.

Active particles may be added to the toner used in the developing device 11. Examples of the active particles include solid lubricants such as graphite, molybdenum disulfide, talc, fatty acids, metal salts of fatty acids, and the like, low molecular weight polyolefins such as polypropylene, polyethylene, polybutene, and the like, silicones having a softening point by heating, aliphatic amides such as oleic acid amide, erucic acid amide, ricinoleic acid amide, stearic acid amide, and the like, vegetable waxes such as carnauba wax, rice wax, candelilla wax, Japan wax, jojoba oil, and the like, animal waxes such as beeswax and the like, minerals and petroleum waxes such as montan wax, ozokerite, ceresine, paraffin wax, microcrystalline wax, Fischer-Tropsch wax, and the like, and modified products thereof. These may be used singly or in combination of two or more kinds thereof. However, the average particle diameter is preferably in the range of 0.1 μm or more and 10 μm or less, and those having the above-mentioned chemical structure may be ground into particles having the particle diameter. The amount of the particles to be added to the toner is preferably in the range of 0.05% by weight or more and 2.0% by weight or less, and more preferably 0.1% by weight or more and 1.5% by weight or less.

Inorganic particles, organic particles, composite particles in which inorganic particles have been attached to the organic particles, or the like may be added to the toner used in the developing device 11.

Preferable examples of the inorganic particles include various inorganic oxides, nitrides, borides, and the like, such as silica, alumina, titania, zirconia, barium titanate, aluminum titanate, strontium titanate, magnesium titanate, zinc oxide, chromium oxide, cerium oxide, antimony oxide, tungsten oxide, tin oxide, tellurium oxide, manganese oxide, boron oxide, silicon carbide, boron carbide, titanium carbide, silicon nitride, titanium nitride, boron nitride, and the like.

Moreover, the inorganic particles may be subjected to a treatment with a titanium coupling agent such as tetrabutyl titanate, tetraoethyl titanate, isopropyltriisostearoyl titanate, isopropyltridecylbenzenesulfonyl titanate or bis(dioctylpyrophosphate)oxyacetate titanate, and the like, or a silane coupling agent such as γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane, p-methylphenyltrimethoxysilane, and the like. Furthermore, the particles which are subjected to a hydrophilization treatment with silicone oil, or metal salts of higher fatty acids such as aluminum stearate, zinc stearate, calcium stearate, and the like are also preferably used.

Examples of the organic particles include styrene resin particles, styrene acryl resin particles, polyester resin particles, urethane resin particles, and the like.

The particle diameter is preferably from 5 nm or more and 1,000 nm or less, more preferably 5 nm or more and 800 nm or less, and further preferably 5 nm or more and 700 nm or less, in terms of a number average particle diameter. Further, the total amount of the above-mentioned particles and the active particles is preferably 0.6% by weight or more.

As the other inorganic oxides added to the toner articles, small inorganic oxide particles having a primary particle diameter of 40 nm or less are preferably used, and inorganic oxide particles having a larger diameter than that of the small inorganic oxide particles are preferably added. Known inorganic oxide particles may be used, but combination use of silica and titanium oxide is preferable.

Furthermore, small inorganic particles may be subjected to a surface treatment. Furthermore, addition of carbonates such as calcium carbonate, magnesium carbonate, and the like, or inorganic minerals such as hydrotalcite, cerium oxide, and the like is also preferable.

Moreover, an electrophotographic color toner may be used in combination with a carrier. Examples of the carrier include iron powder, glass beads, ferrite powder, nickel powder, and the like, and those carriers coated with a resin. Further, the mixing ratio of the toner and carrier is determined as necessary.

Examples of the transfer device 40 include known transfer chargers such as a contact-type transfer charger using a belt, a roller, a film, a rubber blade or the like, a scorotron transfer charger and a corotron transfer charger using corona discharge, and the like.

As the intermediate transfer body 50, a belt (intermediate transfer belt) to which semiconductivity is imparted and which is formed from of polyimide, polyamide imide, polycarbonate, polyarylate, polyester, rubber, or the like is used. In addition, the intermediate transfer body 50 in the form of a drum is also used.

In addition to the above-mentioned devices, the image forming apparatus 100 may further include, for example, a photodischarge device that photodischarges the photoreceptor 7.

Figure 5:
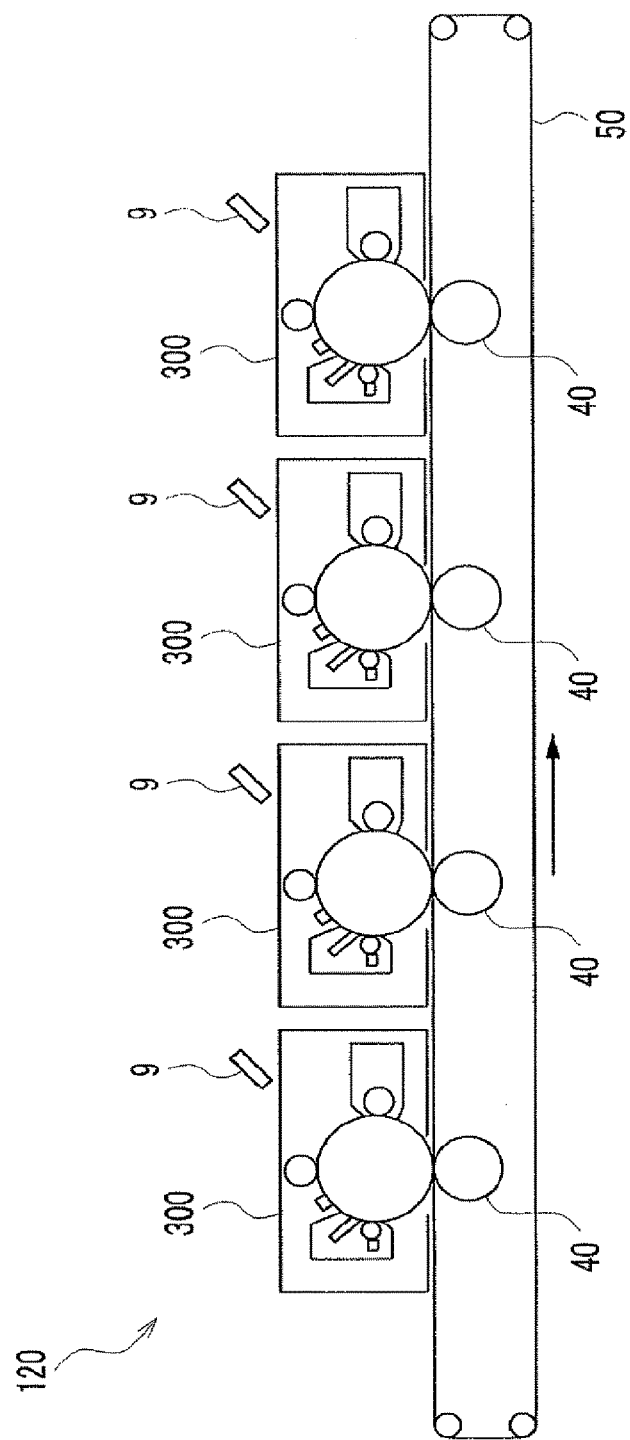
FIG. 5 is a schematic cross-sectional view of a tandem-type image forming apparatus according to the present exemplary embodiment.

FIG. 5 is a schematic cross-sectional view showing an image forming apparatus according to another exemplary embodiment. The image forming apparatus 120 is a full color image forming apparatus of a tandem type, including four process cartridges 300 mounted thereon, as shown in FIG. 5. In the image forming apparatus 120, four process cartridges 300 are disposed parallel with each other on intermediate transfer body 50, and one electrophotographic photoreceptor is provided for one color. Further, the image forming apparatus 120 has the same constitution as the image forming apparatus 100, except that it is of a tandem type.

Moreover, in the image forming apparatus (process cartridge) according to the present exemplary embodiment, the developing device may have a developing roller that serves as a developer holding body moving in the reverse direction to the moving direction (rotating direction) of the electrophotographic photoreceptor. Here, the developer roller has a cylindrical developer sleeve holding a developer on the surface thereof. The developing device may have a configuration that includes a regulating member regulating the amount of the developer supplied to the developer sleeve. By moving (rotating) the developing roller of the developing device in the reverse direction to the rotating direction of the electrophotographic photoreceptor, the surface of the electrophotographic photoreceptor is rubbed with the toner staying between the developing roller and the electrophotographic photoreceptor.

Furthermore, in the image forming apparatus according to the present exemplary embodiment, the spacing between the developer sleeve and the photoreceptor is selected to be preferably 200 μm or more and 600 μm or less, and more preferably 300 μm or more and 500 μm or less. Further, the spacing between the developer sleeve and a regulating blade that is the above described regulating member regulating the amount of the developer is selected to be preferably 300 μm or more and 1000 μm or less, and more preferably 400 μm or more and 750 μm or less.

In addition, the absolute value of the moving speed of the developing roller surface is selected to be preferably 1.5 times or more and 2.5 times or less, and more preferably 1.7 times or more and 2.0 times or less than the absolute value of the moving speed (process speed) of the photoreceptor surface.

Furthermore, in the image forming apparatus (process cartridge) according to the present exemplary embodiment, the developing device (developing unit) includes a developer retainer having a magnetic material and preferably develops an electrostatic latent image with a two-component developer containing a magnetic carrier and a toner.

EXAMPLES

Hereinbelow, Examples and Comparative Examples will be described, but the present invention is not limited to the following Examples. Further, the "parts" below are based on weight unless otherwise specified.

Resin Synthesis Example A

Into a 1-liter stirrer-equipped internal pressure reaction vessel are added 50 parts of a macromonomer represented by the following formula (1) (wherein m is 80), parts of 2-(perfluorohexyl)ethyl methacrylate, 300 parts of trifluorotoluene, and 0.5 part of azoisobutyronitrile, and the mixture is reacted at 90° C. for 4 hours under a nitrogen atmosphere. This reaction liquid is added dropwise to 5000 parts of methanol, and thus, the resin is precipitated, filtered, and dried to obtain 65 parts of a resin (surfactant) (A).

The molecular weight is measured by means of GPC and the Mw in terms of styrene is 30000. The solubilities of the resin (A) in methanol, ethanol, cyclopentanol, and 2,2,3,3, 3-pentafluoropropanol (1H,1H-pentafluoropropanol) are measured by the above-described method, and the reduction amounts of the surface tension are 0.1% or less for methanol, ethanol, and cyclopentanol, and 0.5% for 1H,1H-pentafluoropropanol, and the resin (A) is insoluble in any solvent.

Formula (1)

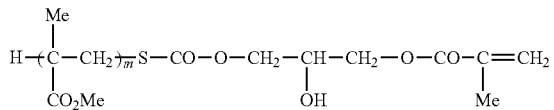

Resin Synthesis Example B

By the same method as described in Resin Synthesis Example A except that 30 parts of 2-(perfluorohexyl)ethyl methacrylate are changed to 30 parts of the monomer represented by the following formula (2) in the Resin Synthesis Example A, 60 parts of a resin (surfactant) (B) is obtained.

The molecular weight is measured by means of GPC and the Mw in terms of styrene is 33000. The solubilities of the resin (B) in methanol, ethanol, cyclopentanol, and 1H,1H-trifluoroethanol are measured by the above-described method, and the reduction amounts of the surface tension are 0.1% or less for methanol, ethanol, and cyclopentanol, and 0.5% for 1H,1H-pentafluoropropanol, and the resin (B) is insoluble in any solvent.

Formula (2)

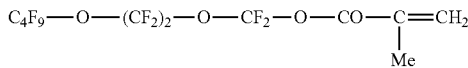

Resin Synthesis Example C

Into a 1-liter stirrer-equipped internal pressure reaction vessel are added 20 parts of hydroxyethyl methacrylate, 60 parts of 2-(perfluorohexyl)ethyl methacrylate, 300 parts of trifluorotoluene, and 0.5 part of azoisobutyronitrile, and the mixture is reacted at 90° C. for 5 hours under a nitrogen atmosphere. This reaction liquid is added dropwise to 5000 parts of methanol, and thus, the resin is precipitated, filtered, and dried to obtain 60 parts of a resin (surfactant) (C).

The molecular weight is measured by means of GPC and the Mw in terms of styrene is 20000. The solubilities of the resin (C) in methanol, ethanol, and cyclopentanol are measured by the above-described method, and the reduction amounts of the surface tension are 0.2% or less for methanol, ethanol, and cyclopentanol, and 0.6% for 1H,1H-pentafluoropropanol, and the resin (C) is insoluble in any solvent although some swelling is found.

Resin D

"ARON GF300" manufactured by Toagosei Co., Ltd. is used as a resin (D).

The solubilities of the resin (D) in methanol, ethanol, and cyclopentanol are measured by the above-described method, and the reduction amounts of the surface tension are 0.1% or less for methanol, ethanol, and cyclopentanol, and 0.2% for 1H,1H-pentafluoropropanol, and the resin (D) is insoluble in any solvent.

Resin E

"SURFLON S-611" manufactured by AGC Seimi Chemical Co., Ltd. is used as a resin (E).

The solubilities of the resin (E) in methanol, ethanol, and cyclopentanol are measured by the above-described method, and the reduction amounts of the surface tension are 0.2% or less for methanol, ethanol, and cyclopentanol, and 0.6% for 1H,1H-pentafluoropropanol, and the resin (E) is insoluble in any solvent.

Example I-1

Into a 500-ml glass bottle are put and dissolved 300 parts of toluene and 3 parts of a resin (surfactant) (A) (dissolution step).

After dissolution, 30 parts of PTFE particles (manufactured by Daikin Industries, Ltd.: LUBRON L-2) are put thereinto, followed by stirring at room temperature (25° C.) for one day and centrifugation, to obtain PTFE particles having a resin which is insoluble in methanol, ethanol, and cyclopentanol adsorbed thereon (adsorption step and separation step). The solvent is removed from the supernatant after centrifugation with an evaporator and the residue is measured. Thus, it is found that 1.2 parts of non-adsorbed resin (A) is recovered, and it is confirmed that 6% by weight/1 g-PTFE is adsorbed.

Furthermore, PTFE after the adsorption treatment of the resin (A) is separated and washed with tetrahydrofuran, and the washing liquid is concentrated. Thus, the resin (A) thus recovered is 6% by weight/1 g-PTFE. From this, it is confirmed that the resin (A) is adsorbed on the PTFE surface.

Then, the PTFE particles after centrifugation are dispersed in 300 parts of cyclopentanol (dispersion step), and are easily dispersed. Thus, substantially no settlement is found even after the dispersion is left to stand for one day. This is taken as a dispersion (1).

Furthermore, the surface tension (STs) of cyclopentanol at room temperature (25° C.) is 33.50 mN/m, the surface tension (STp) after dispersion of the PTFE particles therein is 33.45 mN/m, and it is believed that the resin (A) is not released from the surface of the PTFE particles with |STs−STp|/STs=0.001.

Examples I-2 to I-4

By carrying out the treatment by the same method as described in Example I-1 except that the resin (A) in Example I-1 is changed to the resin (B), the resin (C), and the resin (D) (ARON GF300, manufactured by Toagosei Co., Ltd.), dispersions (2) to (4) are obtained.

For the dispersions (2) to (4), substantially no settlement is found even after the dispersions are left to stand for one day from dispersion. Further, the measurement results of the adsorption amount and the calculation results of |STs−STp|/STs are shown in Table I-1 below.

Example I-5

Into a 1-liter stirrer-equipped internal pressure reaction vessel are put 1 part of hydroxyethyl methacrylate, 6 parts of 2-(perfluorohexyl)ethyl methacrylate, 300 parts of toluene, and 30 parts of PTFE particles (manufactured by Daikin Industries, Ltd.: LUBRONL-2), and the mixture is reacted at room temperature for one day (dissolution step and adsorption step).

Then, 0.1 part of azoisobutyronitrile is added thereto and the mixture is reacted at 90° C. for 5 hours under a nitrogen atmosphere (polymerization step).

The reaction liquid is cooled, then centrifuged, and redispersed in 300 parts of toluene, and centrifuged to obtain PTFE particles having the resin adsorbed thereon (separation step). The solvent is removed from all of the supernatant after centrifugation by an evaporator, and weighed. Thus, 3.9 parts of unadsorbed resins are recovered. From this, it is confirmed that 7% by weight/1 g-PTFE is adsorbed.

Then, when the PTFE particles after centrifugation are dispersed in 300 parts of cyclopentanol (dispersion step), they are easily dispersed. Thus, substantially no settlement is observed after the dispersion is left to stand for one day. This is taken as a dispersion (5).

Furthermore, a resin obtained by the polymerization of 1 part of hydroxyethyl methacrylate and 6 parts of 2-(perfluorohexyl)ethyl methacrylate is separately synthesized. The solubilities of this resin in methanol, ethanol, and cyclopentanol are measured by the method as described above, and found to be insoluble in any of the solvents.

Furthermore, the surface tension (STs) of cyclopentanol at room temperature (25° C.) is 33.50 mN/m, and the surface tension (STp) after dispersion of the PTFE particles is 33.25 mN/m. Further, it is believed that there is no resin is released from the surface of the PTFE particles with |STs−STp|/STs=0.007.

Examples I-6 and I-7

Treatment is carried out according to the same method as described in Example I-1, except that the PTFE particles (manufactured by Daikin Industries, Ltd.: LUBRONL-2) in Example 1 is changed into a tetrafluoroethylene-perfluoroalkyl vinyl ether copolymer (PFA) (manufactured by Du Pont-Mitsui Fluorochemicals Co., Ltd.: MP102) and a tetrafluoroethylene-hexafluoropropylene copolymer (FEP) (manufactured by Mitsui-Du Pont Fluorochemical Co., Ltd.: MPE056), and dispersions (6) and (7) are obtained.

For the dispersions (6) and (7), slight settlement could be observed after the dispersions are left to stand for one day. Further, the measurement results of the adsorption amounts and the calculation results of |STs−STp|/STs are shown in Table I-1 below.

Examples I-8 and I-9

Treatment is carried out according to the same method as described in Examples I-6 and I-7, except that 300 parts of cyclopentanol in Examples I-6 and I-7 is changed to a mixed solvent of 240 parts of cyclopentanol and 60 parts of 1H,1H-pentafluoropropanol, and dispersions (8) and (9) are obtained.

For the dispersions (8) and (9), substantially no settlement could be observed after the dispersions are left to stand for one day. Further, the measurement results of the adsorption amounts and the calculation results of |STs−STp|/STs are shown in Table I-1 below.

Examples I-10 and I-11

Treatment is carried out according to the same method as described in Example I-1, except that the amounts of the resin (surfactant) (A) in Example I-1 are changed from 3 parts to 10 parts and 15 parts, and dispersions (10) and (11) are obtained.

For the dispersions (10) and (11), substantially no settlement could be observed after the dispersions are left to stand for one day. Further, the measurement results of the adsorption amounts and the calculation results of |STs−STp|/STs are shown in Table I-1 below.

Example I-12

Treatment is carried out according to the same method as described in Example I-5, except that the dispersion solvent is changed from cyclopentanol to a mixed solvent of water and methanol at 1:1 (volume ratio), and a dispersion (12) is obtained.

For the dispersion (12), slight settlement could be observed after the dispersion is left to stand for one day. Further, the measurement results of the adsorption amounts and the calculation results of |STs−STp|/STs are shown in Table I-1 below.

Comparative Example I-1

Into a 500-ml glass bottle are put 300 parts of cyclopentanol and 3 parts of a resin (surfactant) (A), and the mixture is stirred at room temperature (25° C.), but did not dissolve at all.

To this mixed liquid are added 30 parts of PTFE particles (manufactured by Daikin Industries, Ltd.: LUBRONL-2), and the mixture is stirred at room temperature (25° C.) for one day, but the dispersibility is remarkably poor and settlement occurred soon.

Moreover, the calculation results of |STs−STp|/STs are shown in Table I-1 below.

Comparative Examples I-2 to I-4

Treatment is carried out according to the same method as described in Comparative Example I-1, except that the resin (A) in Comparative Example I-1 is changed to the resin (B), the resin (C), and the resin (D) (ARON GF300, manufactured by Toagosei Co., Ltd.), respectively.

However, the dispersibility is remarkably poor and settlement occurred soon. Further, the calculation results of |STs−STp|/STs are shown in Table I-1 below.

Comparative Examples I-5 and I-6

Treatment is carried out according to the same method as described in Comparative Example I-1, except that the PTFE particles (manufactured by Daikin Industries, Ltd.: LUBRONL-2) in Comparative Example I-1 is changed to tetrafluoroethylene-perfluoroalkyl vinyl ether copolymer (Industries Ltd. PFA) (manufactured by Du Pont-Mitsui Fluorochemicals Co., Ltd.: MP102), and tetrafluoroethylene-hexafluoropropylene copolymer (FEP) (manufactured by Du Pont-Mitsui Fluorochemicals Co., Ltd.: MPE056), respectively.

However, the dispersibility is remarkably poor and settlement occurred soon. Further, the calculation results of |STs−STp|/STs are shown in Table I-1 below.

Examples I-14 to I-19

By the same method as described in Example I-13 except that dispersions (2) to (5), (10), and (11) are used instead of the dispersion (1), a coating liquid is obtained, and thus, a surface film is formed.

In any case, when the surface film is formed, modification or crack of the polycarbonate resin is not observed and a good film could be obtained. Further, the obtained surface film is highly resistant to scratching with a simple rubbing test by BEMCOT (manufactured by ASAHI KASEI FIBERS CORPORATION.).

Example I-20

10 parts of a dispersion (1), 5 parts of dipropylene glycol diacrylate (DPGDA: manufactured by Daicel-Cytec Co., Ltd.), 0.01 part of FTERGENT 730FL (manufactured by

TABLE 1

| | Dispersion | Specific Resin | Fluorine-containing resin particles | Adsorption amount [% by weight] | \|Sts − Stp\|Sts | Dispersibility |
|---|---|---|---|---|---|---|
| Example I-1 | Dispersion (1) | Resin (A) | PTFE | 6% | 0.001 | No settlement |
| Example I-2 | Dispersion (2) | Resin (B) | PTFE | 7% | 0.001 | No settlement |
| Example I-3 | Dispersion (3) | Resin (C) | PTFE | 6% | 0.001 | No settlement |
| Example I-4 | Dispersion (4) | Resin (D) | PTFE | 5% | Close to 0 | No settlement |
| Example I-5 | Dispersion (5) | Polymerized in the system | PTFE | 7% | 0.007 | No settlement |
| Example I-6 | Dispersion (6) | Resin (A) | PFA | 0.5% | Close to 0 | Slightly settled at 1 day |
| Example I-7 | Dispersion (7) | Resin (A) | FEP | 0.5% | Close to 0 | Slightly settled at 1 day |
| Example I-8 | Dispersion (8) | Resin (A) | PFA | 0.5% | Close to 0 | No settlement |
| Example I-9 | Dispersion (9) | Resin (A) | FEP | 0.5% | Close to 0 | No settlement |
| Example I-10 | Dispersion (10) | Resin (A) | PTFE | 8% | 0.002 | No settlement |
| Example I-11 | Dispersion (11) | Resin (A) | PTFE | 13% | 0.004 | No settlement |
| Example I-12 | Dispersion (12) | Polymerized in the system | PTFE | 7% | 0.001 | Slightly settled at 1 day |
| Comparative Example I-1 | — | Resin (A) | PTFE | — | 0 | Immediately settled |
| Comparative Example I-2 | — | Resin (B) | PTFE | — | 0 | Immediately settled |
| Comparative Example I-3 | — | Resin (C) | PTFE | — | 0 | Immediately settled |
| Comparative Example I-4 | — | Resin (D) | PTFE | — | 0 | Immediately settled |
| Comparative Example I-5 | — | Resin (A) | PFA | — | 0 | Immediately settled |
| Comparative Example I-6 | — | Resin (A) | FEP | — | 0 | Immediately settled |

Example I-13

10 parts of a dispersion (1), 5 parts of a phenol resin (PL-4852: manufactured by Gunei Chemical Industry Co., Ltd.), and 0.01 part of FTERGENT 730FL (manufactured by NEOS Co., Ltd.) are mixed to obtain a coating liquid.

Furthermore, the solubility of the phenol resin in cyclopentanol is tested by the method described in the Resin Synthesis Example A, and it is found to be soluble.

The coating liquid is applied on a polycarbonate resin plate with a wire bar, and cured at 130° C. for 20 minutes to form a 10-μm surface film. When the surface film is formed, modification or crack of the polycarbonate resin is not observed and a good film could be obtained. Further, the obtained surface film is highly resistant to scratching with a simple rubbing test by BEMCOT (manufactured by ASAHI KASEI FIBERS CORPORATION.).

NEOS Co., Ltd.), and 0.2 part of IRGACURE 819 (manufactured by BASF) are mixed to obtain a coating liquid.

Furthermore, the solubility of the dipropylene glycol diacrylate is tested and found to be soluble.

The coating liquid is applied on a polycarbonate resin plate with a wire bar, dried, and then photocured for 60 seconds at 160 W/cm with an ultraviolet ray irradiation device (manufactured by Ushio Inc.) under nitrogen to form a surface film. When the surface film is formed, modification or crack of the polycarbonate resin is not observed and a good film could be obtained. Further, the obtained surface film is highly resistant to scratching with a simple rubbing test by BEMCOT (manufactured by ASAHI KASEI FIBERS CORPORATION.).

Example II-1

(Formation of Undercoating Layer 4) 100 parts of zinc oxide (average particle diameter: 70 nm, manufactured by Tayca Corporation, specific surface area value: 15 m²/g) is mixed with 500 parts of methanol and stirred. 1.25 parts of KBM 603 (manufactured by Shin-Etsu Chemical Co., Ltd.) as a silane coupling agent is added thereto, and the mixture is stirred for 2 hours. Thereafter, methanol is evaporated by distillation under reduced pressure and print is carried out at 120° C. for 3 hours to obtain zinc oxide particles surface-treated with a silane coupling agent.

38 parts by weight of a solution obtained by dissolving 60 parts by weight of the surface-treated zinc oxide particles, 0.6 part by weight of alizarin, 13.5 parts by weight of block isocyanate (SUMIDULE 3173, manufactured by Sumitomo-Bayer Urethane Co., Ltd.) as a curing agent and 15 parts by weight of a butyral resin (S-LEC BM-1, manufactured by Sekisui Chemical Co., Ltd.) in 85 parts by weight of methyl ethyl ketone and 25 parts by weight of methyl ethyl ketone are mixed, followed by dispersing for 4 hours with a sand mill with glass beads having a diameter of 1 mm, to obtain a dispersion. To the obtained dispersion are added 0.005 part by weight of dioctyltin dilaurate as a catalyst and 4.0 parts by weight of particles of a silicone resin (TOSPEARL 145, manufactured by GE-Toshiba Silicone Co., Ltd.), to obtain a coating liquid for an undercoating layer.

The coating liquid is coated on an aluminum base material having a diameter of 30 mm by a dip coating method, followed by drying and curing at 180° C. for 40 minutes, to obtain an undercoating layer having a thickness of 25

(Formation of Charge Generating Layer 2A)

A mixture containing 15 parts by weight of chlorogallium phthalocyanine crystal having strong diffraction peaks at least at 7.4°, 16.6°, 25.5°, and 28.3° by Bragg angle (2θ±0.2°) to CuKα characteristic X-rays as a charge generating material, 10 parts by weight of a vinyl chloride-vinyl acetate copolymer resin (VMCH, manufactured by Union Carbide Corporation, Japan) and 300 parts by weight of n-butyl alcohol is dispersed for 4 hours with a sand mill with glass beads having a diameter of 1 mm, to obtain a coating liquid for a charge generating layer.

The coating liquid for a charge generating layer is applied by a dip coating method on the undercoating layer 4, followed by drying, to obtain a charge generating layer having a thickness of 0.2 μm.

(Formation of Charge Transporting Layer 2B-1)

3.5 parts of N,N'-diphenyl-N,N'-bis(3-methylphenyl)-[1,1']biphenyl-4,4'-diamine as a charge transporting material and 1.5 parts of N,N'-bis(3,4-dimethylphenyl)-biphenyl-4-amine) are used and added to 5.0 parts of a bisphenol Z polycarbonate resin (viscosity average molecular weight: 40,000) and 40 parts of toluene to obtain a coating liquid for a charge transporting layer 2B-1.

This coating liquid for a charge transporting layer 2B-1 is applied by a dip coating method on the charge generating layer 2A, and dried at 135° C. for 50 minutes to form a charge transporting layer 2B-1 having a thickness of 20 μm.

(Formation of Charge Transporting Layer 2B-2 (Surface Photosensitive Layer))

Next, into a 500-ml glass bottle, 300 parts of toluene and 3 parts of a resin (surfactant) (A) are put and dissolved (dissolution step).

After dissolution, 30 parts of PTFE particles (manufactured by Daikin Industries, Ltd.: LUBRON L5) are put thereinto, followed by stirring at room temperature (25° C.) for one day and centrifugation, to obtain PTFE particles having a resin which is insoluble in methanol, ethanol, and cyclopentanol adsorbed thereon (adsorption step and separation step). The solvent is removed from the supernatant after centrifugation with an evaporator and the residue is measured. Thus, it is found that 0.9 part of non-adsorbed resin (A) is recovered, and it is confirmed that 7% by weight/1 g-PTFE is adsorbed. Further, PTFE after the resin (A) is subjected to an adsorption treatment is separated and washed with tetrahydrofuran, and the washing liquid is concentrated. From the fact that the resin (A) recovered by concentrating the washing liquid is 7% by weight/1 g-PTFE, it is confirmed that the resin (A) is adsorbed on the surface of the PTFE.

Then, the PTFE particles after centrifugation are dispersed in 300 parts of cyclopentanol (dispersion step) to obtain a liquid (1-A). For the liquid (1-A), substantially no settlement is observed even after the liquid is left to stand for one day.

Furthermore, the liquid (1-A) is filtered to separate the filtered agglomerate, and then washed with tetrahydrofuran, and the washing liquid is concentrated. From the fact that the resin (A) recovered by concentrating the washing liquid is 7% by weight/1 g-PTFE, it is confirmed that the resin (A) is adsorbed on the surface of the PTFE in the liquid (1-A).

Furthermore, the surface tension (STs) of cyclopentanol at room temperature (25° C.) is 33.50 mN/m, the surface tension (STs) after dispersion of the PTFE particles therein is 33.47 mN/m, and it is believed that the resin (A) is not released from the surface of the PTFE particles with |STs−STp|/STs=0.001.

Next, 4 parts of a compound represented by the following formula (3) as a charge transporting material and 0.1 part of 2,6-di-t-butyl-4-methylphenol as an antioxidant are dissolved in 30 parts of cyclopentanol and 5 parts of cyclopentyl methyl ether. This solution is taken as the liquid (1-B).

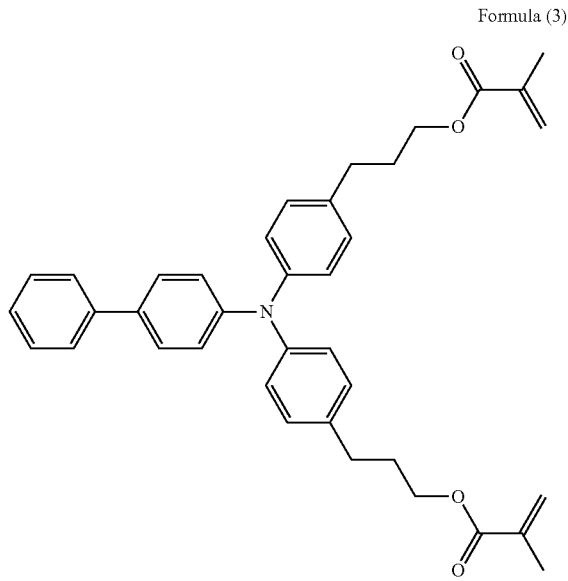 [SMILES: C=C(C)C(=O)OCCCc1ccc(N(c2ccc(CCCOC(=O)C(=C)C)cc2)c2ccc(-c3ccccc3)cc2)cc1]

Formula (3)

To the liquid (1-B) is added 3 parts of the liquid (1-A), and the mixture is stirred and mixed, followed by repeating 6 times a dispersion treatment by pressurizing it to 500 kgf/cm² with a high-pressure homogenizer with a penetrating chamber having fine flow paths (manufactured by Yoshida Kikai Kogyo Co., Ltd.) to obtain a coating liquid for a charge transporting layer 2B-2 (surface photosensitive layer).

This coating liquid is applied on the charge transporting layer 2B-1, and then heated at 150° C. for 40 minutes under a nitrogen atmosphere to form a charge transporting layer 2B-2 (surface photosensitive layer) having a thickness of 5 μm, and thus, a desired electrophotographic photoreceptor is obtained.

Example II-2

Treatment is carried out according to the same method as described in Example II-1, except that in the preparation of the liquid (1-A) in Example II-1 (formation of the charge transporting layer 2B-2 (surface photosensitive layer)), the resin (A) is changed to the resin (B), and a liquid (2-A) is obtained. For this liquid (2-A), substantially no settlement is observed after the liquid is left to stand for one day.

Furthermore, it is confirmed that the resin (B) is adsorbed on the surface of the PTFE particles according to the method described in Example II-1. From the fact that the recovered resin (B) is 8% by weight/1 g-PTFE, it is confirmed that the resin (B) is adsorbed on the surface of the PTFE in the liquid (2-A).

Furthermore, the measurement results of the adsorption amounts and the calculation results of |STs–STp|/STs are shown in Table II-1 below.

Thereafter, according to the same method as described in Example II-1 except that the liquid (1-A) is changed to the liquid (2-A), a desired electrophotographic photoreceptor is obtained.

Example II-3

Treatment is carried out according to the same method as described in Example II-1, except that in the preparation of the liquid (1-A) in Example II-1 (formation of the charge transporting layer 2B-2 (surface photosensitive layer)), the resin (A) is changed to the resin (E) (SURFLON S-611, manufactured by AGC Seimi Chemical Co., Ltd.), and a liquid (3-A) is obtained. For this liquid (3-A), substantially no settlement is observed after the liquid is left to stand for one day.

Furthermore, it is confirmed that the resin (E) is adsorbed on the surface of the PTFE particles according to the method described in Example II-1. From the fact that the recovered resin (E) is 7% by weight/1 g-PTFE, it is confirmed that the resin (E) is adsorbed on the surface of the PTFE in the liquid (3-A).

Furthermore, the measurement results of the adsorption amounts and the calculation results of |STs–STp|/STs are shown in Table II-1 below.

Thereafter, according to the same method as described in Example II-1 except that the liquid (1-A) is changed to the liquid (3-A), a desired electrophotographic photoreceptor is obtained.

Example II-4

Treatment is carried out according to the same method as described in Example II-1, except that in the preparation of the liquid (1-A) in Example II-1 (formation of the charge transporting layer 2B-2 (surface photosensitive layer)), the resin (A) is changed to the resin (D) (ARON GF300, manufactured by Toa Gosei Chemical Industry Co., Ltd.), and a liquid (4-A) is obtained. For this liquid (4-A), substantially no settlement is observed after the liquid is left to stand for one day.

Furthermore, it is confirmed that the resin (D) is adsorbed on the surface of the PTFE particles according to the method described in Example II-1. From the fact that the recovered resin (D) is 5% by weight/1 g-PTFE, it is confirmed that the resin (D) is adsorbed on the surface of the PTFE in the liquid (4-A).

Furthermore, the measurement results of the adsorption amounts and the calculation results of |STs–STp|/STs are shown in Table II-1 below.

Thereafter, according to the same method as described in Example II-1 except that the liquid (1-A) is changed to the liquid (4-A), a desired electrophotographic photoreceptor is obtained.

Example II-5

By the method described in Example II-1, an undercoating layer 4, a charge generating layer 2A, and a charge transporting layer 2B-1 are formed on an aluminum substrate.

(Formation of Charge Transporting Layer 2B-2 (Surface Photosensitive Layer))

Into a 1-liter stirrer-equipped internal pressure reaction vessel are put 1 part of hydroxyethyl methacrylate, 6 parts of 2-(perfluorohexyl)ethyl methacrylate, 300 parts of toluene, and 30 parts of PTFE particles (manufactured by Asahi Glass Co., Ltd.: FLUON L173JE), and the mixture is stirred at room temperature for one day (dissolution step and adsorption step).

Then, 0.1 part of azoisobutyronitrile is added thereto and the mixture is reacted at 90° C. for 5 hours under a nitrogen atmosphere (polymerization step).

The reaction liquid is cooled, then centrifuged, and redispersed in 300 parts of toluene, and centrifuged to obtain PTFE particles having the resin adsorbed thereon (separation step). The solvent is removed from all of the supernatant after centrifugation by an evaporator, and weighed. Thus, it is confirmed that 3.9 parts of unadsorbed matter is recovered and 7% by weight of 1 g-PTFE is adsorbed.

Then, when the PTFE particles after centrifugation are dispersed in 300 parts of cyclopentanol (dispersion step) to obtain a liquid (5-A). For the liquid (5-A), substantially no settlement is observed after the liquid is left to stand for one day.

Furthermore, it is confirmed that the resin obtained by the above-described reaction is adsorbed on the surface of the PTFE particles according to the method described in Example II-1. From the fact that the recovered resin is 7% by weight/1 g-PTFE, it is confirmed that the resin is adsorbed on the surface of the PTFE in the liquid (5-A).

Moreover, the calculation results of |STs–STp|/STs are shown in Table II-1 below.

Furthermore, a resin obtained by the polymerization of 1 part of hydroxyethyl methacrylate and 6 parts of 2-(perfluorohexyl)ethyl methacrylate is separately synthesized. The solubilities of this resin in methanol, ethanol, and cyclopentanol are measured by the method as described above, and found to be insoluble in any of the solvents.

Thereafter, according to the same method as described in Example II-1 except that the liquid (1-A) is changed to the liquid (5-A), a desired electrophotographic photoreceptor is obtained.

Examples II-6 and II-7

Treatment is carried out according to the same method as described in Example II-1, except that the PTFE particles (manufactured by Daikin Industries, Ltd.: LUBRONL 5) in Example II-1 is changed into a tetrafluoroethylene-perfluoroalkyl vinyl ether copolymer (PFA) (manufactured by Du Pont-Mitsui Fluorochemicals Co., Ltd.: MP102) and a tetrafluoroethylene-hexafluoropropylene copolymer (FEP) (manufactured by Mitsui-Du pont Fluorochemical Co., Ltd.: MPE056), liquids (6-A) and (7-A) are obtained. For the liquids (6-A) and (7-A), slight settlement could be observed after the liquids are left to stand for one day.

Furthermore, it is confirmed that the resin (A) is adsorbed on the surface of the PFA or FEP particles according to the method described in Example II-1. From the fact that the recovered resins (A) are all 0.5% by weight/1 g-PFA or FEP, it is confirmed that the resins (A) are adsorbed on the surface of the PFA or FEP in the liquids (6-A) and (7-A).

Moreover, the measurement results of the adsorption amounts and the calculation results of |STs−STp|/STs are shown in Table II-1 below.

Thereafter, according to the same method as described in Example II-1 except that the liquid (1-A) is changed to the liquids (6-A) and (7-A), a desired electrophotographic photoreceptor is obtained.

Examples II-8 and II-9

Treatment is carried out according to the same method as described in Examples II-6 and II-7, except that 300 parts of cyclopentanol in Examples II-6 and II-7 is changed to a mixed solvent of 200 parts of cyclopentanol and 100 parts of 2,2,3,3,3-pentafluoropropanol, and liquids (8-A) and (9-A) are obtained. For the liquids (8-A) and (9-A), substantially no settlement could be observed after the liquids are left to stand for one day.

Furthermore, it is confirmed that the resin (A) is adsorbed on the surface of the PFA or FEP particles according to the method described in Example II-1. From the fact that the recovered resins (A) are all 0.5% by weight/1 g-PFA or FEP, it is confirmed that the resins (A) are adsorbed on the surface of the PFA or FEP in the liquids (8-A) and (9-A).

Moreover, the measurement results of the adsorption amounts and the calculation results of |STs−STp|/STs are shown in Table II-1 below.

Thereafter, according to the same method as described in Example II-1 except that the liquid (1-A) is changed to the liquids (8-A) and (9-A), a desired electrophotographic photoreceptor is obtained.

Examples II-10 to II-11

Treatment is carried out according to the same method as described in Example II-1, except that the amount of the resin (surfactant) (A) in Example II-1 is changed to 3 parts to 7.5 parts and 15 parts, respectively, and liquids (10-A) and (11-A) are obtained. For the liquids (10-A) and (11-A), substantially no settlement could be observed after the liquids are left to stand for one day.

Furthermore, it is confirmed that the resin (A) is adsorbed on the surface of the PTFE particles according to the method described in Example II-1. From the fact that the recovered resin (A) is 7% by weight/1 g-PTFE and 10% by weight/1 g-PTFE, respectively, it is confirmed that the resin (A) is adsorbed on the surface of the PTFE in the liquids (10-A) and (11-A).

Moreover, the measurement results of the adsorption amounts and the calculation results of |STs−STp|/STs are shown in Table II-1 below.

Thereafter, according to the same method as described in Example II-1 except that the liquid (1-A) is changed to the liquids (10-A) and (11-A), a desired electrophotographic photoreceptor is obtained.

Comparative Example II-1

By the method described in Example II-1, an undercoating layer 4, a charge generating layer 2A, and a charge transporting layer 2B-1 are formed on an aluminum substrate.

(Formation of Charge Transporting Layer 2B-2 (Surface Photosensitive Layer))

Next, 4 parts of a compound represented by the formula (3) as a charge transporting material and 0.1 part of 2,6-di-t-butyl-4-methyl phenol as an antioxidant are mixed and dissolved in 35 parts of cyclopentanone (solvent not belonging to a group of hydroxyl group-containing solvents as described above) to obtain a coating liquid not containing PTFE particles and a resin (surfactant). This coating liquid is applied on the charge transporting layer 2B-1, and then heated at 135° C. for 60 minutes to form a charge transporting layer 2B-2 (surface photosensitive layer) having a thickness of 31 μm, and thus, a desired electrophotographic photoreceptor is obtained.

Comparative Example II-2

By the method described in Example II-1, an undercoating layer 4, a charge generating layer 2A, and a charge transporting layer 2B-1 are formed on an aluminum substrate.

(Formation of Charge Transporting Layer 2B-2 (Surface Photosensitive Layer))

Into a 500-ml glass bottle are put and dissolved 300 parts of cyclopentanone (solvent not belonging to a group of hydroxyl group-containing solvents as described above) and 15 parts of a resin (surfactant) (A).

After dissolution, 30 parts of PTFE particles (manufactured by Daikin Industries, Ltd.: LUBRONL-2) are put thereinto, followed by stirring at room temperature (25° C.) for one day, to obtain liquid (13-A).

Furthermore, the surface tension (STs) of cyclopentanone at room temperature (25° C.) is 34 mN/m, the surface tension (STp) after dispersion of the PTFE particles therein is 23.8 mN/m, and it is believed that the released resin (A) which is not adhered on the surface of the PTFE particles is present with |STs−STp|/STs=0.3.

Next, 4 parts of a compound represented by the formula (3) as a charge transporting material and 0.1 part of 2,6-di-t-butyl-4-methyl phenol as an antioxidant are mixed and dissolved in 35 parts of cyclopentanone (solvent not belonging to a group of hydroxyl group-containing solvents as described above) to obtain a liquid (13-B).

According to the same method as described in Example II-1 except that the liquid (1-A) is changed to the liquid (13-A) and the liquid (1-B) is changed to the liquid (13-B) in Example 1, a desired electrophotographic photoreceptor is obtained.

TABLE 2

| | Specific resin | Fluorine-containing resin particles | Solvent | Adsorption amount [% by weight] | \|Sts-STp\|/STs |
|---|---|---|---|---|---|
| Example II-1 | Resin (A) | PTFE | Cyclopentanol | 7% | 0.001 |
| Example II-2 | Resin (B) | PTFE | Cyclopentanol | 8% | 0.001 |
| Example II-3 | Resin (E) | PTFE | Cyclopentanol | 7% | 0.001 |
| Example II-4 | Resin (D) | PTFE | Cyclopentanol | 5% | Close to 0 |
| Example II-5 | Polymerized in the system | PTFE | Cyclopentanol | 7% | 0.005 |
| Example II-6 | Resin (A) | PFA | Cyclopentanol | 0.5% | Close to 0 |
| Example II-7 | Resin (A) | FEP | Cyclopentanol | 0.5% | Close to 0 |
| Example II-8 | Resin (A) | PFA | Cyclopentanol/2,2,3,3,3-pentafluoropropanol | 0.5% | Close to 0 |
| Example II-9 | Resin (A) | FEP | Cyclopentanol/2,2,3,3,3-pentafluoropropanol | 0.5% | Close to 0 |
| Example II-10 | Resin (A) | PTFE | Cyclopentanol | 7% | 0.002 |
| Example II-11 | Resin (A) | PTFE | Cyclopentanol | 10% | 0.003 |
| Comparative Example II-1 | None | None | Cyclopentanone | (Not measured) | (Not measured) |
| Comparative Example 11-2 | Resin (A) | PTFE | Cyclopentanone | (Not measured) | 0.3 |

<Evaluation Method for Photoreceptor>

The electrophotographic photoreceptors obtained in Examples and Comparative Examples are installed on a Printer Docu Centre Color f450 Drum Cartridge manufactured by Fuji Xerox Co., Ltd., and print evaluation is carried out.

—Residual Potential (Electrical Characteristics)—

For evaluation of the electrical characteristics, an electrophotographic photoreceptor is negatively charged with a scorotron charger having a grid application voltage of 700 V under an environment of high temperature/high pressure (28° C., 85% RH), and then the charged electrophotographic photoreceptor is subjected to flash exposure using a semiconductor laser of 780 nm at a light amount of 10 mJ/m$^2$. After exposure, the surface potential (V) of the electrophotographic photoreceptor after 10 seconds is measured and this value is taken as a residual potential.

Furthermore, the surface potential is measured by providing a surface potential probe at a position of 1 mm from the surface of the electrophotographic photoreceptor in an area to be measured, using a surface potential meter (Trek 334, manufactured by Trek Co., Ltd.).

A+: −100 V or more
A: −200 V or more and less than −100 V
B: −300 V or more and less than −200 V
C: less than −300 V —Difference in Residual Potential Due to Repetition (ΔRp)—

In order to confirm the repetition suitability, a print test is carried out with 50,000 sheets under an environment of high temperature/high humidity (28° C., 85% RH) environment, based on an image having an area coverage of 5% including a 1-dot line image in color with A4 size. For the electrophotographic photoreceptors at an initial time of the print test (after printing 10 sheets) and after printing 50,000 sheets, the residual potential (VRp) after removing the charges, measurement is carried out using the surface potential meter (Trek 334, manufactured by Trek Co., Ltd.), and the difference (ΔRp) between the residual potential at an initial time and the residual potential after printing 50,000 sheets is calculated.

A: less than 20 V
B: 20 V or more and less than 50 V
C: 50 V or more

—Scratch—

The degree of scratch generation on the surface of the electrophotographic photoreceptor after printing 50,000 sheets in the print test is examined with the naked eye.

A: Scratch is not observed with the naked eye.
B: Scratch is partially generated.
C: Scratch is fully generated.

—Blade Curling at Initial Time—

A cleaning blade is brought into contact with an electrophotographic photoreceptor, and the contact state (whether the blade is curled) after the photoreceptor is rotated 30 times is observed with the naked eye to carry out evaluation of blade curling at an initial time.

Materials for blade: Urethane rubber
Elastic force of blade: 53%
Pressurization pressure: 2.8 g/mm —Light Fatigue Test (ΔVL)—

For a light fatigue test of an electrophotographic photoreceptor, continuous light is irradiated at 1000 lux for 10 minutes to form irradiated parts/non-irradiated parts on the electrophotographic photoreceptor. While being rotated at 66.7 rpm, the electrophotographic photoreceptor is charged at −700 V, and the difference in the irradiated parts/non-irradiated parts after irradiation with light at 780 nm and 1.5 mJ/m$^2$ is measured and evaluated according to the above-described method, using the difference in the surface potential (ΔVL) with a surface potential meter (Trek 334, manufactured by Trek Co., Ltd.).

A: 10 V or less
B: 10 V or more and less than 30 V
C: 30 V or more

TABLE 3

| | Residual potential | Difference in residual potential due to repetition ΔRp | Light fatigue ΔVL | | Scratch | Initial blade curling |
|---|---|---|---|---|---|---|
| | | [V] | [V] | [V] | | |
| Example II-1 | A+ −70 | A 10 | A 1 | | A | Not generated |

TABLE 3-continued

| | Residual potential | Difference in residual potential due to repetition ΔRp [V] | | Light fatigue ΔVL [V] | | Scratch | Initial blade curling |
|---|---|---|---|---|---|---|---|
| | [V] | | | | | | |
| Example II-2 | A+ | −75 | A | 17 | A | 2 | A | Not generated |
| Example II-3 | A+ | −65 | A | 12 | A | 1 | A | Not generated |
| Example II-4 | A+ | −50 | A | 10 | A | 3 | A | Not generated |
| Example II-5 | A+ | −80 | A | 18 | A | 6 | A | Not generated |
| Example II-6 | A+ | −50 | A | 10 | A | 4 | A | Not generated |
| Example II-7 | A+ | −50 | A | 10 | A | 1 | A | Not generated |
| Example II-8 | A+ | −55 | A | 11 | A | 5 | A | Not generated |
| Example II-9 | A+ | −55 | A | 10 | A | 5 | A | Not generated |
| Example II-10 | A+ | −75 | A | 10 | A | 3 | A | Not generated |
| Example II-11 | A+ | −70 | A | 13 | A | 5 | A | Not generated |
| Comparative Example II-1 | A+ | −50 | A | 5 | A | 3 | C | Generated |
| Comparative Example II-2 | C | −425 | C | 70 | B | 33 | A | Not generated |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:
a substrate, and
a surface photosensitive layer which contains fluorine-containing resin particles and a resin adhered on the surface of the fluorine-containing resin particles,
wherein the resin is not dissolved in at least one solvent selected from the group consisting of a water-based solvent and an alcohol-based solvent having 1 to 10 carbon atoms,
wherein the alcohol-based solvent contains no aromatic ring in the molecule structure.

2. The electrophotographic photoreceptor according to claim 1,
wherein the resin is a random or block copolymer of an acrylate having a perfluoroalkyl group and a monomer having no fluorine.

3. An image forming apparatus comprising:
the electrophotographic photoreceptor according to claim 1,
a charging device that charges the electrophotographic photoreceptor,
an exposure device that exposes the surface of the charged electrophotographic photoreceptor to form an electrostatic latent image on the surface,
a developing device that develops the electrostatic latent image with a developer to form a toner image, and
a transfer device that transfers the toner image to a recording medium.

4. A process cartridge,
comprising the electrophotographic photoreceptor according to claim 1,
wherein the process cartridge is configured to be detachable from an image forming apparatus.

* * * * *